(12) United States Patent
Inoue et al.

(10) Patent No.: US 7,358,875 B2
(45) Date of Patent: Apr. 15, 2008

(54) ECHO PREVENTING CIRCUIT AND DIGITAL SIGNAL PROCESSING CIRCUIT

(75) Inventors: Takeo Inoue, Hirakata (JP); Hideki Ohashi, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/627,839

(22) Filed: Jan. 26, 2007

(65) Prior Publication Data

US 2007/0176812 A1 Aug. 2, 2007

(30) Foreign Application Priority Data

Feb. 1, 2006 (JP) .............................. 2006-025118

(51) Int. Cl.
*H03M 1/00* (2006.01)

(52) U.S. Cl. ..................................... 341/110; 370/289

(58) Field of Classification Search ................. 341/50, 341/61, 110, 155, 144; 370/289, 291; 379/406.5
See application file for complete search history.

(56) References Cited

U.S. PATENT DOCUMENTS

| | | | | |
|---|---|---|---|---|
| 4,539,675 | A | * | 9/1985 | Fisher ........................ 370/291 |
| 5,075,687 | A | * | 12/1991 | Chen et al. .................. 341/110 |
| 5,381,474 | A | * | 1/1995 | Lahdemaki et al. ... 379/406.08 |
| 5,633,863 | A | * | 5/1997 | Gysel et al. ................ 370/290 |
| 5,710,790 | A | * | 1/1998 | Herzberg et al. ........... 375/219 |
| 5,796,819 | A | * | 8/1998 | Romesburg ............ 379/406.09 |
| 6,658,055 | B1 | * | 12/2003 | Darr ........................... 375/232 |
| 6,674,810 | B1 | * | 1/2004 | Cheng ........................ 375/296 |
| 7,173,962 | B2 | * | 2/2007 | Dowling ..................... 375/222 |

FOREIGN PATENT DOCUMENTS

| | | |
|---|---|---|
| DE | 42 02 206 A1 | 7/1993 |
| JP | 61 030134 A | 2/1986 |
| JP | 2001-060895 | 6/2001 |

OTHER PUBLICATIONS

European Patent Office, Extended European Search Report for Application No. 07101389.0—1246, Jun. 13, 2007.

* cited by examiner

*Primary Examiner*—Brian Young
(74) *Attorney, Agent, or Firm*—SoCal IP Law Group LLP; Steven C. Sereboff

(57) ABSTRACT

An echo preventing circuit comprises a filter that is inputted with a first digital signal and outputs a second and a third digital signals; a first DA converter that converts the second digital signal into a first analog signal and outputs the first analog signal; a second DA converter that converts the third digital signal into a second analog signal and outputs the second analog signal; an input/output terminal that outputs the first analog signal or that is inputted with a third analog signal; a subtracting circuit that outputs a fourth analog signal obtained by subtracting the second analog signal from a signal formed by combining the first analog signal and the third analog signal; and an AD converter that converts the fourth analog signal into a fourth digital signal and outputs the fourth digital signal, wherein the filter sets filter coefficients for which the fourth analog signal is a signal formed by removing or attenuating the first analog signal from a signal formed by combining the first analog signal and the third analog signal, based on the fourth digital signal outputted from the AD converter when signals are inputted into the first and the second DA converters while the third analog signal is not present, and wherein the fourth analog signal outputted from the subtracting circuit is outputted as an output signal corresponding to the third analog signal.

7 Claims, 48 Drawing Sheets

ECHO PREVENTING CIRCUIT AND DIGITAL SIGNAL PROCESSING CIRCUIT

CROSS-REFERENCE TO RELATED APPLICATION

This application claims the benefit of priority to Japanese Patent Application No. 2006-25118, filed Feb. 1, 2006, of which full contents are incorporated herein by reference.

BACKGROUND OF THE INVENTION

1. Field of the Invention

The present invention relates to an echo preventing circuit and a digital signal processing circuit.

2. Description of the Related Art

Recently, for example, each of some communicating apparatuses such as a mobile phone and a hands-free phone that can each be connected to an earphone microphone, incorporates an echo preventing circuit to prevent echoes generated due to sound coupling that travels along from a speaker to a microphone, electric reflection in a circuit, etc. For example, Japanese Patent Application Laid-Open Publication No. 3293029 discloses a circuit that prevents echoes by canceling an input signal using a signal having a phase that is an inverse of that of the input signal and having the amplitude level equal to that of the input signal. The configuration disclosed in the above '029 publication needs to set the circuit constants of the circuit elements with high precision to cancel echoes with high precision. However, such a configuration is not easy and this circuit can not cancel echoes with high precision.

Therefore, a method of canceling echoes with high precision using digital processing is considered. FIG. 51 depicts an example of an echo preventing circuit that uses a DSP 400. As depicted, an analog signal indicating sound transmitted from a counterpart using a mobile phone, etc., is inputted into an AD converter 401. The signal converted into a digital signal by the AD converter 401 is applied with convoluting processes respectively by FIR filters 402 and 403 in the DSP 400 respectively based on filter coefficients thereof, and is outputted. A signal outputted from the FIR filter 402 is inputted into a DA converter 404. The signal converted into an analog signal by the DA converter 404 is outputted to an earphone microphone through an input/output terminal 405 and is inputted into one of two terminals of a differential amplifying circuit 406. The signal outputted from the FIR filter 403 is inputted into a DA converter 407. The signal outputted from the DA converter 407 is inputted into the other terminal of the differential amplifying circuit 406.

The signal outputted from the differential amplifying circuit 406 is converted into a digital signal by an AD converter 408 and is inputted into the DSP 400. After being outputted from the DSP 400, this digital signal is converted into an analog signal by a DA converter 409 and is outputted as an output signal of the echo preventing circuit.

The DSP 400 acquires impulse responses of a section from the DA converter 404 to the AD converter 408 based on the output of the AD converter 408 obtained when the DSP 400 outputs an impulse to the DA converter 404. The DSP 400 acquires impulse responses of a section from the DA converter 407 to the AD converter 408 based on the output of the AD converter 408 obtained when the DSP 400 outputs an impulse to the DA converter 407. By setting properly the filter coefficients of the FIR filters 402 and 403 based on these impulse responses, echoes can be canceled with high precision.

Although the configuration shown in FIG. 51 can cancel echoes with high precision, the configuration needs two AD converters and three DA converters and, therefore, causes increase of the cost and the power consumption thereof.

SUMMARY OF THE INVENTION

The object of the present invention is to provide an echo preventing circuit and a digital signal processing circuit that can effectively prevent echoes and can reduce the cost and the power consumption thereof.

In order to achieve the above object, according to a first aspect of the present invention there is provided an echo preventing circuit comprising a filter that is inputted with a first digital signal and outputs a second and a third digital signals; a first DA converter that converts the second digital signal into a first analog signal and outputs the first analog signal; a second DA converter that converts the third digital signal into a second analog signal and outputs the second analog signal; an input/output terminal that outputs the first analog signal or that is inputted with a third analog signal; a subtracting circuit that outputs a fourth analog signal obtained by subtracting the second analog signal from a signal formed by combining the first analog signal and the third analog signal; and an AD converter that converts the fourth analog signal into a fourth digital signal and outputs the fourth digital signal, wherein the filter sets filter coefficients for which the fourth analog signal is a signal formed by removing or attenuating the first analog signal from a signal formed by combining the first analog signal and the third analog signal, based on the fourth digital signal outputted from the AD converter when signals are inputted into the first and the second DA converters while the third analog signal is not present, and wherein the fourth analog signal outputted from the subtracting circuit is outputted as an output signal corresponding to the third analog signal.

The echo preventing circuit may further comprise a switching circuit that can selectively output the fourth analog signal or a fifth analog signal, wherein the switching circuit outputs the fourth analog signal to the AD converter when the filter coefficients of the filter are set, and wherein the switching circuit outputs the fifth analog signal to the AD converter to cause the AD converter to generate the first digital signal by analog/digital-converting the fifth analog signal when the output signal corresponding to the third analog signal is outputted.

In order to achieve the above object, according to a second aspect of the present invention there is provided An echo preventing circuit comprising a filter that is inputted with a first digital signal and outputs a second and a third digital signals; a first DA converter that converts the second digital signal into a first analog signal and outputs the first analog signal; a second DA converter that converts the third digital signal into a second analog signal and outputs the second analog signal; an input/output terminal that outputs the first analog signal or that is inputted with the third analog signal; a subtracting circuit that outputs a fourth analog signal obtained by subtracting the second analog signal from a signal formed by combining the first analog signal and the third analog signal; and an AD converter that converts the fourth analog signal into a fourth digital signal and outputs the fourth digital signal, wherein the filter sets filter coefficients for which the fourth analog signal is a signal formed by removing or attenuating the first analog signal from a signal formed by combining the first analog signal and the third analog signal, based on the fourth digital signal outputted from the AD converter when signals are inputted into the first and the second DA converters while the third analog signal is not present, and wherein the fourth digital signal outputted from the AD converter is outputted as an output signal corresponding to the third analog signal.

The echo preventing circuit may further comprise a first switching circuit that can select whether the first analog signal is outputted to the input/output terminal and the subtracting circuit or the first analog signal is outputted as an output signal; and a second switching circuit that can selectively output the fourth analog signal or a sixth analog signal, wherein the filter converts the first digital signal into the second digital signal and outputs the second digital signal to the first DA converter, when an earphone microphone that converts the first analog signal into sound and outputs the sound and converts sound inputted thereinto into the third analog signal and outputs the third analog signal is connected to the input/output terminal, wherein the filter outputs the first digital signal as the second digital signal, when the earphone microphone is not connected to the input/output terminal, wherein the first switching circuit outputs the first analog signal to the input/output terminal and the subtracting circuit, when the earphone microphone is connected to the input/output terminal, wherein the first switching circuit outputs the first analog signal as an output signal, when the earphone microphone is not connected to the input/output terminal, wherein the second switching circuit outputs the fourth analog signal to the AD converter, when the earphone microphone is connected to the input/output terminal, and wherein the second switching circuit outputs the sixth analog signal to the AD converter to cause the AD converter to generate the fourth digital signal by converting the sixth analog signal thereinto, when the earphone microphone is not connected to the input/output terminal.

The echo preventing circuit may further comprise a detecting circuit that detects the connection state of the earphone microphone to the input/output terminal and outputs the detection signal, wherein the filter converts the first digital signal into the second digital signal and outputs the second digital signal to the first DA converter, when the earphone microphone is connected to the input/output terminal, based on the detection signal, wherein the filter outputs the first digital signal to the first DA converter as the second digital signal, when the earphone microphone is not connected to the input/output terminal, based on the detection signal, wherein the first switching circuit outputs the first analog signal into the input/output terminal and the subtracting circuit, when the earphone microphone is connected to the input/output terminal, based on the detection signal, wherein the first switching circuit outputs the first analog signal as an output signal, when the earphone microphone is not connected to the input/output terminal, based on the detection signal, wherein the second switching circuit outputs the fourth analog signal to the AD converter, when the earphone microphone is connected to the input/output terminal, based on the detection signal, and wherein the second switching circuit outputs the sixth analog signal to the AD converter to cause the AD converter to generate the fourth digital signal by converting the sixth analog signal thereinto, when the earphone microphone is not connected to the input/output terminal, based on the detection signal.

In order to achieve the above object, according to a third aspect of the present invention there is provided A digital signal processing circuit comprising a first input terminal that is inputted with a first digital signal; a filter that is inputted with the first digital signal from the first input terminal and outputs a second and a third digital signals; a first DA converter that converts the second digital signal into and outputs a first analog signal; a second DA converter that converts the third digital signal into and outputs a second analog signal; a first output terminal that outputs the first analog signal; a second output terminal that outputs the second analog signal; a second input terminal that is inputted with a fourth analog formed by subtracting the second analog signal from the second output terminal from a signal formed by combining the first analog signal from the first output terminal and a third analog signal on an input/output signal shared line; an AD converter that converts the fourth analog signal into and outputs a fourth digital signal; and a third output terminal that outputs the fourth digital signal, wherein the filter sets filter coefficients for which the fourth analog signal is a signal formed by removing or attenuating only the first analog signal from a signal formed by combining the first analog signal and the third analog signal, based on the fourth digital signal outputted from the AD converter when signals are inputted into the first and the second DA converters while the third analog signal is not present, and wherein the fourth digital signal outputted from the third output terminal is outputted as an output signal corresponding to the third analog signal.

The digital signal processing circuit may further comprise a third input terminal that is inputted with a detection signal indicative of the connection state to the input/output terminal of an earphone microphone that converts the first analog signal into and outputs sound and that converts sound inputted thereinto into and outputs the third analog signal, wherein the filter converts the first digital signal into and outputs the second digital signal to the first DA converter, when the earphone microphone is connected to the input/output terminal, based on the detection signal, and wherein the filter outputs the first digital signal to the first DA converter as the second digital signal, when the earphone microphone is not connected to the input/output terminal, based on the detection signal.

The other features of the present invention will become apparent from the description herein and the accompanying drawings.

BRIEF DESCRIPTION OF THE DRAWINGS

For more thorough understanding of the present invention and the advantages thereof, the following description should be referenced in conjunction with the accompanying drawings, in which.

DETAILED DESCRIPTION OF THE INVENTION

At least the following items will become clear according to the description herein and the accompanying drawings.

First Embodiment

Figure 1:
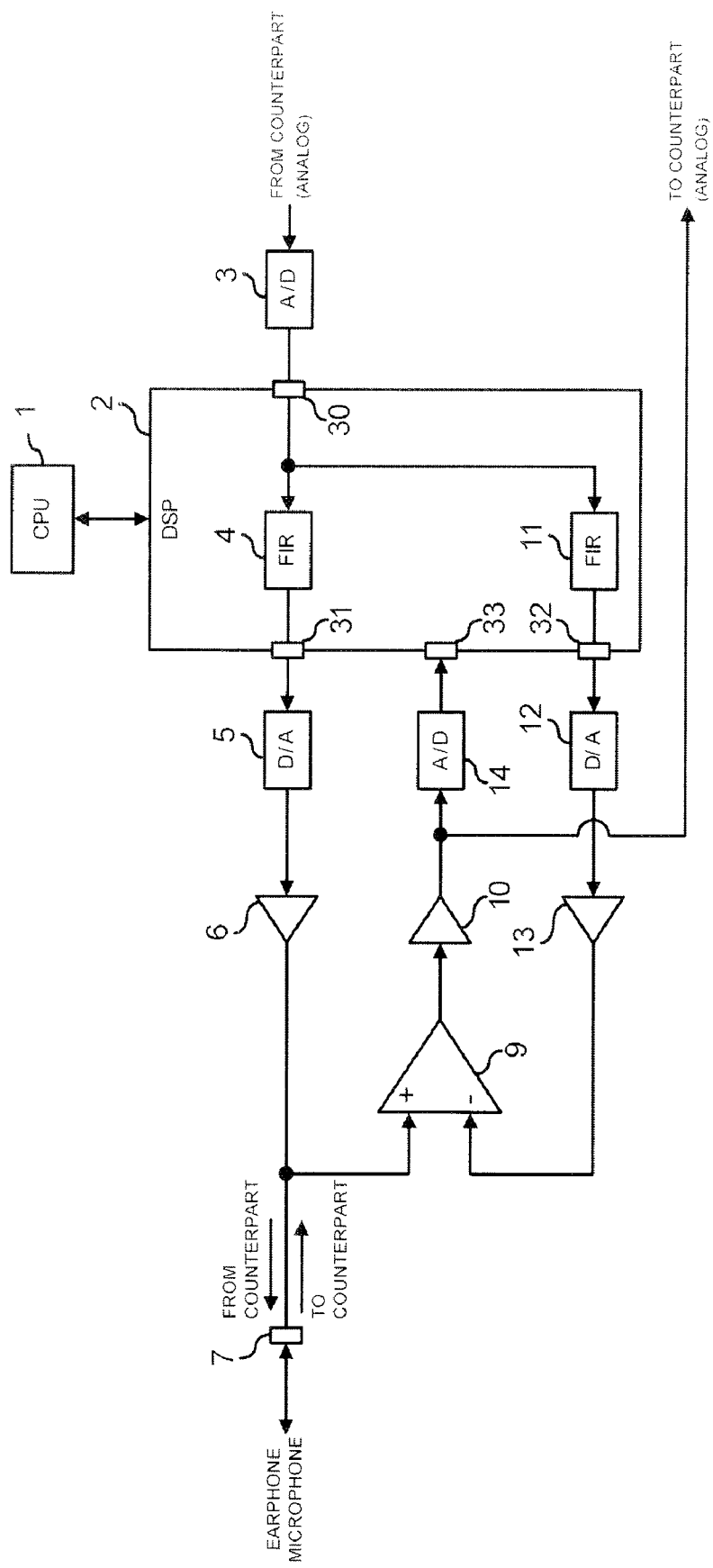
FIG. 1 depicts a block diagram of a first embodiment of an echo preventing circuit and a digital signal processing circuit included in the echo preventing circuit, according to the present invention.

Exemplary Configuration of Echo Preventing Circuit and Digital Signal Processing Circuit Description will be given for an echo preventing circuit and a digital signal processing circuit according to the present invention referring to FIG. 1. FIG. 1 depicts a block diagram of an example of the echo preventing circuit and the digital signal processing circuit (DSP (Digital Signal Processor) 2) included in the echo preventing circuit, according to the present invention.

The echo preventing circuit includes a CPU (Central Processing Unit) 1, the DSP 2, an AD converter 3, a DA converter 5 (a first DA converter), an amplifying circuit 6, an input/output terminal 7, a differential amplifying circuit 9 (a subtracting circuit), an amplifying circuit 10, an AD converter 14, a DA converter 12 (a second DA converter), and an amplifying circuit 13. Though the CPU 1 is a structural requirement in the embodiment, the CPU 1 may not be a structural requirement.

The DSP 2 includes an input terminal 30, an FIR (Finite Impulse Response) filter 4, an output terminal 31, an FIR filter 11, an output terminal 32, and an input terminal 33. The FIR filters 4 and 11 correspond to a filter circuit of the present invention.

The AD converter 3 is inputted with, for example, a sound signal. The AD converter 3 applies an analog/digital conversion process to the sound signal and inputs the obtained digital signal (a first digital signal) into the DSP 2 through the input terminal 30.

The digital signal inputted into the DSP 2 is inputted respectively to the FIR filters 4 and 11. The FIR filter 4 applies a convolution calculating process described below to the digital signal inputted thereinto based on the filter factor of the FIR filter 4 and outputs the obtained digital signal (a second digital signal) to the output terminal 31. Simultaneously, the FIR filter 11 applies the convolution calculating process described below to the digital signal inputted thereinto based on the filter factor of the FIR filter 11 and outputs the obtained digital signal (a third digital signal) to the output terminal 32.

The DA converter 5 is inputted with the output signal from the FIR filter 4 through the output terminal 31. The DA converter 5 applies a digital/analog conversion process to the output signal from the FIR filter 4 and outputs the obtained analog signal (a first analog signal) to the amplifying circuit 6. The amplifying circuit 6 amplifies the analog signal by a predetermined amplification factor and outputs the amplified analog signal.

The input/output terminal 7 is connected to an apparatus that generates sound based on, for example, an analog signal (for example, an earphone microphone or a speaker). The analog signal from the amplifying circuit 6 is outputted to an apparatus connected thereto through the input/output terminal 7. The input/output terminal 7 is connected to, for example, an apparatus that converts sound into a sound signal and outputs the sound signal (for example, an earphone microphone or a microphone). Therefore, the input/output terminal 7 is inputted with a sound signal from an apparatus connected thereto. Through the input/output terminal 7, the sound signal (a third analog signal) is inputted into a positive input terminal of the differential amplifying circuit 9. The signal outputted through the input/output terminal 7 is reflected through the apparatus connected thereto, is inputted from the input/output terminal 7, and is inputted into the positive input terminal of the differential amplifying circuit 9. In this case, the reflected signal refers to collectively signals such as the one that travels back through an earphone microphone, etc., and the one that is formed by converting reflected sound of the sound outputted from the earphone microphone and reflected inside an ear into a sound signal by the earphone microphone. The input/output terminal 7 is not a terminal into which an output signal is inputted or which outputs an input signal, both exclusively. For example, the input/output terminal 7 may simultaneously be inputted with an output signal and output an input signal. An input/output signal shared line is a line that is connected to the input/output terminal 7.

The DA converter 12 is inputted with an output signal from the FIR filter 11 through the output terminal 32. The DA converter 12 applies a digital-to-analog converting process to the output signal from the FIR filter 11 and outputs the obtained analog signal (a second analog signal) to the amplifying circuit 13. The amplifying circuit 13 amplifies the analog signal by a predetermined amplification factor and outputs the amplified analog signal to a negative input terminal of the differential amplifying circuit 9.

The differential amplifying circuit 9 outputs the sound signal from the input/output terminal 7 to the amplifying circuit 10. The amplifying circuit 10 amplifies the sound signal by a predetermined amplification factor and outputs the amplified sound signal to the AD converter 14. The positive input terminal of the differential amplifying circuit 9 is inputted with the analog signal from the amplifying circuit 6. The differential amplifying circuit 9 outputs a signal (a fourth analog signal) formed by amplifying the difference between the analog signal from the amplifying circuit 6 inputted into the positive input terminal of the circuit 9 and the analog signal from the amplifying circuit 13 inputted into the negative input terminal of the circuit 9. The analog signal outputted from the amplifying circuit 10 is outputted as an output signal thereof corresponding to the sound signal from the input/output terminal 7.

The AD converter 14 applies an analog/digital converting process to the sound signal from the amplifying circuit 10 and inputs the obtained digital signal (a fourth digital signal) to the DSP 2 through the input terminal 33. The digital signal inputted through the input terminal 33 is used to set the filter coefficients of the FIR filters 4 and 11.

The CPU 1 controls the entire echo preventing circuit. When the CPU 1 is inputted with, for example, a resetting signal to reset the echo preventing circuit, the CPU 1 outputs to the DSP 2 an instructing signal to cause an impulse response acquiring process described below to be executed. The CPU 1 outputs to the DSP 2, for example, the other logic value "0" as the initial operation of the impulse response acquiring process. Though, in response to the inputting of the resetting signal, the CPU 1 outputs the instructing signal to cause the impulse response acquiring process to be executed in the embodiment, the operation is not limited to this. For example, the CPU 1 may output the above instructing signal to the DSP 2 when the CPU 1 detects turning on of the power to operate the echo preventing circuit. The CPU 1 may output the above instructing signal to the DSP 2 when the CPU 1 detects electric variation of the analog circuit (for example, variation of the amplitude of the output of the amplifying circuit 10).

Details of Configurations of DSP 2 and FIR Filters 4 and 11

Figure 2:
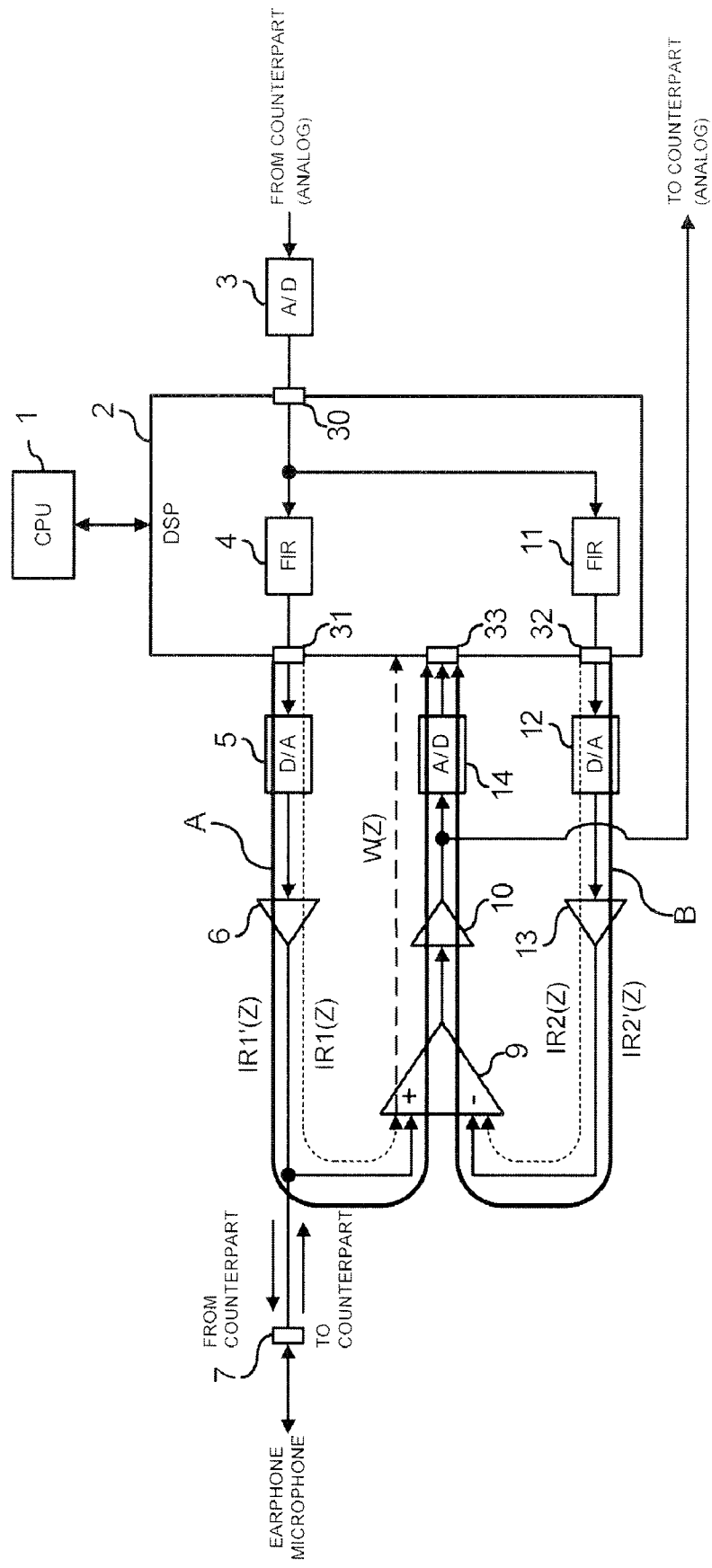
FIG. 2 depicts paths A and B of the echo preventing circuit shown in FIG. 1.
Figure 3:
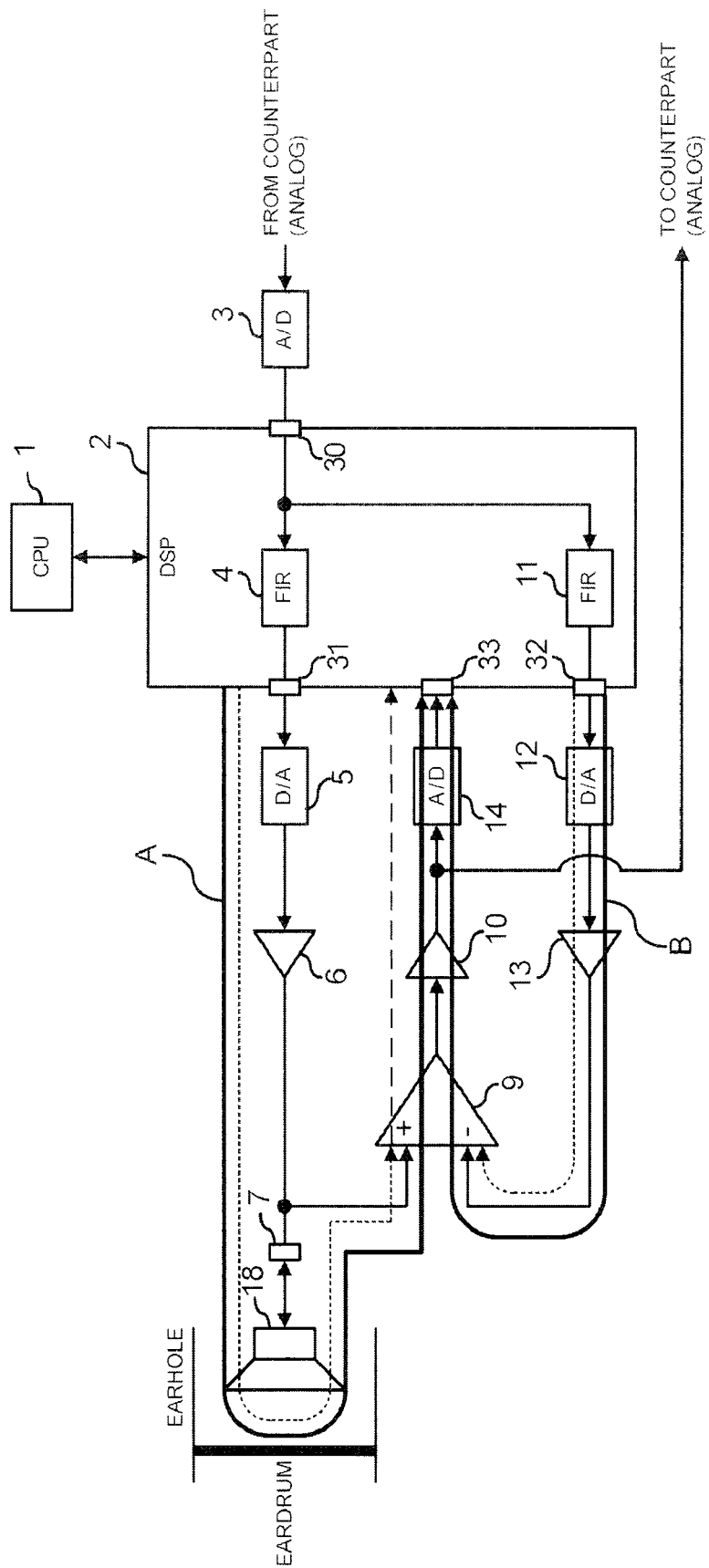
FIG. 3 depicts a diagram of the case where an earphone microphone 18 is included in the path A shown in FIG. 2.
Figure 4A:
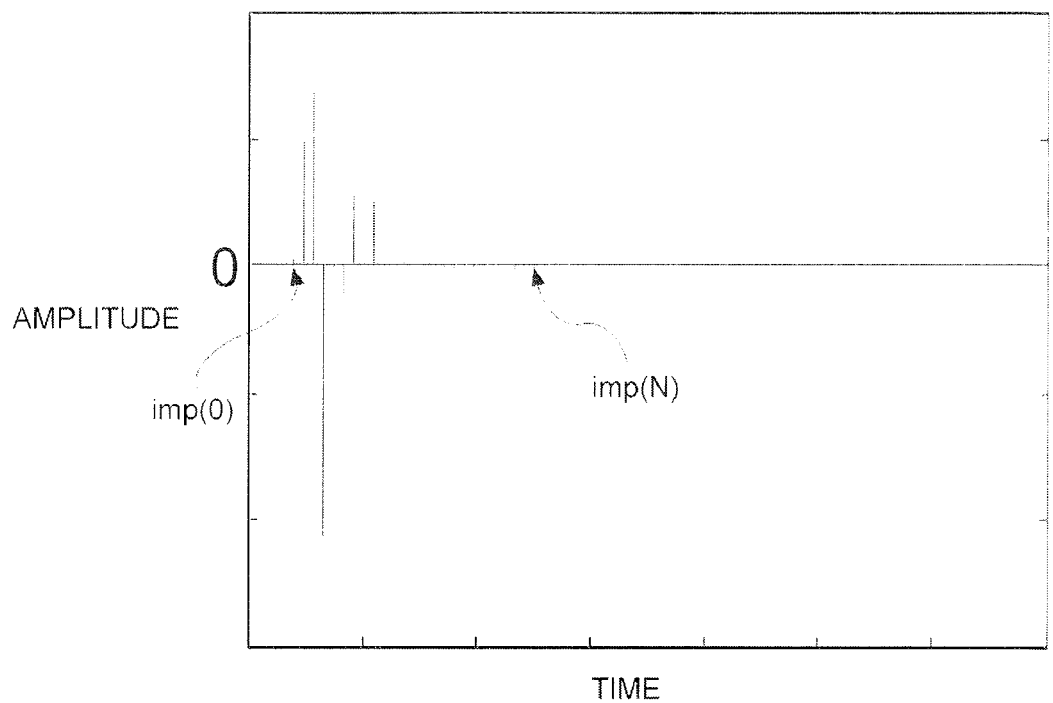
FIG. 4A depicts an impulse response of the path A shown in FIG. 2 or 3.
Figure 4B:
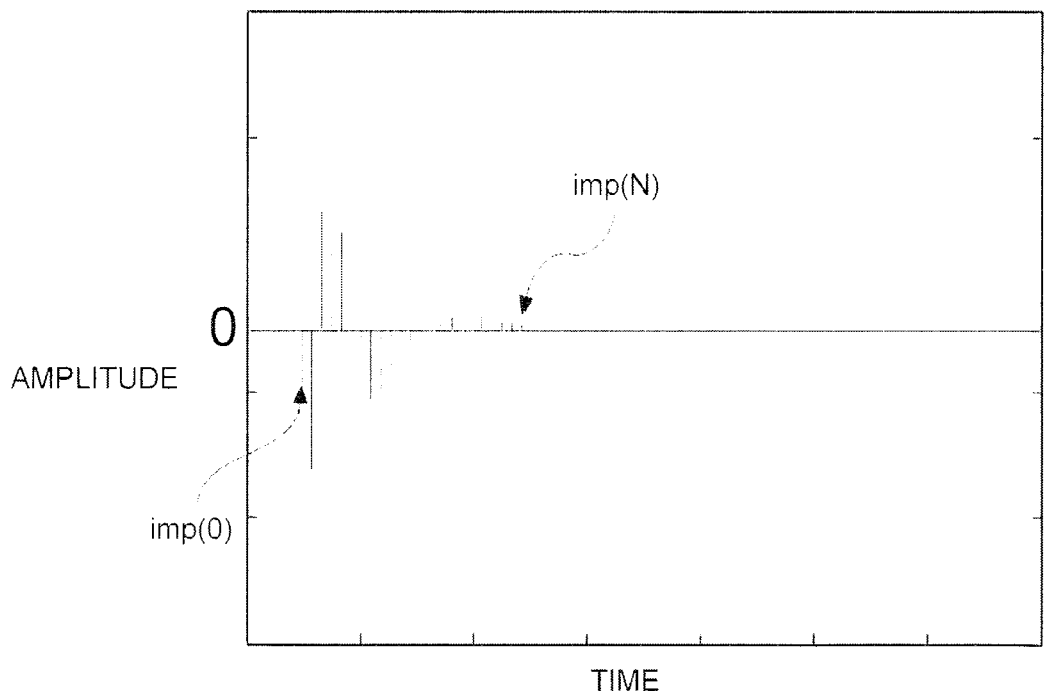
FIG. 4B depicts an impulse response of the path B shown in FIG. 2 or 3.
Figure 5:
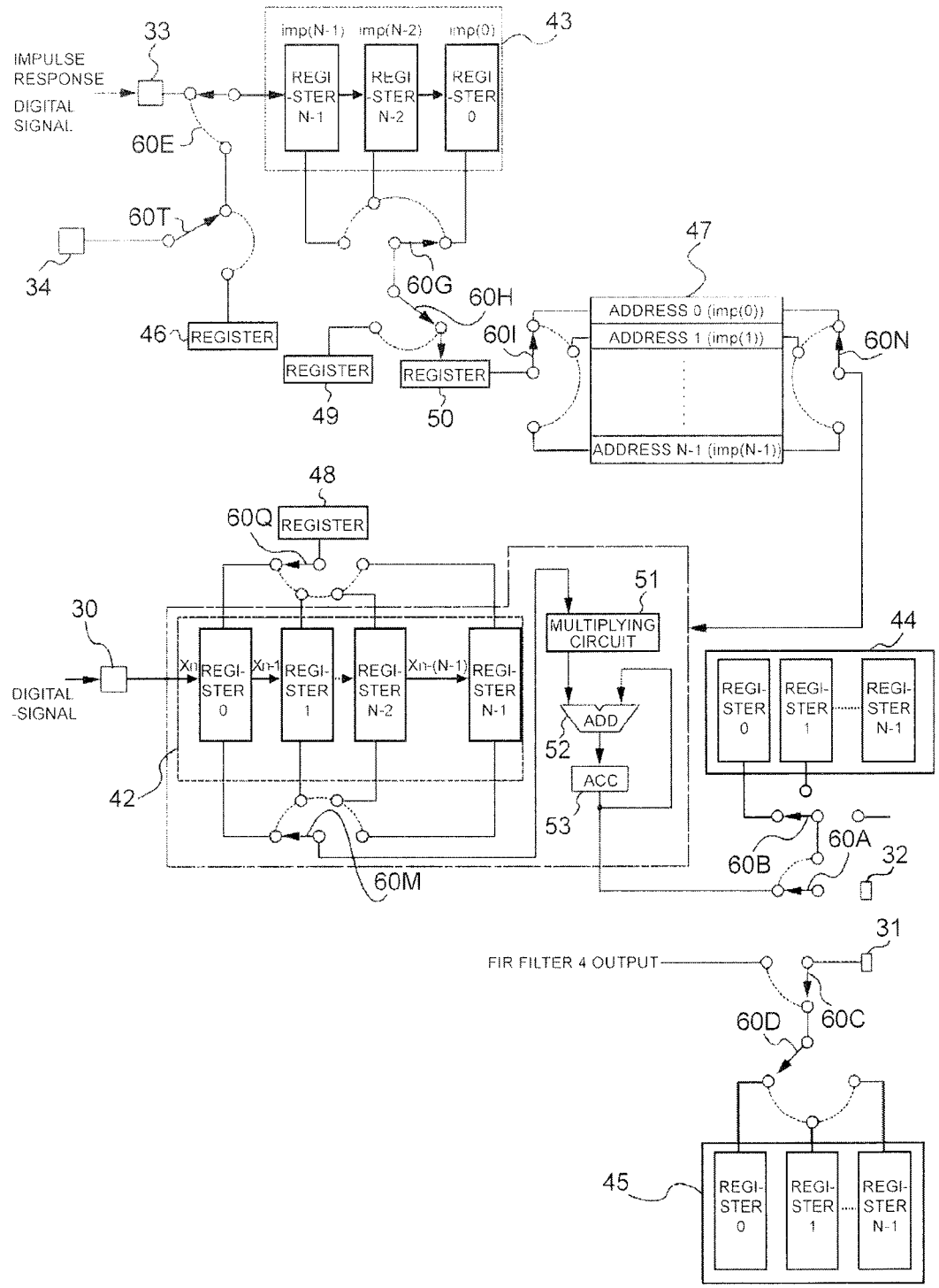
FIG. 5 depicts a part of the configuration of a DSP 2.
Figure 6:
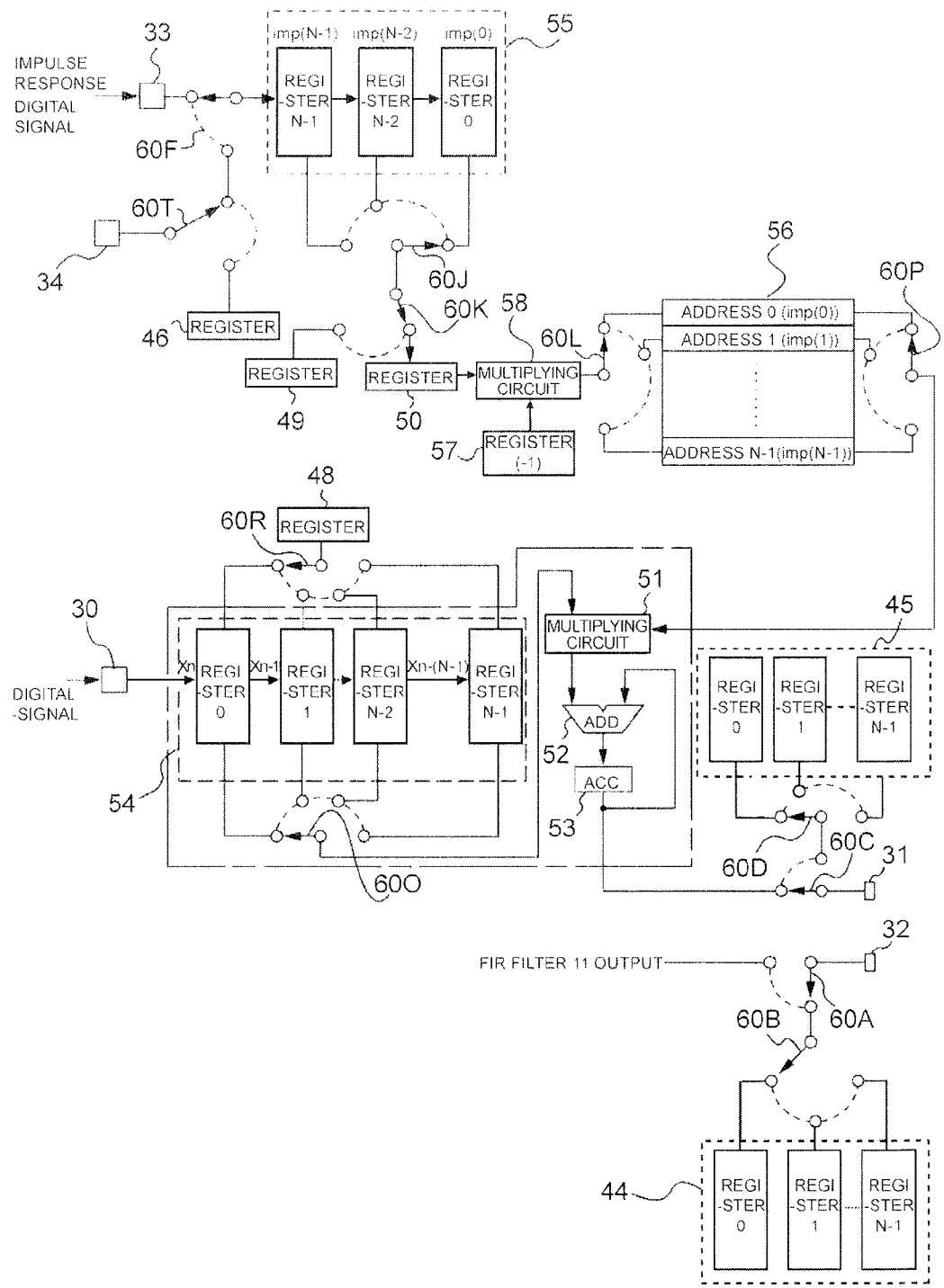
FIG. 6 depicts another part of the configuration of the DSP 2.
Figure 7:
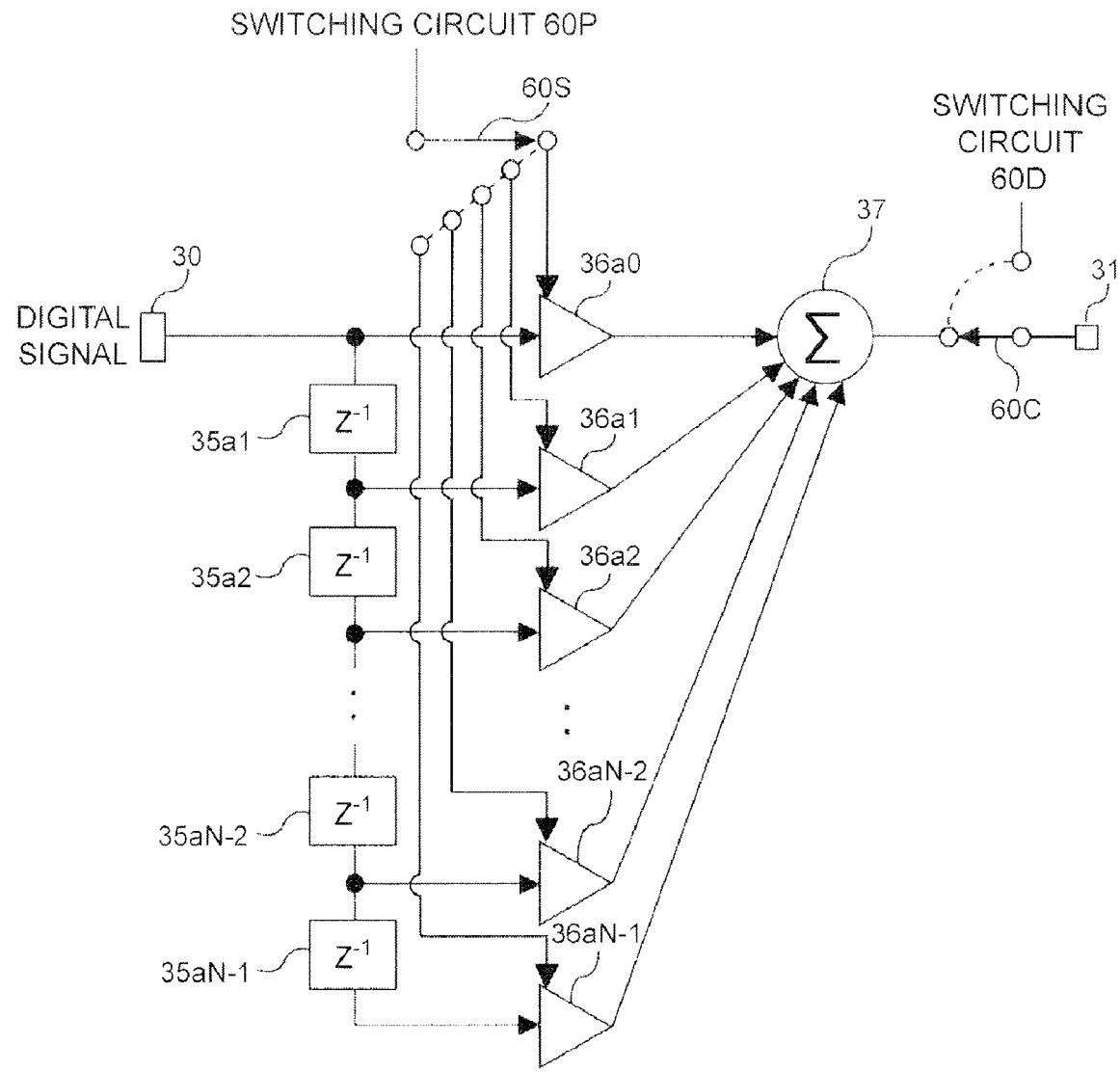
FIG. 7 depicts another example of FIR filters 4 and 11.

Description will be given in detail for the configurations of DSP 2 and the FIR filters 4 and 11 that are structural requirements of the DSP 2 referring to FIGS. 1 to 7. FIG. 2 depicts paths A and B of the echo preventing circuit shown in FIG. 1. FIG. 3 depicts the case where an earphone microphone 18 is included in the path A. FIG. 4A depicts an impulse response IR1'(Z) of the path A shown in FIG. 2 or 3. FIG. 4B depicts an impulse response IR2'(Z) of the path B shown in FIG. 2 or 3. FIG. 5 depicts a block diagram of a part of the configuration of the DSP 2 and, more specifically, depicts a block diagram of the part of the configuration of the DSP 2 to set the filter coefficients of the FIR filter 11 based on the impulse response IR1'(Z) of the path A. FIG. 6 depicts a block diagram of another part of the configuration of the DSP 2 and, more specifically, depicts a block diagram of another part of the configuration of the DSP 2 to set the filter coefficients of the FIR filter 4 based on the impulse response IR2'(Z) of the path B. FIG. 7 depicts another example of the FIR filters 4 and 11.

Description will be given in detail for the configurations of the DSP 2 and the FIR filter 11 referring to FIG. 5.

Together with the FIR filter 11, etc., shown in FIG. 1, the DSP 2 includes an impulse response storing memory 43 (part of a filter coefficient setting unit), an impulse memories 44 and 45, a filter coefficient storing memory 47, registers 46, 48, 49, and 50 (part of the filter coefficient setting unit), and switching circuits 60A to 60E, 60G to 60I (part of the filter coefficient setting unit), 60N, and 60Q.

The FIR filter 11 includes a digital signal memory 42 depicted being surrounded by a dot and dash line of FIG. 5, a multiplying circuit 51, an ADD (an ADDing unit) 52, an ACC (an ACCumulator) 53, and a switching circuit 60M.

Each of the registers 48 and 49 is inputted with the other logic value "0" as above from the CPU 1.

Each of the impulse memories 44 and 45 includes N registers "0" to "N−1". When the impulse response IR1'(Z) of the path A represented by a solid line of FIG. 2 or 3 is acquired in the impulse response acquiring process described below, the register 0 of the impulse memory 45 stores, for example, the one logic value "1". Each of the other registers 1 to N−1 of the impulse memory 45 stores the other logic value "0". Each of the register 46 and the registers 0 to N−1 of the impulse memory 44 stores the other logic value "0".

When the impulse response IR2'(Z) of the path B represented by a solid line of FIG. 2 or 3 is acquired in the impulse response acquiring process described below, the register 0 of the impulse memory 44 stores, for example, the one logic value "1". Each of the other registers 1 to N−1 of the impulse memory 44 stores the other logic value "0". Each of the register 46 and the registers 0 to N−1 of the impulse memory 45 stores the other logic value The impulse response storing memory 43 includes N registers "0" to "N−1". The registers 0 to N−1 of the impulse response storing memory 43 respectively store impulse responses imp(0) to (N−1) (=IR1'(Z)) for each sampling cycle of the path A through the input terminal 33 due to switching by the DSP 2 of the switching circuit 60E to the side of the input terminal 33. For example, the register N−1 stores the impulse response imp(0) through the input terminal 33. The register N−1 stores the next impulse response imp(1) and the register N−2 stores the impulse response imp(0) stored in the register N−1. By repeating this process, the registers 0 to N−1 of the impulse response storing memory 43 respectively store impulse responses imp(0) to (N−1) (=IR1'(Z)). The "sampling cycle" is a temporal interval between adjacent impulse responses of the impulse responses imp(0) to (N−1) shown in FIG. 4A. The impulse response storing memory 43 is cleared by the other logic value "0" stored in the register 49 due to switching by the DSP 2 of the switching circuit 60H to the side of the register 49 and of the switch 60G sequentially from the register 0 to the register N−1.

The filter coefficient storing memory 47 includes N addresses 0 to N−1. The addresses 0 to N−1 of the filter coefficient storing memory 47 store sequentially the impulse responses imp(0) to (N−1) stored in the registers 0 to N−1 of the impulse response storing memory 43 through the register 50 due to switching sequentially the switching circuits 60G and 60I. As a result, the impulse responses imp(0) to (N−1) (=IR1'(Z)) of the path A are set as the filter coefficients of the FIR filter 11. The reason why the impulse responses imp(0) to (N−1) (=IR1'(Z)) of the path A are set as the filter coefficients of the FIR filter 11 will be described for the filter coefficients of the FIR filters 4 and 11 described below.

For the impulse responses imp(0) to (N−1) from the impulse response storing memory 43 to be stored sequentially in the addresses 0 to N−1 of the filter coefficient storing memory 47, the register 50 stores temporarily the impulse responses imp(0) to (N−1).

The digital signal memory 42 includes N registers 0 to N−1. The digital signal memory 42 is inputted sequentially with digital signals from the AD converter 3 through the input terminal 30. The digital signals are each delayed by one sampling cycle due to each of the digital signals being sequentially inputted into the registers 0 to N−1. For example, denoting a digital signal as Xn, the register 0 outputs to the register 1 a signal Xn−1 obtained by delaying the signal Xn by one sampling cycle and the register N−2 outputs a signal Xn−(N−1). The digital signal memory 42 is cleared by the other logic value "0" stored in the register 48 due to switching by the DSP 2 of the switching circuit 60Q sequentially from the register 0 to the register N−1.

The multiplying circuit 51 is inputted with the digital signals Xn, . . . , Xn−(N−1) from the digital signal memory 42 and the filter coefficients imp(0), . . . , (N−1) from the filter coefficient storing memory 47 due to switching by the DSP 2 of the switching circuits 60M and 60N sequentially from the register 0 and the address 0. The multiplying circuit 51 outputs to the ADD 52 the multiplication result obtained by sequentially multiplying the digital signals Xn, . . . , Xn−(N−1) and the filter coefficients imp(0), . . . , (N−1). For example, the multiplying circuit 51 outputs to the ADD 52 the multiplication result obtained by multiplying the digital signal Xn from the digital signal memory 42 and imp(0) from the filter coefficient storing memory 47. The multiplying circuit 51 outputs to the ADD 52 the multiplication result obtained by multiplying Xn−1 from the digital signal memory 42 and imp(1) from the filter coefficient storing memory 47. By repeating this process, the digital signals Xn, . . . , Xn−(N−1) and the filter coefficients imp(0), . . . , (N−1) are multiplied with each other.

The ACC 53 is inputted with the addition result from the ADD 52 and stores the addition result. The ADD 52 outputs the result obtained by adding the multiplication result from the multiplying circuit 51 and the previous addition result of the ADD 52. As a result, the ACC 53 stores Xn·imp(0)+ . . . +Xn−(N−1)·imp(N−1). As a result, the FIR filter 11 has applied the convolution calculating process to the digital signal based on the filter coefficients stored in the filter coefficient storing memory 47. The FIR filter 11 outputs to the output terminal 32 the digital signal having been applied with the convolution calculating process.

Description will be given for the configuration of the DSP 2 and the FIR filter 4 referring to FIG. 6. The components same as those of the DSP 2 and the FIR filter 11 are given the same reference numerals and the description therefor is omitted.

Together with the FIR filter 4, etc., shown in FIG. 1, the DSP 2 includes an impulse response storing memory 55 (part of the filter coefficient setting unit), the impulse memories 44 and 45, a filter coefficient storing memory 56, (the) registers 46, 48 to 50, and 57 (part of the filter coefficient setting unit), a multiplying circuit 58 (part of the filter coefficient setting unit), and (the) switching circuits 60A to 60D, 60F, 60J to 60L (part of the filter coefficient setting unit), 60P, and 60R.

The FIR filter 4 includes the digital signal memory 54 depicted being surrounded by a dot and dash line of FIG. 6, the multiplying circuit 51, the ADD 52, the ACC 53, and a switching circuit 60O. The multiplying circuit 51, the ADD 52, and the ACC 53 are used being shared with the FIR filter 4.

The impulse response storing memory 55 includes N registers "0" to "N−1". The registers 0 to N−1 of the impulse response storing memory 55 respectively stores the impulse responses imp(0) to (N−1) (=IR2'(Z)) for each sampling cycle of the path B through the input terminal 33 due to switching by the DSP 2 of the switching circuit 60F to the side of the input terminal 33. The storage of the impulse responses imp(0) to (N−1) into the registers 0 to N−1 of the impulse response storing memory 55 is same as that of the impulse response storing memory 43 as above. The impulse response storing memory 55 is cleared by the other logic value "0" stored in the register 49 due to switching by the DSP 2 of the switching circuit 60K to the side of the register 49 and of the switch 60J sequentially from the register 0 to the register N−1.

The register 57 stores in advance binary data indicating "−1" to invert by the multiplying circuit 58 the phase of the impulse responses imp(0) to (N−1) stored in the impulse response storing memory 55.

The multiplying circuit 58 outputs to the impulse response storing memory the multiplication result obtained by multiplying the value of the register 50 and the value of the register 57. More specifically, due to switching by the DSP 2 of the switching circuit 60K to the side of the register 50 and the switching circuit 60J sequentially from the register 0, the register 50 is sequentially inputted with the impulse responses imp(0) to (N−1) from the registers 0 to N−1 of the impulse response storing memory 55. Due to sequential multiplication by the multiplying circuit 58 of the value of the register 50 and the value of the register 57, the multi- plication results indicating the phase-inversed impulse responses imp(0) to (N−1) are outputted to the filter coefficient storing memory 56.

The filter coefficient storing memory 56 include N addresses 0 to N−1. The addresses 0 to N−1 of the filter coefficient storing memory 56 store sequentially the impulse responses imp(0) to (N−1) for which the phase is inversed by the multiplying circuit 58 due to switching sequentially the switching circuits 60L. As a result, the phase-inverted impulse responses imp(0) to (N−1) (=IR2'(Z)) of the path B are set as the filter coefficients of the FIR filter 4. The reason why the phase-inverted impulse responses imp(0) to (N−1) of the path B are set as the filter coefficients of the FIR filter 4 will be described for the filter coefficients of the FIR filters 4 and 11 described below.

The digital signal memory 54 includes N registers 0 to N−1. The digital signal memory 54 is inputted sequentially with digital signals from the AD converter 3 through the input terminal 30. The digital signals are each delayed by one sampling cycle due to each of the digital signals being sequentially inputted into the registers 0 to N−1. For example, denoting a digital signal as Xn, the register 0 outputs to the register 1 a signal Xn−1 obtained by delaying the signal Xn by one sampling cycle and the register N−2 outputs a signal Xn−(N−1). The digital signal memory 54 is cleared by the other logic value "0" stored in the register 48 due to switching by the DSP 2 of the switching circuit 60R sequentially from the register 0 to the register N−1.

The same processes as those of the FIR filter 11 as above by the multiplying circuit 51 and the ADD 52 are executed. As a result, the FIR filter 4 has applied the convolution calculating process to the digital signal based on the filter coefficients stored in the filter coefficient storing memory 56. The FIR filter 4 outputs to the output terminal 31 the digital signal having been applied with the convolution calculating process.

Though the FIR filters 4 and 11 have been described as having the above configurations in the embodiment, the configurations are not limited to these. For example, the configurations may be those shown in FIG. 7. In this case, delaying circuits 35a1 to 35aN corresponding to the digital signal memories 42 and 54, multiplying circuits 36a0 to 36aN−1 corresponding to the multiplying circuit 51, and an adding circuit 37 corresponding to the ADD 52 and ACC 53 may be provided. Description will be given for the case where, for example, the FIR filter 4 is provided as having the configuration shown in FIG. 7. As shown in FIG. 7, the FIR filter 4 includes the N−1 delaying circuits 35a1 to 35aN−1 connected in series, N multiplying circuits 36a0 to 36aN−1 that each multiplies digital signals inputted, and the adding circuit 37 that adds outputs from the multiplying circuits 36a0 to 36aN−1.

The N−1 delaying circuits 35a1 to 35aN−1 each delay the digital signal Xn inputted through the input terminal 30 by one sampling cycle and each output the delayed signal. For example, the delaying circuit 35aN−1 outputs the digital signal Xn−1 formed by delaying the phase of the signal Xn by one sampling cycle and the delaying circuit 35aN−1 outputs the digital signal Xn−(N−1).

For the multiplying circuits 36a0 to 36aN−1, the impulse responses imp(0) to (N−1) stored in the filter coefficient storing memory 56 are respectively set as the multiplication coefficients due to sequential switching of the switching circuits 60P and 60S. The multiplying circuits 36a0 to 36aN−1 output the multiplication result obtained by multiplying the digital signals inputted, by the multiplication coefficients respectively set therefor.

The adding circuit 37 adds the outputs from the multiplying circuits 36a0 to 36aN−1. As a result, a convolution calculation same as that of the FIR filter 4 as above can be applied.

Filter Coefficients of FIR Filters 4 and 11

Description will be given in detail for the filter coefficients of the FIR filters 4 and 11 referring to FIGS. 2 and 3. The earphone microphone 18 can be connected to the input/output terminal 7. When an analog signal outputted from the input/output terminal 7 is inputted into the earphone microphone 18, the earphone microphone 18 outputs sound by vibrating a diaphragm not shown based on the analog signal. The earphone microphone 18 generates and outputs an analog signal by capturing using the diaphragm vibration of the eardrum of a person when the person wearing the earphone microphone 18 in his/her ear emanates sound. The analog signal outputted from the earphone microphone 18 is inputted from the input/output terminal 7.

As above, the analog signal from the amplifying circuit 6 may be outputted to not only the input/output terminal 7 but also the positive input terminal of the differential amplifying circuit 9. That is, the positive input terminal of the differential amplifying circuit 9 is inputted with a signal formed by combining the analog signal from the amplifying circuit 6 and the signal inputted into the input/output terminal 7. In this case, echoes are generated due to the analog signal. Otherwise, echoes are generated due to the sound signal inputted from the input/output terminal 7 and the analog signal from the amplifying circuit 6 being superposed on each other and inputted into the positive input terminal of the differential amplifying circuit 9. The filter coefficients of the FIR filters 4 and 11 are set such that the echoes are prevented.

The impulse response (the transfer function) of a section from the output terminal 31 to the positive input terminal of the differential amplifying circuit 9 indicated by a dotted line of FIG. 2 or 3 is set as IR1(Z). The impulse response (the transfer function) of a section from the output terminal 32 to the negative input terminal of the differential amplifying circuit 9 indicated by a dotted line of FIG. 2 or 3 is set as IR2(Z). The impulse response (the transfer function) of a section from the latter stage of the positive/negative input terminal of the differential amplifying circuit 9 to the input terminal 33 indicated by a dotted line of FIG. 2 or 3 is set as W(Z).

In this case, the impulse response (the transfer function) IR1'(Z) of the path A indicated by a solid line of the FIG. 2 or 3 is as IR1'(Z)=IR1(Z)·W(Z). The impulse response (the transfer function) IR2'(Z) of the path B indicated by a solid line of the FIG. 2 or 3 is as IR2'(Z)=−IR2(Z)·W(Z). The reason why the phase of IR2(Z) is inversed is because the signal is inputted into the negative input terminal of the differential amplifying circuit 9.

Assuming that the filter factor of the FIR filter 4 is −IR2'(Z) formed by inverting the phase of IR2'(Z), the characteristic IRa11_1(Z) of a section from the input of the FIR filter 4 to the input terminal 33 is as follows.

$$IRall\_1(Z) = -IR2'(Z) \cdot IR1'(Z)$$
$$= (-(-IR2(Z) \cdot W(Z)) \cdot (IR1(Z) \cdot W(Z))$$
$$= IR2(Z) \cdot W(Z) \cdot IR1(Z) \cdot W(Z)$$

Assuming that the filter coefficients of the FIR filter 11 are IR1'(Z), the characteristic IRa11_2(Z) of a section from the input of the FIR filter 11 to the input terminal 33 is as follows.

$$IRall\_2(Z) = IR1'(Z) \cdot IR2'(Z)$$
$$= IR1(Z) \cdot W(Z) \cdot (-IR2(Z) \cdot W(Z))$$
$$= IR1(Z) \cdot W(Z) \cdot (-IR2(Z)) \cdot W(Z)$$
$$= -IRall\_1(Z)$$

That is, it can be seen that the characteristic IRa11_1(Z) of the section from the input of the FIR filter 4 to the input terminal 33 and the characteristic IRa11_2(Z) of the section from the input of the FIR filter 11 to the input terminal 33 each have a characteristic of canceling each other. As a result, it can be seen that −IR2'(Z) obtained by inverting the phase of IR2'(Z) may be set as the filter coefficients of the FIR filter 4 and IR1'(Z) may be set as the filter coefficients of the FIR filter 11.

Assuming that the filter coefficients of the FIR filter 4 are IR2'(Z), the characteristic IRa11_1(Z) of the section from the input of the FIR filter 4 to the input terminal 33 is as follows.

$$IRall\_1(Z) = IR2'(Z) \cdot IR1'(Z)$$
$$= (-IR2(Z) \cdot W(Z)) \cdot (IR1(Z) \cdot W(Z))$$
$$= -IR2(Z) \cdot W(Z) \cdot IR1(Z) \cdot W(Z)$$

Assuming that the filter coefficients of the FIR filter 11 are −IR1'(Z) obtained by inverting the phase of IR1'(Z), the characteristic IRa11_2(Z) of a section from the input of the FIR filter 11 to the input terminal 33 is as follows.

$$IRall\_2(Z) = -IR1'(Z) \cdot IR2'(Z)$$
$$= (-(IR1(Z) \cdot W(Z))) \cdot (-IR2(Z) \cdot W(Z))$$
$$= IR1(Z) \cdot W(Z) \cdot IR2(Z) \cdot W(Z)$$
$$= -IRall\_1(Z)$$

That is, it can be seen that the characteristic IRa11_1(Z) of the section from the input of the FIR filter 4 to the input terminal 33 and the characteristic IRa11_2(Z) of the section from the input of the FIR filter 11 to the input terminal 33 each have a characteristic of canceling each other. As a result, it can be seen that IR2'(Z) may be set as the filter coefficients of the FIR filter 4 and IR1'(Z) may be set as the filter coefficients of the FIR filter 11.

By setting the filter coefficients of the FIR filters 4 and 11 as above, the differential amplifying circuit 9 can cancel the signal traveling on the path A using the signal traveling on the path B. As a result, the above echoes generated when the digital signal is inputted into the input terminal 30 can be prevented.

As shown in FIG. 3, by acquiring the impulse response IR1'(Z) while the earphone microphone 18 is connected, and setting IR1'(Z) as the filter coefficients of the FIR filter 11, effective echo prevention can be executed corresponding to the transfer characteristics of the earphone microphone 18.

By acquiring the impulse response IR1'(Z) while the connected earphone microphone 18 is set to the ear by inserting the earphone microphone 18 into the earhole or covering the ear pinna with the earphone microphone 18, and setting IR1'(Z) as the filter coefficients of the FIR filter 11, effective echo prevention can be executed corresponding to the transfer characteristic of the earphone microphone 18 and the transfer characteristic of the interior of the ear of the user.

The echo preventing circuit shown in the embodiment outputs the analog signal outputted from the amplifying circuit 10, as an analog signal corresponding to the sound signal from the input/output terminal 7. Therefore, no DA converter is necessary to convert again the digital signal outputted from the AD converter 14 into an analog signal and, therefore, the cost and the power consumption can be reduced.

Figure 8:
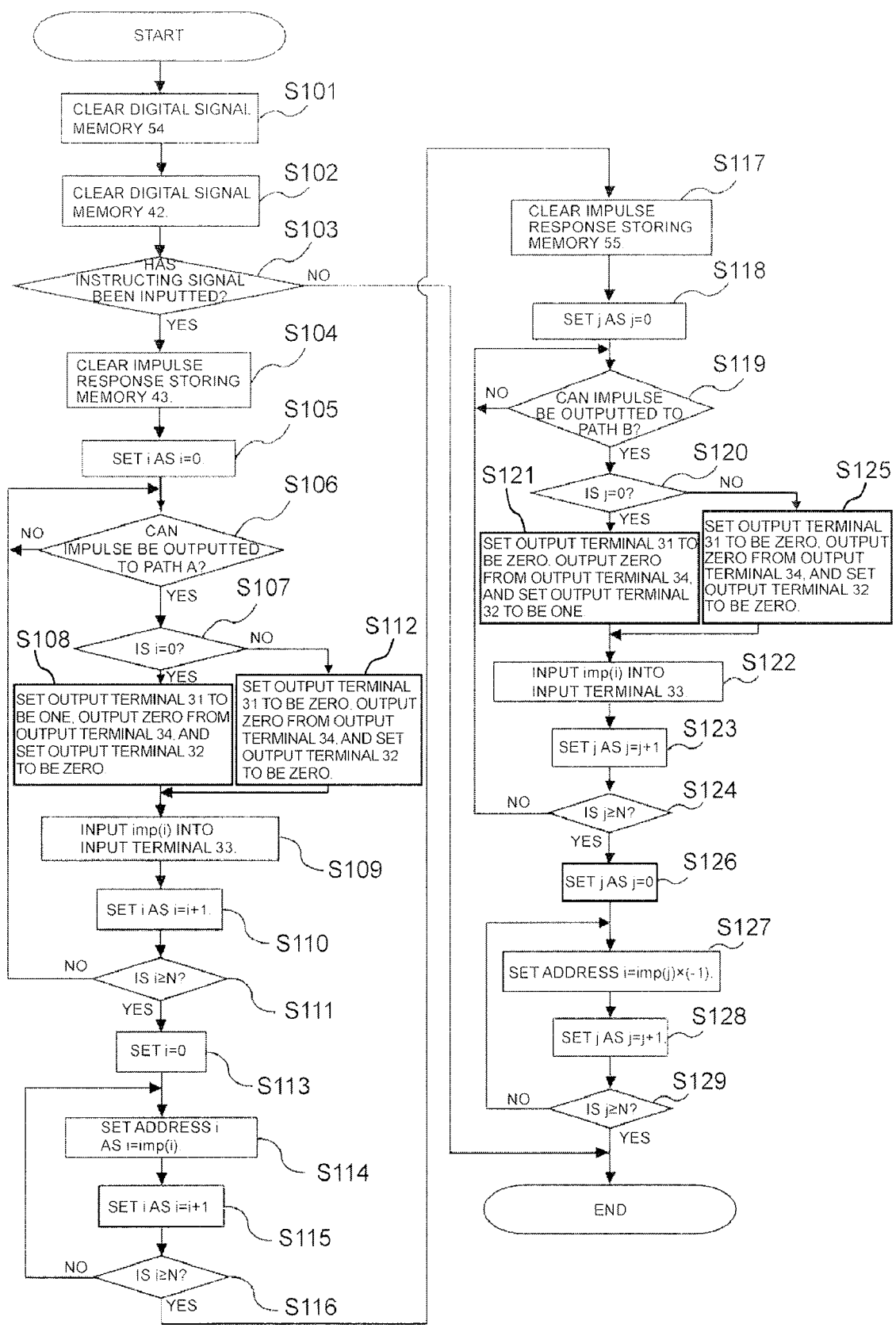
FIG. 8 depicts a flowchart of a process operation of an echo preventing circuit and a digital signal processing circuit included in the echo preventing circuit, according to the present invention.

Setting of Filter Coefficients of FIR Filters 4 and 11 by Impulse Response Acquiring Process Referring to FIGS. 1 to 6 and 8, description will be given for the operations of an impulse response acquiring process by the echo preventing circuit and the digital signal processing circuit included in the echo preventing circuit and setting of the filter coefficients of the FIR filters 4 and 11, according to the present invention. FIG. 8 depicts a flow-chart of an example of the operation of an echo preventing circuit and a digital signal processing circuit included in the echo preventing circuit, according to the present invention.

When the CPU 1 is inputted with, for example, a resetting signal to reset the echo preventing circuit, the CPU 1 outputs to the DSP 2 an instructing signal to cause the DSP 2 to execute the impulse response acquiring process. The CPU 1 outputs to the DSP 2 the other logic value "0" as the initial operation of the impulse response acquiring process. The other logic value "0" inputted into the DSP 2 is inputted into the registers 48 and 49.

The DSP 2 switches the switching circuit 60R sequentially from the register 0 to the register N−1 of the digital signal memory 54. As a result, the contents of the registers 0 to N−1 of the digital signal memory 54 are cleared by the other logic value "0" stored in the register 48 (S101). Similarly, the DSP 2 switches the switching circuit 60Q sequentially from the register 0 to the register N−1 of the digital signal memory 42. As a result, the registers 0 to N−1 of the digital signal memory 42 are cleared by the other logic value "0" stored in the register 48 (S102). The DSP 2 judges whether the above instructing signal is inputted from the CPU 1 (S103).

When the DSP 2 judges that the instructing signal is inputted from the CPU 1 (S103: YES), DSP 2 switches the switching circuit 60H to the side of the register 49 and switches the switching circuit 60G sequentially from the register 0 to the register N−1. As a result, the contents of the register 0 to the register N−1 of the impulse response storing memory 43 are cleared by the other logic value "0" stored in the register 49 (S104). Description will be given hereinafter denoting an "i"th impulse response to be stored in the impulse response storing memory 43 as imp(i) (i=0, . . . , N−1). The DSP 2 sets i as i=0 (S105) to acquire an impulse response imp(0) to be stored in the register N−1 of the impulse response storing memory 43, sets the input terminal 30 at a high impedance, and, thereafter, executes the following processes.

The DSP 2 judges whether an impulse output from the output terminal 31 to the path A is possible (S106) to acquire the impulse response imp(0) of the path A shown in FIG. 2 or 3. For example, the judgment by the DSP 2 is executed by judging whether the state is present where a signal is being outputted from the output terminal 31 and a signal is being inputted into the input terminal 33. If an impulse is outputted in the state where a signal is being outputted from the output terminal 31 and a signal is being inputted into the input terminal 33, an accurate impulse response imp(0) may not be acquired.

When the DSP 2 judges that an impulse output to the path A is possible (S106·YES), the DSP 2 judges whether i=0 (S107). Because i=0 at S105, the DSP 2 judges that i=0 (S107·YES). The DSP 2 causes the register 0 of the impulse memory 45 to store the one logic value "1". The DSP 2 also causes each of the other registers 1 to N−1 of the impulse memory 45, the register 46, and the registers 0 to N−1 of the impulse memory 44 to store the other logic value "0". The DSP 2 switches the switching circuit 60C to the side of the impulse memory 45, the switching circuit 60A to the side of the impulse memory 44, and the switching circuit 60T to the side of the register 45. The DSP 2 switches the switching circuit 60E to the side of the input terminal 33. The DSP 2 switches each of the switching circuits 60D and 60B to the side of the register 0. As a result, an impulse caused by the one logic value "1" stored in the register 0 of the impulse memory 45 is outputted from the output terminal 31 (S108). The impulse outputted from the output terminal 31 travels on the path A and is inputted into the input terminal 33 (S109). As a result, the impulse response imp(0) can be acquired (FIG. 4A·imp(0)). This impulse response imp(0) is first stored in the register N−1 of the impulse response storing memory 43.

To acquire an impulse response imp(1), the DSP 2 increments i to be i=i+1=1 (S110). Because the acquired impulse response has not yet reached imp(N−1), the DSP 2 judges that i is not i≧N (S111·NO) and the process of the above S106 is repeated once again. Because i=1≠0 at S110 (S107·NO), the DSP 2 switches the switching circuits 60D and 60B to the side of the register 1. As a result, the output terminal 31 outputs no impulse (S112). Therefore, the input terminal 33 is inputted with an impulse imp(1) formed by delaying by one sampling cycle the phase of the impulse outputted at S108. This impulse response imp(1) is stored in the register N−1 of the impulse response storing memory 43 and the impulse response imp(0) stored in the register N−1 is stored in the register N−2. In this manner, by repeating the processes at S106 to S111 until i≧N (S111·YES), impulse responses imp(0) to imp(N−1) (=IR1'(Z)) are acquired. As a result, the registers 0 to N−1 of the impulse response storing memory 43 respectively store the impulse responses imp(0) to imp(N−1).

To cause the addresses 0 to N−1 of the filter coefficient storing memory 47 to store the impulse responses imp(0) to imp(N−1) stored in the registers 0 to N−1 of the impulse response storing memory 43, the DSP 2 switches the switching circuit 60H to the side of the register 50, and each of the switching circuits 60G and 60I sequentially from the register 0 and the address 0. More specifically, the DSP 2 sets i to be i=0 (S113) to cause the address 0 to store the impulse response imp(0). The DSP 2 switches the switching circuit 60G to the register 0 and the switching circuit 60I to the address 0. As a result, the address 0 of the filter coefficient storing memory 47 stores the impulse response imp(0) (S114). To cause the address 1 of the filter coefficient storing memory 47 to store the impulse response imp(1), the DSP 2 sets i to be i=i+1=1 (S115). Because the impulse responses are not stored to the address N−1 of the filter coefficient storing memory 47, the DSP 2 judges that i is not i≧N (S116·NO) and repeats the above process at S114 once again. That is, the DSP 2 switches the switching circuit 60G to the register 1 and the switching circuit 601 to the address 1. As a result, the address 1 stores the impulse response imp(1) (S114). By repeating the above processes at S114 to S116 until i is i≧N (S116·YES), the addresses 0 to N−1 of the filter coefficient storing memory 47 respectively store the impulse responses imp(0) to imp(N−1). That is, the filter coefficients of the FIR filter 11 are set.

The DSP 2 switches the switching circuit 60K to the side of the register 49 and the switching circuit 60J sequentially from the register 0 to the register N−1. As a result, the register 0 to the register N−1 of the impulse response storing memory 55 are cleared by the other logic value "0" stored in the register 49 (S117). Description will be given hereinafter denoting a "j"th impulse response to be stored in the impulse response storing memory 55 as imp(j) (j=0, . . . , N−1). The DSP 2 sets j as j=0 (S118) to acquire an impulse response imp(0) to be stored in the register N−1 of the impulse response storing memory 55 and executes the following processes.

The DSP 2 judges whether an impulse output to the path B is possible (S119) to acquire the impulse response imp(0) of the path B shown in FIG. 2 or 3. This judgment by the DSP 2 is same as that at S106 as above.

When the DSP 2 judges that an impulse output to the path B is possible (S119·YES), the DSP 2 judges whether j=0 (S120). Because j=0 at S118, the DSP 2 judges that j=0 (S120·YES). The DSP 2 causes the register 0 of the impulse memory 44 to store the one logic value "1". The DSP 2 also causes each of the other registers 1 to N−1 of the impulse memory 44, the register 46, and the registers 0 to N−1 of the impulse memory 45 to store the other logic value "0". The DSP 2 switches the switching circuit 60F to the side of the input terminal 33. The DSP 2 switches each of the switching circuits 60D and 60B to the register 0. As a result, an impulse caused by the one logic value "1" stored in the register 0 of the impulse memory 44 is outputted from the output terminal 32 (S121). The impulse outputted from the output terminal 32 travels on the path B and is inputted into the input terminal 33 (S122). As a result, the impulse response imp(0) can be acquired (FIG. 4B·imp(0)). This impulse response imp(0) is first stored in the register N−1 of the impulse response storing memory 55.

To acquire an impulse response imp(1), the DSP 2 increments j to be j=j+1=1 (S123). Because the acquired impulse response has not yet reached imp(N−1), the DSP 2 judges that i is not i≧N (S124·NO) and the process at the above S119 is repeated once again. Because j=1≠0 at S123 (S120·NO), the DSP 2 switches each of the switching circuits 60D and 60B to the side of the register 1. As a result, the output terminal 32 outputs no impulse (S125). Therefore, the input terminal 33 is inputted with an impulse imp(1) formed by delaying by one sampling cycle the phase of the impulse outputted at S121. This impulse response imp(1) is stored in the register N−1 of the impulse response storing memory 55 and the impulse response imp(0) stored in the register N−1 is stored in the register N−2. In this manner, by repeating the processes at S119 to S124 until i≧N (S124·YES), impulse responses imp(0) to imp(N−1) (=IR2' (Z)) are acquired. As a result, the registers 0 to N−1 of the impulse response storing memory 55 store the impulse responses imp(0) to imp(N−1).

To cause the phase of the impulse responses imp(0) to imp(N−1) stored in the registers 0 to N−1 of the impulse response storing memory 55 to be inverted and to cause the addresses 0 to N−1 of the filter coefficient storing memory 56 to store these impulse responses imp(0) to imp(N−1), the DSP 2 switches the switching circuit 60K to the side of the register 50, and each of the switching circuits 60J and 60L sequentially from the register 0 and the address 0. The DSP 2 sets j to be j=0 (S126) to cause the address 0 to store the phase-inverted impulse response imp(0). The DSP 2 switches the switching circuit 60J to the register 0 and the switching circuit 60L to the address 0. At this time, the phase of imp(0) from the register 0 is inverted by multiplying the imp(0) by the value of the register 57 in the multiplying circuit 58. As a result, the address 0 of the filter coefficient storing memory 47 stores the phase-inverted impulse response imp(0) (S127). To cause the address 1 of the filter coefficient storing memory 47 to store the impulse response imp(1), the DSP 2 sets j to be j=j+1=1 (S128). Because the impulse responses are not stored to the address N−1 of the filter coefficient storing memory 56, the DSP 2 judges that j is not j≧N (S129·NO) and repeats the above process at S127 once again. That is, the DSP 2 switches the switching circuit 60J to the register 1 and the switching circuit 60L to the address 1. The phase of imp(1) from the register 1 is inverted by multiplying imp(1) by the value of the register 57 in the multiplying circuit 58. As a result, the address 1 stores the phase-inverted impulse response imp(1) (S127). By repeating the above processes at S127 to S129 until i is i≧N (S129·YES), the addresses 0 to N−1 of the filter coefficient storing memory 56 respectively store the impulse responses imp(0) to imp(N−1). That is, the filter coefficients of the FIR filter 4 are set.

Though the description has been given using hardware (for example, the switching circuit 60) about the above processes according to the above embodiment, the present invention is not limited to this. For example, the above processes may be stored in advance in a ROM (Read Only Memory), etc., as program data and a processor included in the DSP 2 may read the program data and may execute the processes.

Second Embodiment

Figure 9:
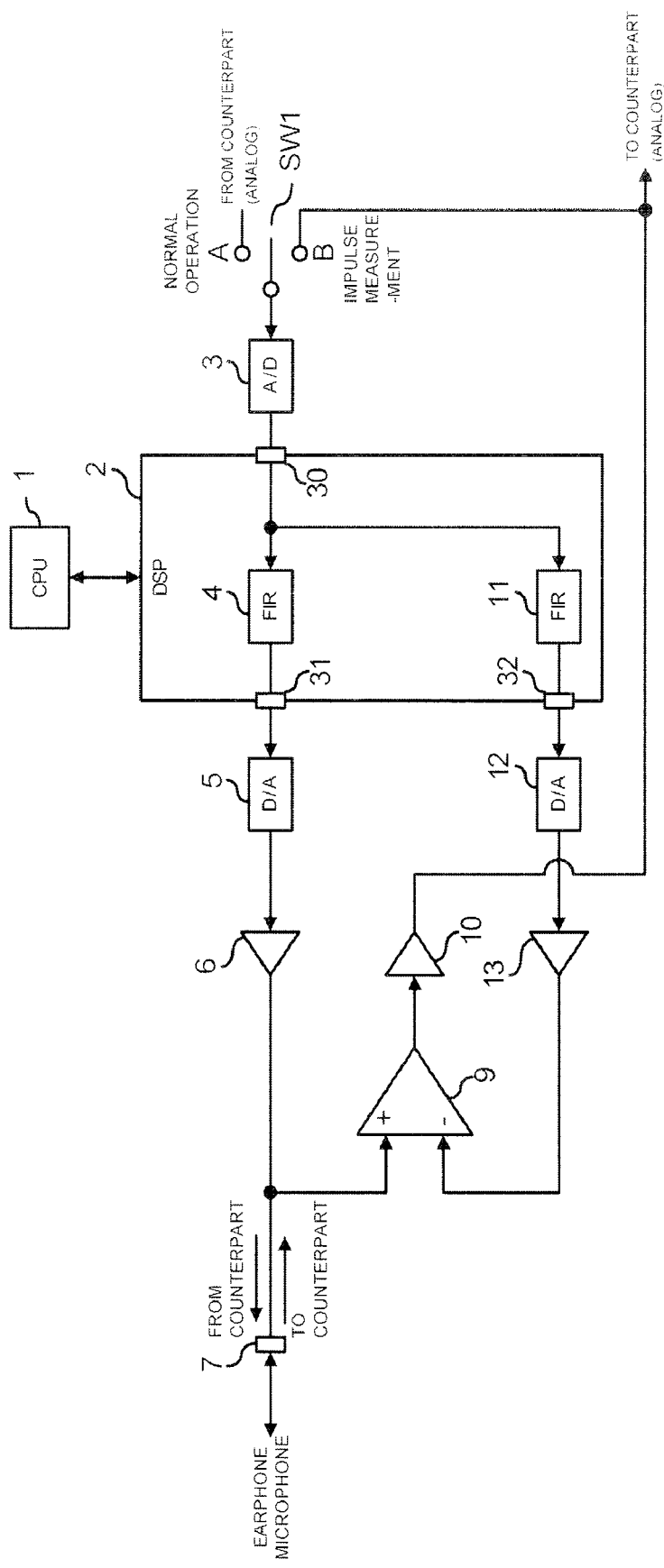
FIG. 9 depicts a block diagram of a second embodiment of the echo preventing circuit and the digital signal processing circuit included in the echo preventing circuit, according to the present invention.

Exemplary Configurations of Echo Preventing Circuit and Digital Signal Processing Circuit FIG. 9 depicts a second embodiment. FIG. 9 depicts a block diagram of an example of the echo preventing circuit and the digital signal processing circuit included in the echo preventing circuit, according to the present invention. In the echo preventing circuit shown in FIG. 9, the structural requirements same as those of the above first embodiment are given the same reference numerals and the description therefor is omitted. The echo preventing circuit does not include the AD converter 14 in the configuration of the first embodiment and, instead, includes a switching circuit SW1.

The switching circuit SW1 is inputted with an analog signal indicating the sound transmitted from a counterpart (a fifth analog signal) and an analog signal outputted from the amplifying circuit 10 (a fourth analog signal). The switching circuit SW1 selects either one of these input signals and outputs the selected signal to the AD converter 3 according to the control of the CPU 1, etc.

That is, in the embodiment, an impulse response can be acquired by switching the switching circuit SW1 to the side of "B". At this time, the AD converter 3 substitutes for the AD converter 14 in the first embodiment. When a process is executed to the sound transmitted from the counterpart, the switching circuit SW1 is switched to the side of "A".

By configuring as above, the AD converter 14 used in the first embodiment is not necessary and the cost and the power consumption can be reduced more.

Third Embodiment

Figure 10:
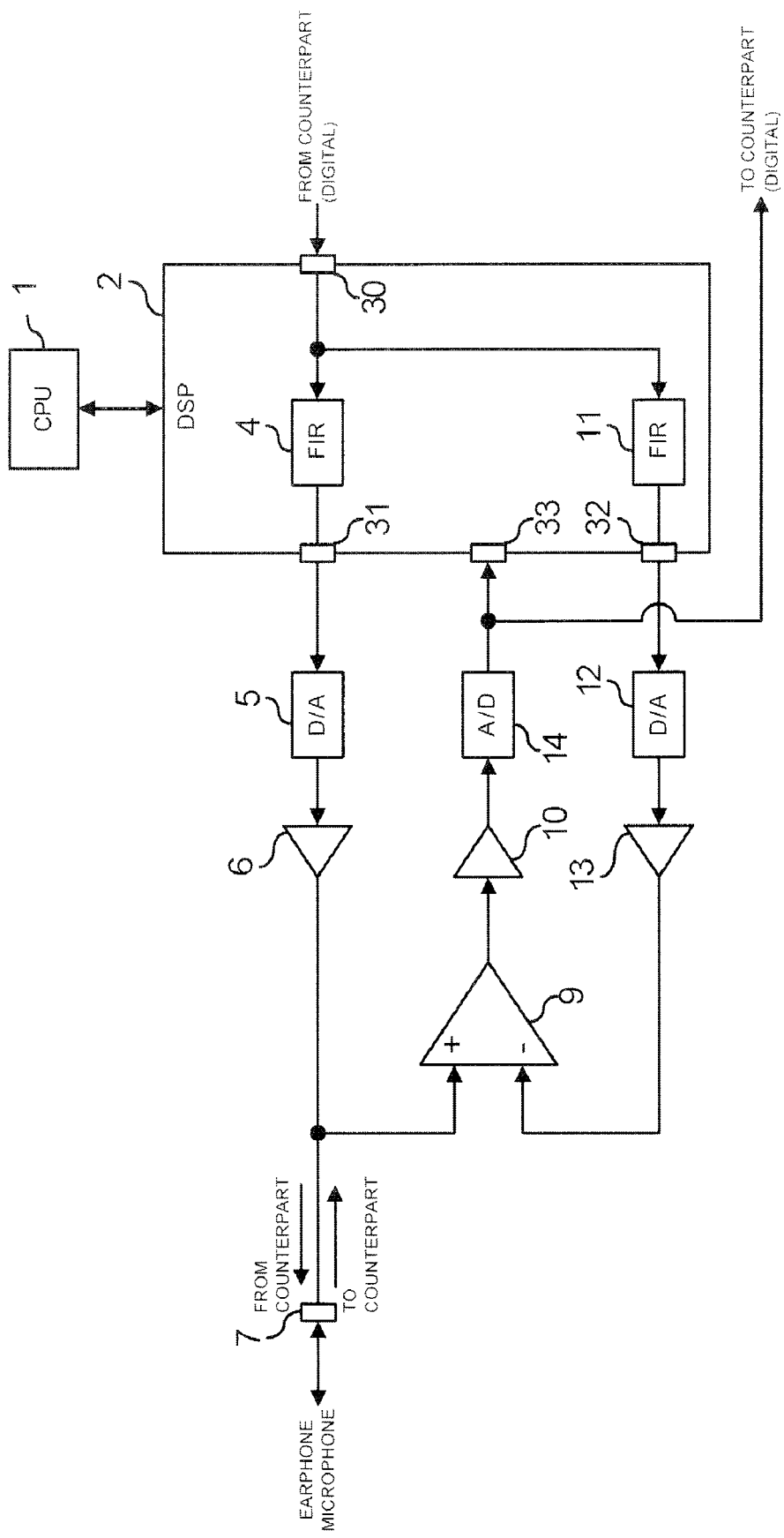
FIG. 10 depicts a block diagram of a third embodiment of the echo preventing circuit and the digital signal processing circuit included in the echo preventing circuit, according to the present invention.

Exemplary Configurations of Echo Preventing Circuit and Digital Signal Processing Circuit FIG. 10 depicts a third embodiment. FIG. 10 depicts a block diagram of an example of the echo preventing circuit and the digital signal processing circuit included in the echo preventing circuit, according to the present invention. In the echo preventing circuit shown in FIG. 10, the structural requirements same as those of the above first embodiment are given the same reference numerals and the description therefor is omitted. The echo preventing circuit does not include the AD converter 3 in the configuration of the first embodiment.

In the embodiment, a signal indicating the sound transmitted from the counterpart is inputted into the input terminal 30 as a digital signal. A signal outputted to the counterpart is a digital signal outputted from the AD converter 14. By configuring the echo preventing circuit as above, the interfacing signal between the echo preventing circuit and apparatuses, etc., applied with the circuit may be a digital signal. That is, when the echo preventing circuit is applied to an apparatus that can output a digital signal, the outputted digital signal does not need to be converted into an analog signal by any DA converter to interface with the echo preventing circuit and no output signal from the echo preventing circuit needs to be converted into a digital signal by any AD converter. Therefore, the AD converter and the DA converter can be excluded and, therefore, cost reduction and power consumption reduction can be realized.

Fourth Embodiment

Figure 11:
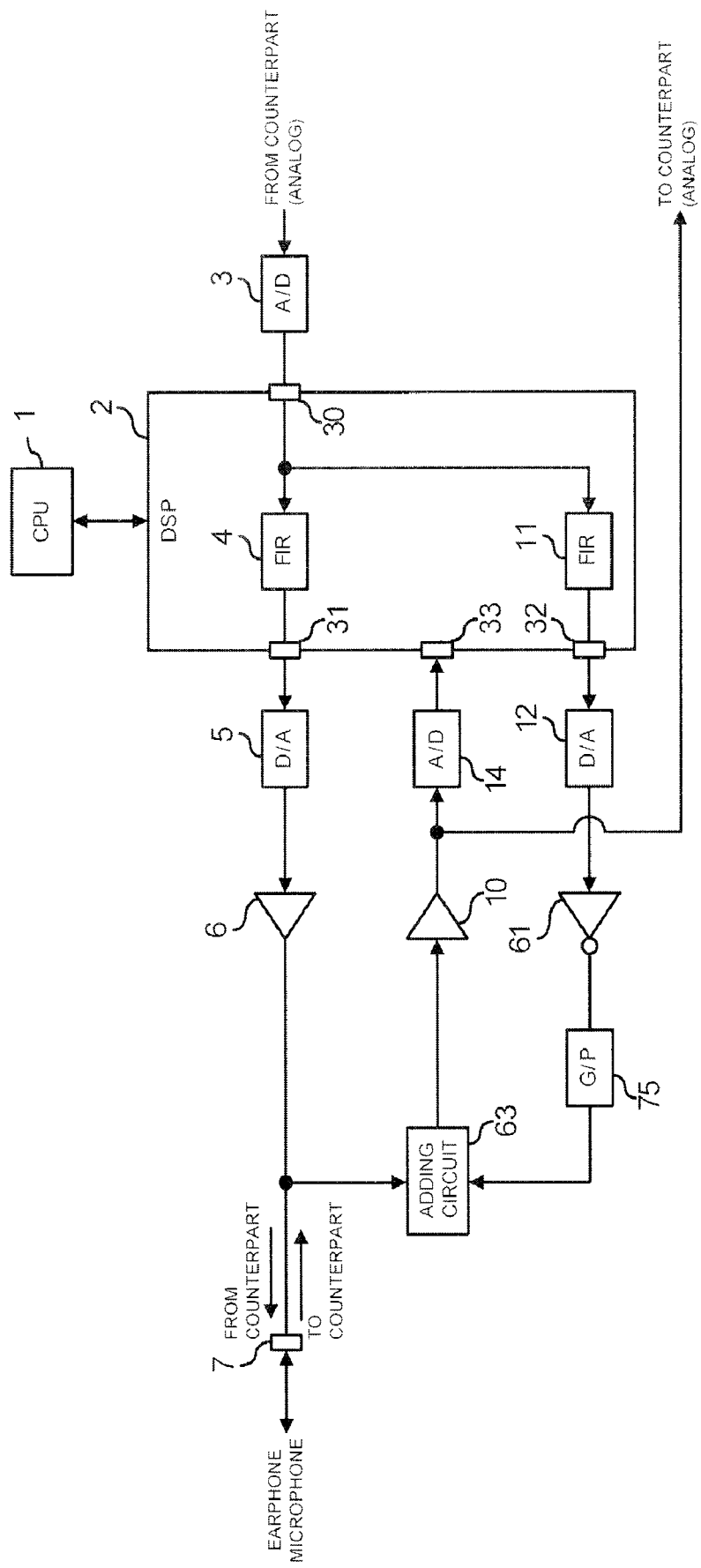
FIG. 11 depicts a block diagram of a fourth embodiment of an echo preventing circuit and a digital signal processing circuit included in the echo preventing circuit, according to the present invention.

Exemplary Configurations of Echo Preventing Circuit and Digital Signal Processing Circuit FIG. 11 depicts a fourth embodiment. FIG. 11 depicts a block diagram of an example of the echo preventing circuit and the digital signal processing circuit included in the echo preventing circuit, according to the present invention. In the echo preventing circuit shown in FIG. 11, the structural requirements same as those of the above first embodiment are given the same reference numerals and the description therefor is omitted.

The echo preventing circuit includes the CPU 1, the DSP 2, the AD converter 3, the DA converter 5, the amplifying circuit 6, the input/output terminal 7, an adding circuit 63, the amplifying circuit 10, the AD converter 14, the DA converter 12, an inverting amplifying circuit 61 (an inverting circuit), and a gain phase adjusting circuit (G/P) 75.

That is, the embodiment has a configuration that includes the inverting amplifying circuit 61, the gain phase adjusting circuit 75, and the adding circuit 63, instead of the differential amplifying circuit 9 and the amplifying circuit 13 in the first embodiment. Though the CPU 1 is a structural requirement also in the embodiment, the CPU 1 may not be a structural requirement.

The DSP 2 includes the input terminal 30, the FIR filter 4, the output terminal 31, the FIR filter 11, the output terminal 32, and the input terminal 33.

The inverting amplifying circuit 61 inverts an analog signal from the DA converter 12, amplifies the signal by a predetermined factor, and outputs the signal to the gain phase adjusting circuit 75.

The gain phase adjusting circuit 75 applies adjustment of the gain and the phase to the analog signal from the inverting amplifying circuit 61 and outputs the adjusted signal to the adding circuit 63. The adjustment of the gain and the phase of the analog signal by the gain phase adjusting circuit 75 is executed to generate an analog signal for which the phase thereof is inverted compared to that of the analog signal from the amplifying circuit 6 to prevent echoes generated when a digital signal is inputted into the input terminal 30.

The adding circuit 63 is inputted with the analog signal from the amplifying circuit 6. The adding circuit 63 adds the analog signal from the amplifying circuit 6 and the analog signal from the gain phase adjusting circuit 75, and outputs the addition result to the amplifying circuit 10. The adding circuit 63 outputs the sound signal from the input/output terminal 7 to the amplifying circuit 10.

Filter Coefficients of FIR Filters 4 and 11

Figure 12:
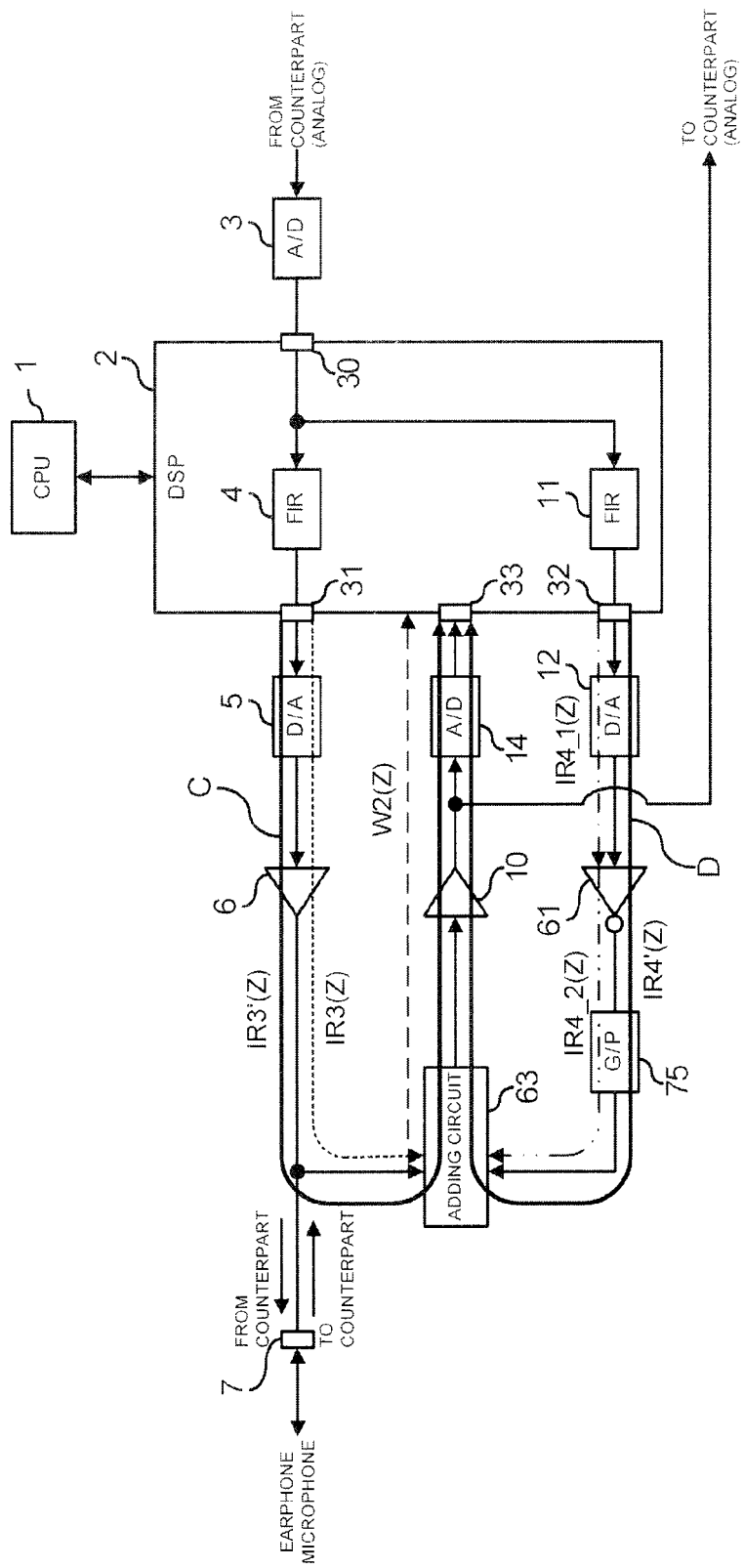
FIG. 12 depicts paths C and D of the echo preventing circuit shown in FIG. 11.

Description will be given in detail for the filter coefficients of the FIR filters 4 and 11 referring to FIG. 12. FIG. 12 depicts paths C and D of the echo preventing circuit shown in FIG. 11. The path C may be a path including the earphone microphone 18 similarly to the first embodiment.

The analog signal from the amplifying circuit 6 may be inputted into not only the output from the input/output terminal 7 but also the adding circuit 63. In this case, echoes due to the analog signal generate. Otherwise, echoes generate due to the sound signal inputted from the input/output terminal 7 and the analog signal from the amplifying circuit 6 being superposed on each other and inputted into the adding circuit 63. The filter coefficients of the FIR filters 4 and 11 are set such that the echoes are prevented.

The impulse response (the transfer function) of a section from the output terminal 31 to input terminal of the adding circuit 63 indicated by a dotted line of FIG. 12 is set as IR3(Z). The impulse response (the transfer function) of a section from the output terminal 32 to the input of the inverting amplifying circuit 61 indicated by a dot and dash line of FIG. 12 is set as IR4_1(Z). The impulse response (a transfer function) of a section from input of the inverting amplifying circuit 61 to the input terminal of the adding circuit 63 indicated by a two-dot and dash line of FIG. 12 is set as IR4_2(Z). The impulse response (a transfer function) of a section from the latter stage of each input terminal of the adding circuit 63 to the input terminal 33 indicated by a dotted line of FIG. 12 is set as W2(Z).

In this case, the impulse response (the transfer function) IR3'(Z) of the path C indicated by a solid line of the FIG. 12 is as IR3'(Z)=IR3(Z)·W2(Z). The impulse response (the transfer function) IR4'(Z) of the path D indicated by a solid line of the FIG. 12 is as IR4'(Z)=−IR4_1(Z)·IR4_2(Z)·W2(Z). The reason why the phase of IR4_1(Z) is inversed is because IR4_1(Z) is inverted in the inverting amplifying circuit 61.

Assuming that the filter coefficients of the FIR filter 4 are −IR4'(Z) formed by inverting the phase of IR4'(Z), the characteristic IRa11_3(Z) of a section from the input of the FIR filter 4 to the input terminal 33 is as follows.

$$IRall\_3(Z) = -IR4'(Z) \cdot IR3'(Z)$$
$$= (-(-IR4\_1(Z) \cdot IR4\_2(Z) \cdot W2(Z))) \cdot (IR3(Z) \cdot W2(Z))$$
$$= IR4\_1(Z) \cdot IR4\_2(Z) \cdot W2(Z) \cdot IR3(Z) \cdot W2(Z)$$

Assuming that the filter coefficients of the FIR filter 11 are IR3'(Z), the characteristic IRa11_4(Z) of a section from the input of the FIR filter 11 to the input terminal 33 is as follows.

$$IRall\_4(Z) = IR3'(Z) \cdot IR4'(Z)$$
$$= IR3(Z) \cdot W2(Z) \cdot (-IR4\_1(Z) \cdot IR4\_2(Z) \cdot W2(Z))$$
$$= IR3(Z) \cdot W2(Z) \cdot (-IR4\_1(Z)) \cdot IR4\_2(Z) \cdot W2(Z)$$
$$= -IRall\_3(Z)$$

That is, it can be seen that the characteristic IRa11_3(Z) of the section from the input of the FIR filter 4 to the input terminal 33 and the characteristic IRa11_4(Z) of the section from the input of the FIR filter 11 to the input terminal 33 each have a characteristic of canceling each other. As a result, it can be seen that −IR4'(Z) obtained by inverting the phase of IR4'(Z) may be set as the filter coefficients of the FIR filter 4 and IR3'(Z) may be set as the filter coefficients of the FIR filter 11.

Assuming that the filter coefficients of the FIR filter 4 are IR4'(Z), the characteristic IRa11_3(Z) of the section from the input of the FIR filter 4 to the input terminal 33 is as follows.

$$IRall\_3(Z) = IR4'(Z) \cdot IR3'(Z)$$
$$= (-IR4\_1(Z) \cdot IR4\_2(Z) \cdot W2(Z)) \cdot (IR3(Z) \cdot W2(Z))$$
$$= -IR4\_1(Z) \cdot IR4\_2(Z) \cdot W2(Z) \cdot IR3(Z) \cdot W2(Z)$$

Assuming that the filter coefficients of the FIR filter 11 are −IR3'(Z) obtained by inverting the phase of IR3'(Z), the characteristic IRa11_4(Z) of a section from the input of the FIR filter 11 to the input terminal 33 is as follows.

$$IRall\_4(Z) = -IR3'(Z) \cdot IR4'(Z)$$
$$= -(IR3(Z) \cdot W2(Z)) \cdot (-IR4\_1(Z) \cdot IR4\_2(Z) \cdot W2(Z))$$
$$= IR3(Z) \cdot W2(Z) \cdot IR4\_1(Z) \cdot IR4\_2(Z) \cdot W2(Z)$$
$$= -IRall\_3(Z)$$

That is, it can be seen that the characteristic IRa11_3(Z) of the section from the input of the FIR filter 4 to the input terminal 33 and the characteristic IRa11_4(Z) of the section from the input of the FIR filter 11 to the input terminal 33 each have a characteristic of canceling each other. As a result, it can be seen that IR4'(Z) may be set as the filter coefficients of the FIR filter 4 and −IR3'(Z) may be set as the filter coefficients of the FIR filter 11.

By setting the filter coefficients of the FIR filters 4 and 11 as above, the adding circuit 63 can cancel the signal traveling on the path C using the signal traveling on the path D. As a result, the above echoes generated when the digital signal is inputted into the input terminal 30 can be prevented.

The echo preventing circuit shown in the embodiment outputs the analog signal outputted from the amplifying circuit 10, as an analog output signal corresponding to the sound signal from the input/output terminal 7. Therefore, no DA converter is necessary to convert again the digital signal outputted from the AD converter 14 into an analog signal and, therefore, the cost and the power consumption can be reduced.

The process to set the filter coefficients of the FIR filters 4 and 11 is enabled by executing a process same as that in the first embodiment.

Fifth Embodiment

Figure 13:
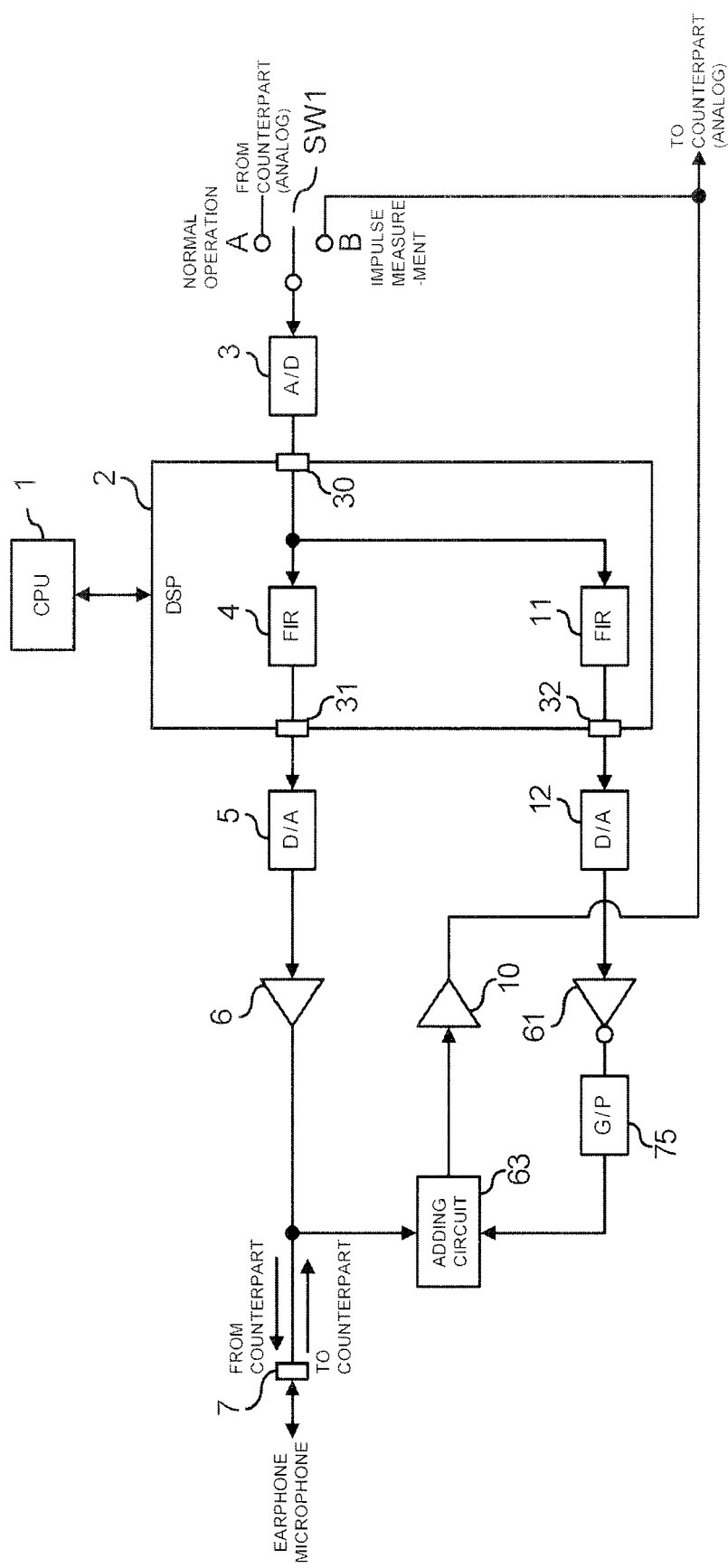
FIG. 13 depicts a block diagram of a fifth embodiment of the echo preventing circuit and the digital signal processing circuit included in the echo preventing circuit, according to the present invention.

Exemplary Configurations of Echo Preventing Circuit and Digital Signal Processing Circuit FIG. 13 depicts a fifth embodiment. FIG. 13 depicts a block diagram of an example of the echo preventing circuit and the digital signal processing circuit included in the echo preventing circuit, according to the present invention. In the echo preventing circuit shown in FIG. 13, the structural requirements same as those of the above fourth embodiment are given the same reference numerals and the description therefor is omitted. The echo preventing circuit does not include the AD converter 14 as in the configuration of the fourth embodiment and, instead, includes a switching circuit SW1.

The switching circuit SW1 is inputted with the analog signal indicating sound transmitted from a counterpart (a fifth analog signal) and the analog signal outputted from the amplifying circuit 10 (a fourth analog signal). The switching circuit SW1 selects either one of these input signals and outputs the selected signal to the AD converter 3.

That is, in the embodiment, an impulse response can be acquired due to the switching circuit SW1 being switched to the side of "B". At this time, the AD converter 3 substitutes for the AD converter 14 in the fourth embodiment. The switching circuit SW1 is switched to the side of "A" when a process is executed to the sound transmitted from the counterpart.

By configuring as above, the AD converter 14 used in the fourth embodiment is not necessary and, therefore, the cost and the power consumption can be reduced more.

Sixth Embodiment

Figure 14:
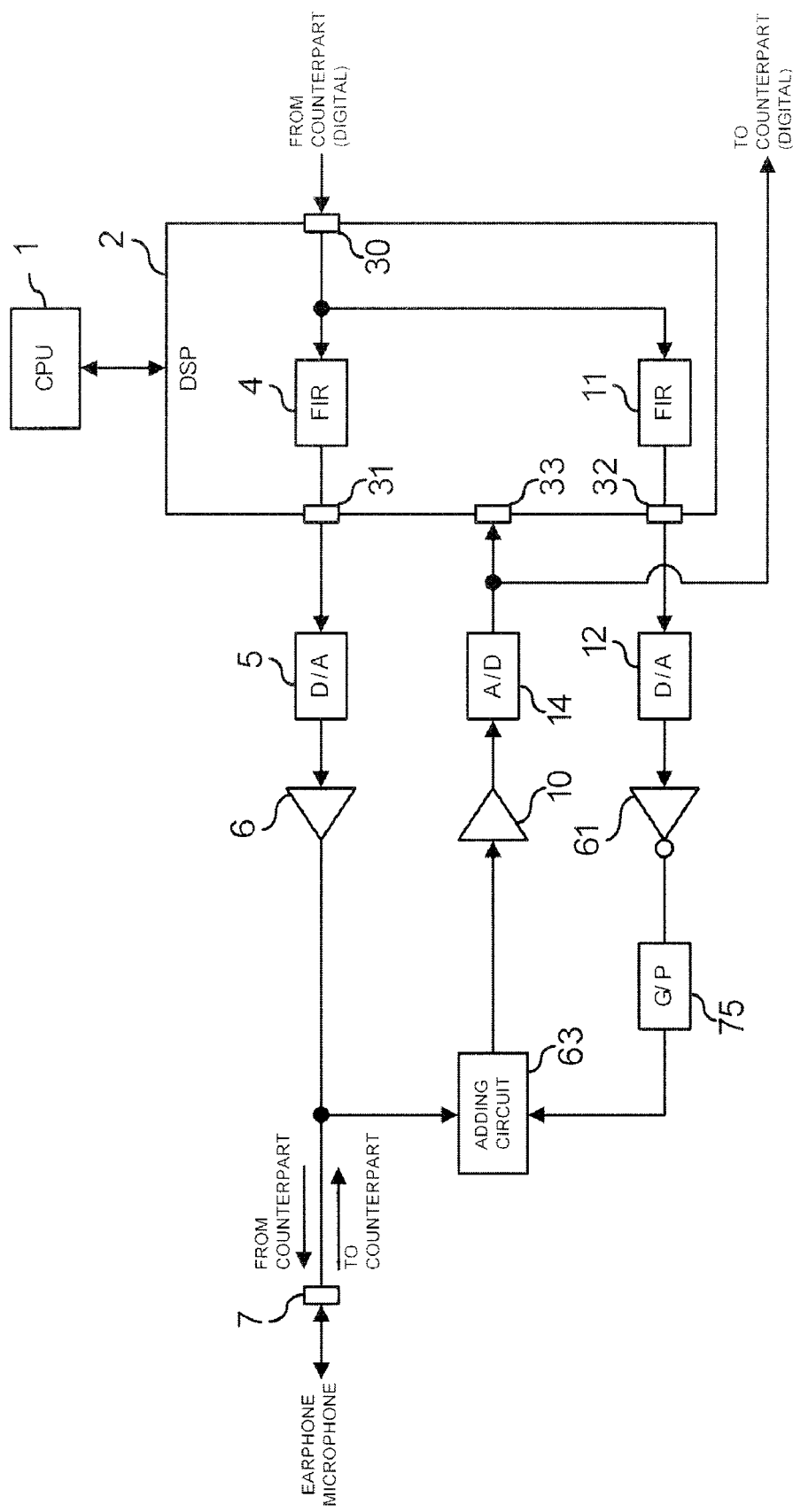
FIG. 14 depicts a block diagram of a sixth embodiment of the echo preventing circuit and the digital signal processing circuit included in the echo preventing circuit, according to the present invention.

Exemplary Configurations of Echo Preventing Circuit and Digital Signal Processing Circuit FIG. 14 depicts a sixth embodiment. FIG. 14 depicts a block diagram of an example of the echo preventing circuit and the digital signal processing circuit included in the echo preventing circuit, according to the present invention. In the echo preventing circuit shown in FIG. 14, the structural requirements same as those of the above fourth embodiment are given the same reference numerals and the description therefor is omitted. The echo preventing circuit does not include the AD converter 3 as in the configuration of the fourth embodiment.

In the embodiment, a signal indicating sound that is transmitted from a counterpart is inputted into the input terminal 30 as a digital signal. A signal outputted to the counterpart is a digital signal outputted from the AD converter 14. By configuring the echo preventing circuit as above, the interface signal between the echo preventing circuit and an apparatus applied to the circuit can be a digital signal. That is, when the echo preventing circuit is applied to an apparatus that can output a digital signal, the digital signal does not need to be converted into an analog signal by a DA converter for interfacing with the echo preventing circuit, and no output signal from the echo preventing circuit needs to be converted into a digital signal by an AD converter. Therefore, the AD converter and the DA converter can be excluded and, therefore, reduction of the cost and the power consumption can be realized.

Seventh Embodiment

Figure 15:
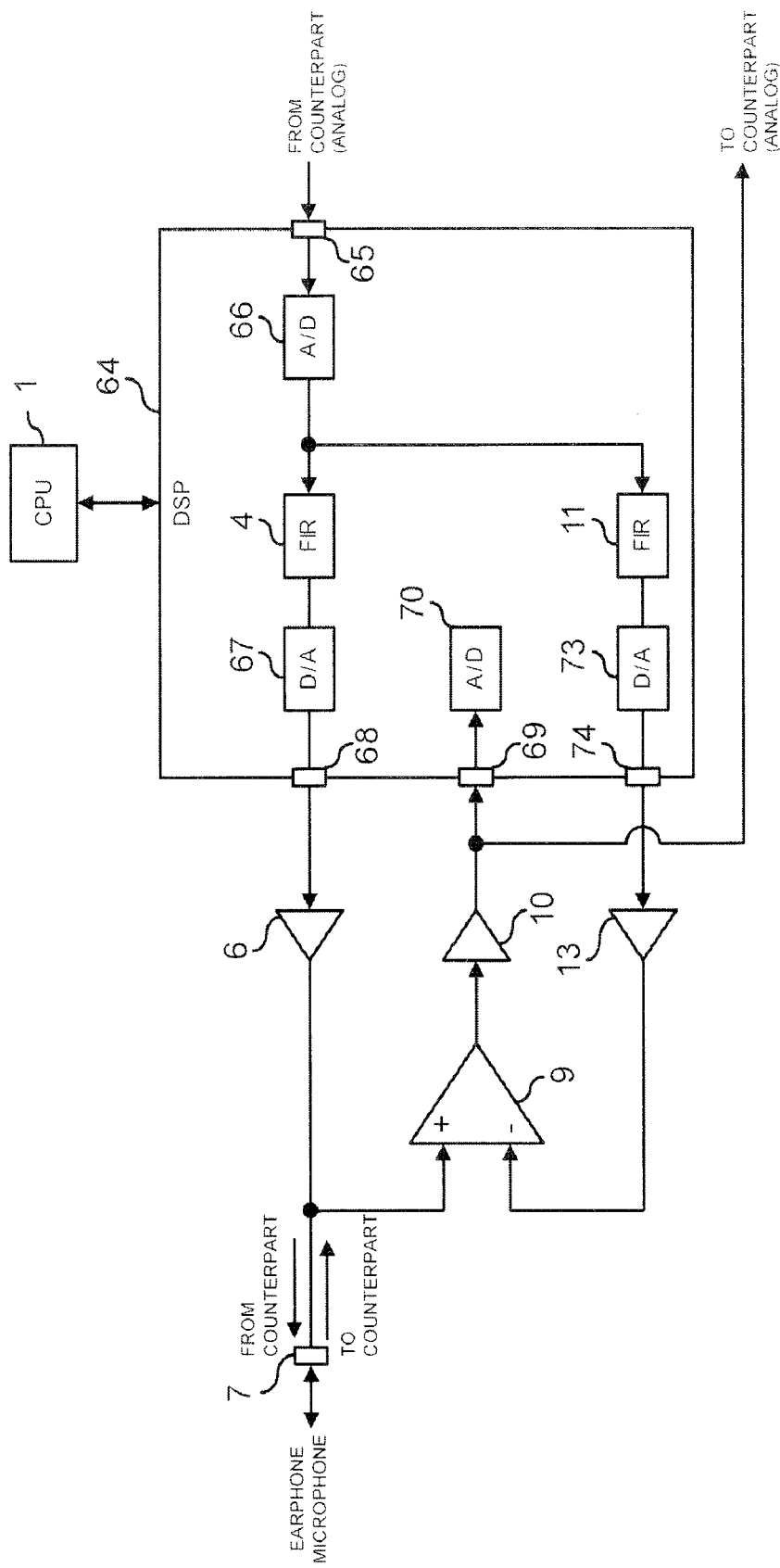
FIG. 15 depicts a block diagram of a seventh embodiment of the echo preventing circuit and the digital signal processing circuit included in the echo preventing circuit, according to the present invention.

Exemplary Configurations of Echo Preventing Circuit and Digital Signal Processing Circuit FIG. 15 depicts a seventh embodiment. FIG. 15 depicts a block diagram of an example of the echo preventing circuit and the digital signal processing circuit (a DSP 64) included in the echo preventing circuit, according to the present invention. In the echo preventing circuit shown in FIG. 15, the structural requirements same as those of the above first embodiment are given the same reference numerals and the description therefor is omitted.

The echo preventing circuit includes the CPU 1, the DSP 64, the amplifying circuit 6, the input/output terminal 7, the differential amplifying circuit 9, the amplifying circuit 10, and the amplifying circuit 13. Though the CPU 1 is a structural requirement also in the embodiment, the CPU 1 may not be a structural requirement. A DSP 385

The DSP 64 includes an input terminal 65 (a first input terminal), an AD converter 66, the FIR filter 4, a DA converter 67 (a first DA converter), an output terminal 68 (a first output terminal), an input terminal 69 (a second input terminal), an AD converter 70, the FIR filter 11, a DA converter 73 (a second DA converter), and an output terminal 74 (a second output terminal).

That is, the embodiment is configured to include the AD converters 3 and 14, and the DA converters 5 and 12 in the first embodiment, inside the DSP 64. In addition, as in the first embodiment, the analog signal outputted from the amplifying circuit 10 is outputted as an output signal corresponding to the sound signal from the input/output terminal 7.

The AD converter 66 is inputted with, for example, a sound signal through the input terminal 65. The AD converter 66 outputs a digital signal formed by applying an analog/digital conversion process to the sound signal, to the FIR filters 4 and 11.

The FIR filter 4 applies a convolution calculating process to the digital signal based on the filter coefficients of the FIR filter 4 and outputs the digital signal to the DA converter 67. Simultaneously, the FIR filter 11 applies a convolution calculating process to the digital signal based on the filter coefficients of the FIR filter 11 and outputs the digital signal to the DA converter 73.

The DA converter 67 outputs through the output terminal 68 an analog signal formed by applying a digital/analog converting process to the digital signal. As a result, the amplifying circuit 6 is inputted with the analog signal from the DA converter 67.

The DA converter 73 outputs through the output terminal 74 an analog signal formed by applying a digital/analog converting process to the digital signal. As a result, the amplifying circuit 13 is inputted with the analog signal from the DA converter 73.

The AD converter 70 is inputted with the sound signal from the amplifying circuit 10 through the input terminal 69. The AD converter 70 inputs a digital signal formed by applying an analog/digital converting process to the sound signal, to the DSP 64 through the input terminal 69. The digital signal inputted through the input terminal 69 is used to set the filter coefficients of the FIR filters 4 and 11.

Filter Coefficients of FIR Filters 4 and 11

Figure 16:
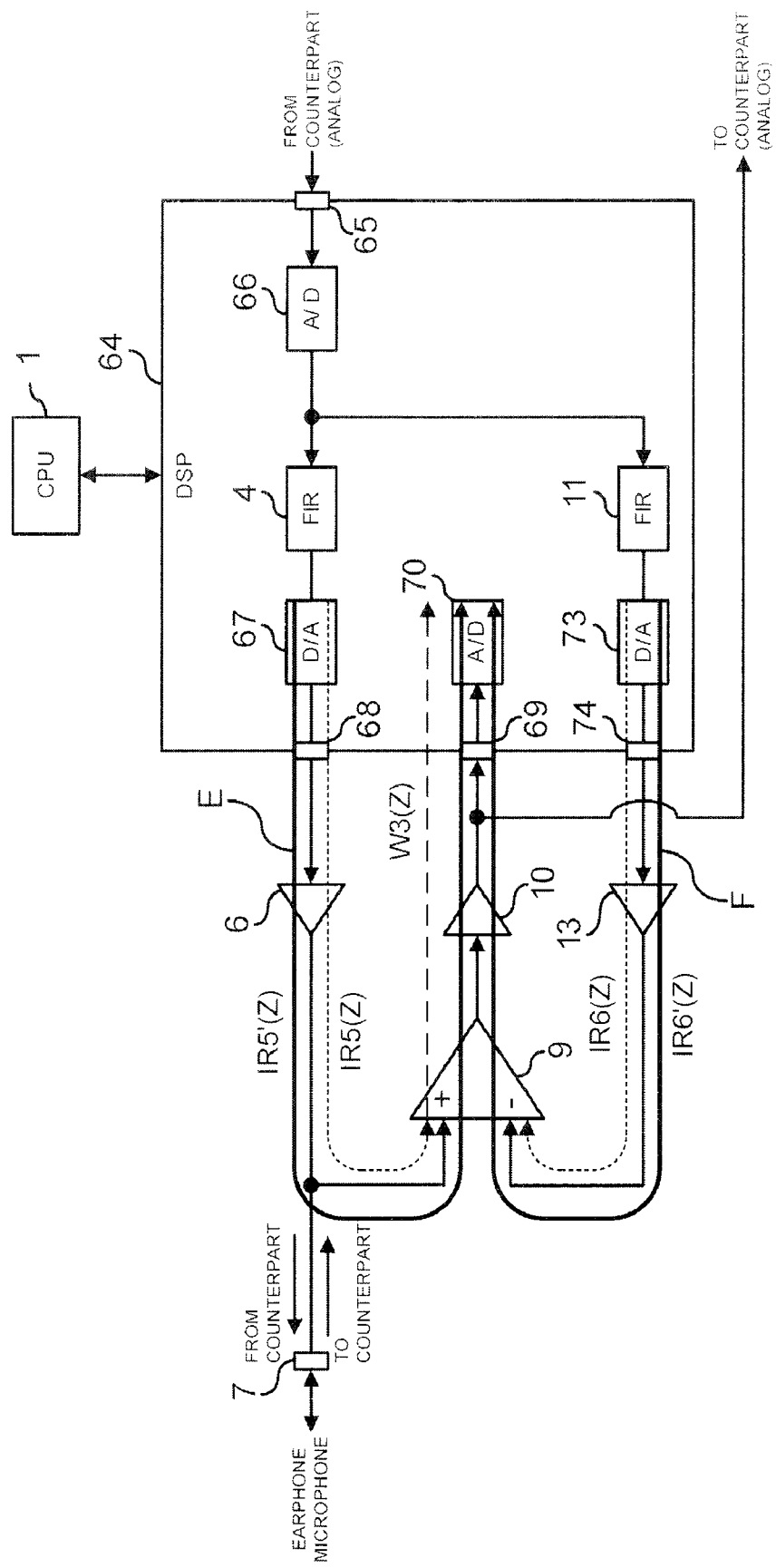
FIG. 16 depicts a diagram of paths E and F of the echo preventing circuit shown in FIG. 15.

Description will be given in detail for the filter coefficients of the FIR filters 4 and 11 referring to FIG. 16. FIG. 16 depicts paths E and F of the echo preventing circuit shown in FIG. 15. The path E may be a path including the earphone microphone 18 similarly to the first embodiment.

The analog signal from the amplifying circuit 6 may be inputted into not only the output from the input/output terminal 7 but also the differential amplifying circuit 9. In this case, echoes due to the analog signal generate. Otherwise, echoes generate due to the sound signal inputted from the input/output terminal 7 and the analog signal from the amplifying circuit 6 being superposed on each other and inputted into the differential amplifying circuit 9. The filter coefficients of the FIR filters 4 and 11 are set such that the echoes are prevented.

The impulse response (the transfer function) of a section from the input of the DA converter 67 to a positive input terminal of the differential amplifying circuit 9 indicated by a dotted line of FIG. 15 is set as IR5(Z). The impulse response (the transfer function) of a section from the input of the DA converter 73 to the negative input terminal of the differential amplifying circuit 9 indicated by a dotted line of FIG. 16 is set as IR6(Z). The impulse response (a transfer function) of a section from the latter stage of the positive/negative input terminal of the differential amplifying circuit 9 to the output of the AD converter 70 indicated by a dotted line of FIG. 16 is set as W3(Z).

In this case, the impulse response (the transfer function) IR5'(Z) of the path E indicated by a solid line of the FIG. 16 is as IR5'(Z)=IR5(Z)·W3(Z). The impulse response (the transfer function) IR6'(Z) of the path F indicated by a solid line of the FIG. 16 is as IR6'(Z)=−IR6(Z)·W3(Z). The reason why the phase of IR6(Z) is inversed is because IR6(Z) is inputted into the negative input terminal of the differential amplifying circuit 9.

Assuming that the filter coefficients of the FIR filter 4 are −IR6'(Z) formed by inverting the phase of IR6'(Z), the characteristic IRa11_5(Z) of a section from the input of the FIR filter 4 to the output of the AD converter 70 is as follows.

$$\begin{aligned} \text{IRall\_5}(Z) &= -IR6'(Z) \cdot IR5'(Z) \\ &= (-(-IR6(Z) \cdot W3(Z))) \cdot IR5(Z) \cdot W3(Z)) \\ &= IR6(Z) \cdot W3(Z) \cdot IR5(Z) \cdot W3(Z) \end{aligned}$$

Assuming that the filter coefficients of the FIR filter 11 are IR5'(Z), the characteristic IRa11_6(Z) of a section from the input of the FIR filter 11 to the output of the AD converter 70 is as follows.

$$\begin{aligned} \text{IRall\_6}(Z) &= IR5'(Z) \cdot IR6'(Z) \\ &= IR5(Z) \cdot W3(Z) \cdot (-IR6(Z) \cdot W3(Z) \\ &= IR5(Z) \cdot W3(Z) \cdot (-IR5(Z)) \cdot W3(Z) \\ &= -\text{IRall\_5}(Z) \end{aligned}$$

That is, it can be seen that the characteristic IRa11_5(Z) of the path E and the characteristic IRa11_6(Z) of the path F each have a characteristic of canceling each other. As a result, it can be seen that −IR6'(Z) obtained by inverting the phase of IR6'(Z) may be set as the filter coefficients of the FIR filter 4 and IR5'(Z) may be set as the filter coefficients of the FIR filter 11.

Assuming that the filter coefficients of the FIR filter 4 are IR6'(Z), the characteristic IRa11_5(Z) of the section from the input of the FIR filter 4 to the output of the AD converter 70 is as follows.

$$IRall\_5(Z) = IR6'(Z) \cdot IR5'(Z)$$
$$= (-IR6(Z) \cdot W3(Z)) \cdot (IR5(Z) \cdot W3(Z))$$
$$= -IR6(Z) \cdot W3(Z) \cdot IR5(Z) \cdot W3(Z)$$

Assuming that the filter coefficients of the FIR filter 11 are −IR5'(Z) obtained by inverting the phase of IR5'(Z), the characteristic IRa11_6(Z) of a section from the input of the FIR filter 11 to the output of the AD converter 70 is as follows.

$$IRall\_6(Z) = -IR5'(Z) \cdot IR6'(Z)$$
$$= (-(IR5(Z) \cdot W3(Z)) \cdot (-IR6(Z) \cdot W3(Z))$$
$$= IR5(Z) \cdot W3(Z) \cdot IR6(Z) \cdot W3(Z)$$
$$= -IRall\_5(Z)$$

That is, it can be seen that the characteristic IRa11_5(Z) of the path E and the characteristic IRa11_6(Z) of the path F each have a characteristic of canceling each other. As a result, it can be seen that IR6'(Z) may be set as the filter coefficients of the FIR filter 4 and IR5'(Z) may be set as the filter coefficients of the FIR filter 11.

By setting the filter coefficients of the FIR filters 4 and 11 as above, the differential amplifying circuit 9 can cancel the signal traveling on the path E using the signal traveling on the path F. As a result, the above echoes generated when the sound signal is inputted into the input terminal 65 can be prevented.

The echo preventing circuit shown in the embodiment outputs the analog signal outputted from the amplifying circuit 10, as an analog output signal corresponding to the sound signal from the input/output terminal 7. Therefore, no DA converter is necessary to convert again the digital signal outputted from the AD converter 70 into an analog signal and, therefore, the cost and the power consumption can be reduced.

The process to set the filter coefficients of the FIR filters 4 and 11 is enabled by executing a process same as that in the first embodiment.

Eighth Embodiment

Figure 17:
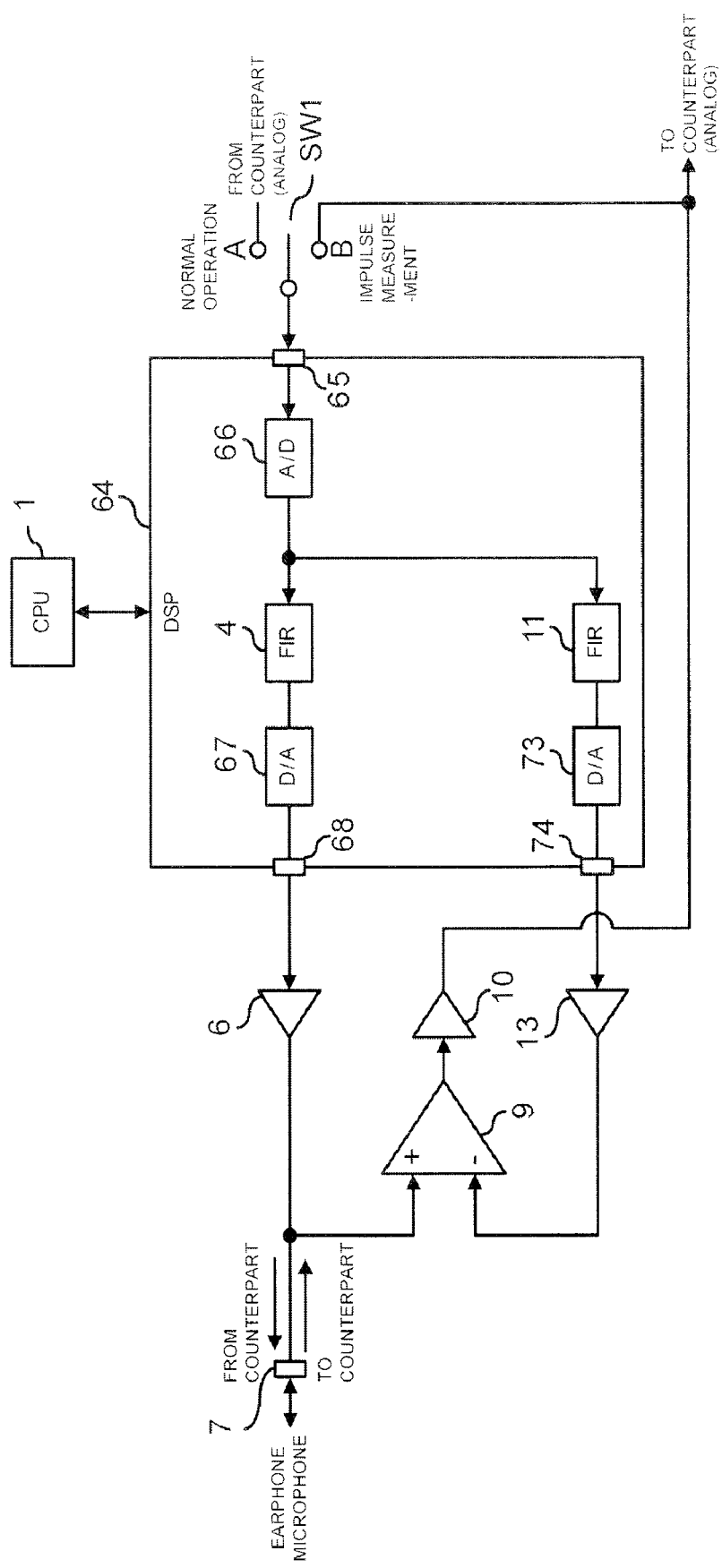
FIG. 17 depicts a block diagram of a eighth embodiment of the echo preventing circuit and the digital signal processing circuit included in the echo preventing circuit, according to the present invention.

Exemplary Configurations of Echo Preventing Circuit and Digital Signal Processing Circuit FIG. 17 depicts an eighth embodiment. FIG. 17 depicts a block diagram of an example of the echo preventing circuit and the digital signal processing circuit included in the echo preventing circuit, according to the present invention. In the echo preventing circuit shown in FIG. 17, the structural requirements same as those of the above seventh embodiment are given the same reference numerals and the description therefor is omitted. The echo preventing circuit does not include the AD converter 70 in the configuration of the seventh embodiment and, instead, includes a switching circuit SW1.

The switching circuit SW1 is inputted with an analog signal indicating the sound transmitted from a counterpart (a fifth analog signal) and an analog signal outputted from the amplifying circuit 10 (a fourth analog signal). The switching circuit SW1 selects either one of these input signals and outputs the selected signal to the AD converter 66 according to the control of the CPU 1, etc.

That is, in the embodiment, an impulse response can be acquired by switching the switching circuit SW1 to the side of "B". At this time, the AD converter 66 substitutes for the AD converter 70 in the seventh embodiment. When a process is executed to the sound transmitted from the counterpart, the switching circuit SW1 is switched to the side of "A".

By configuring as above, the AD converter 70 used in the seventh embodiment is not necessary and the cost and the power consumption can be reduced more.

Ninth Embodiment

Figure 18:
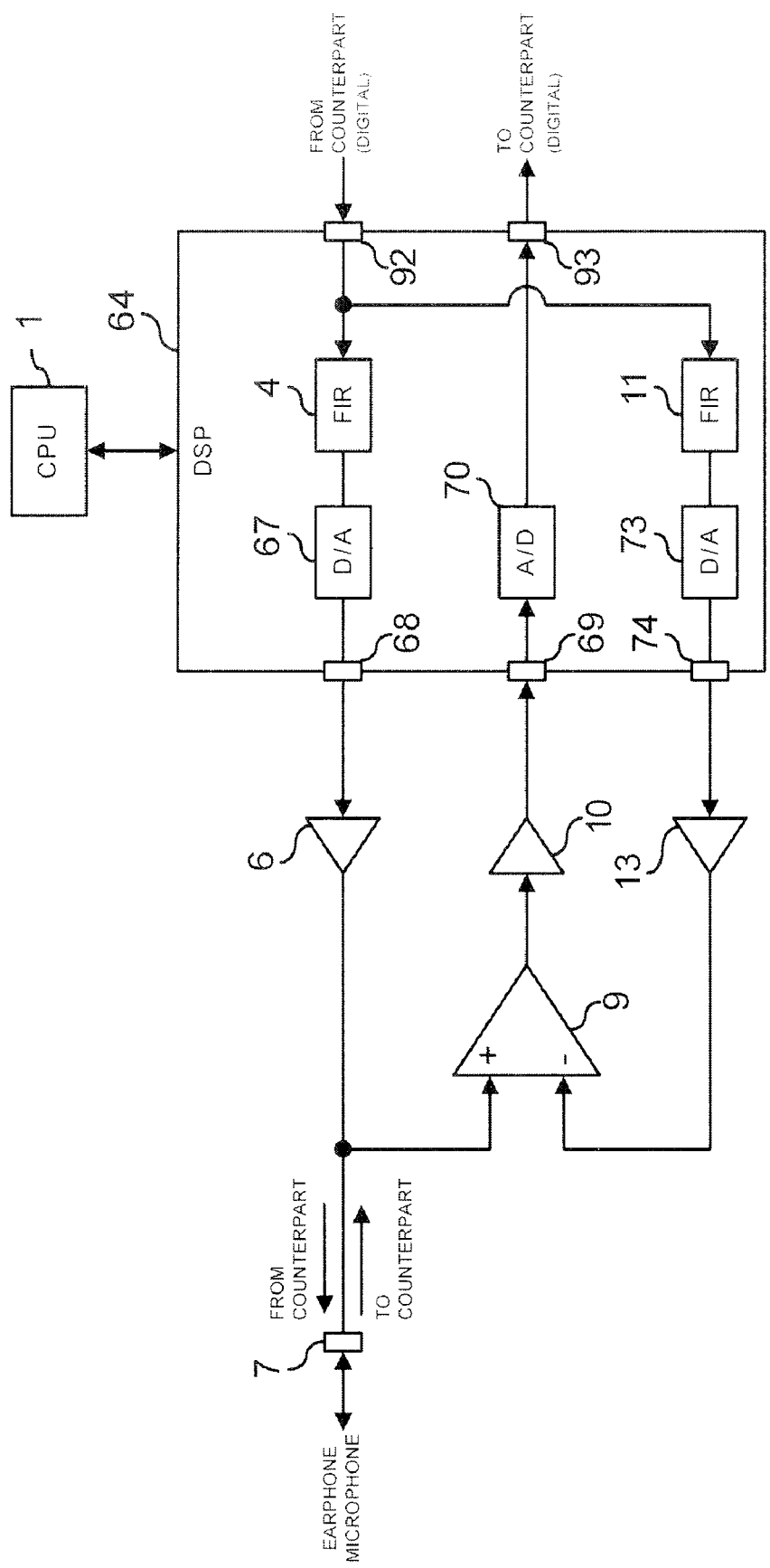
FIG. 18 depicts a block diagram of a ninth embodiment of the echo preventing circuit and the digital signal processing circuit included in the echo preventing circuit, according to the present invention.

Exemplary Configurations of Echo Preventing Circuit and Digital Signal Processing Circuit FIG. 18 depicts a ninth embodiment. FIG. 18 depicts a block diagram of an example of the echo preventing circuit and the digital signal processing circuit included in the echo preventing circuit, according to the present invention. In the echo preventing circuit shown in FIG. 18, the structural requirements same as those of the above seventh embodiment are given the same reference numerals and the description therefor is omitted. The echo preventing circuit does not include the AD converter 66 as in the configuration of the seventh embodiment.

In the embodiment, a signal indicating the sound transmitted from the counterpart is inputted into an input terminal 92 as a digital signal. The circuit is adapted to output through an output terminal 93 the digital signal outputted from the AD converter 70. A digital signal outputted from an output terminal 93 is outputted as a digital output signal corresponding to the sound signal from the input/output terminal 7. By configuring the echo preventing circuit as above, the interfacing signal between the echo preventing circuit and apparatuses, etc., applied with the circuit may be a digital signal. That is, when the echo preventing circuit is applied to an apparatus that can output a digital signal, no signal needs to be converted into an analog signal by any DA converter to interface with the echo preventing circuit and no output signal from the echo preventing circuit needs to be converted into a digital signal by any AD converter. Therefore, the AD converter and the DA converter can be excluded and, therefore, cost reduction and power consumption reduction can be realized.

Tenth Embodiment

Figure 19:
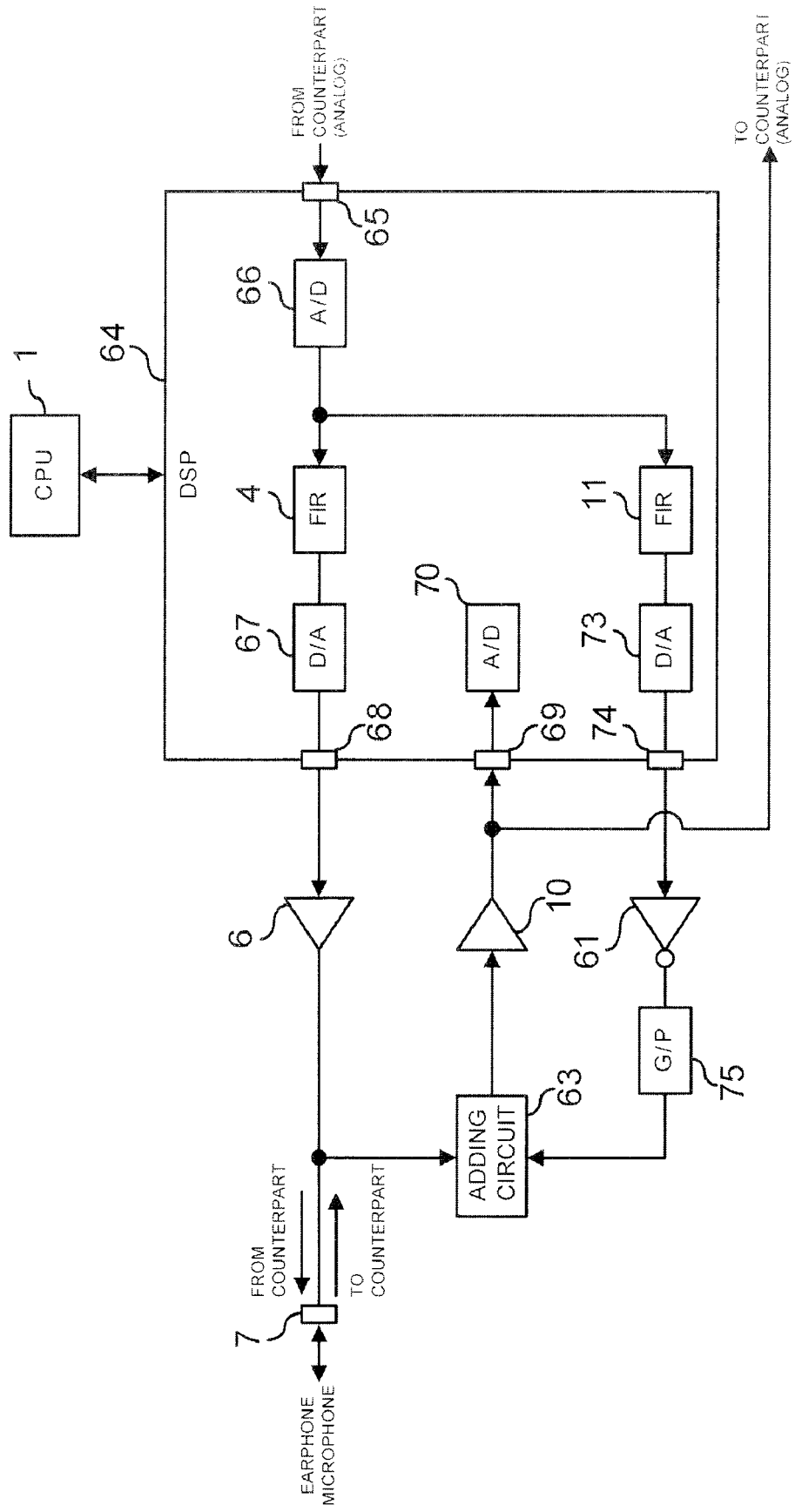
FIG. 19 depicts a block diagram of a tenth embodiment of the echo preventing circuit and the digital signal processing circuit included in the echo preventing circuit, according to the present invention.

Exemplary Configurations of Echo Preventing Circuit and Digital Signal Processing Circuit FIG. 19 depicts a tenth embodiment. FIG. 19 depicts a block diagram of an example of the echo preventing circuit and the digital signal processing circuit (the DSP 64) included in the echo preventing circuit, according to the present invention.

As shown in FIG. 19, the echo preventing circuit in the tenth embodiment is configured by combining the above fourth embodiment (FIG. 11) and the above seventh embodiment (FIG. 15) and, therefore, the structural requirements same between the two embodiments are given the same reference numerals and the description therefor is omitted.

Filter Coefficients of FIR Filters 4 and 11

Figure 20:
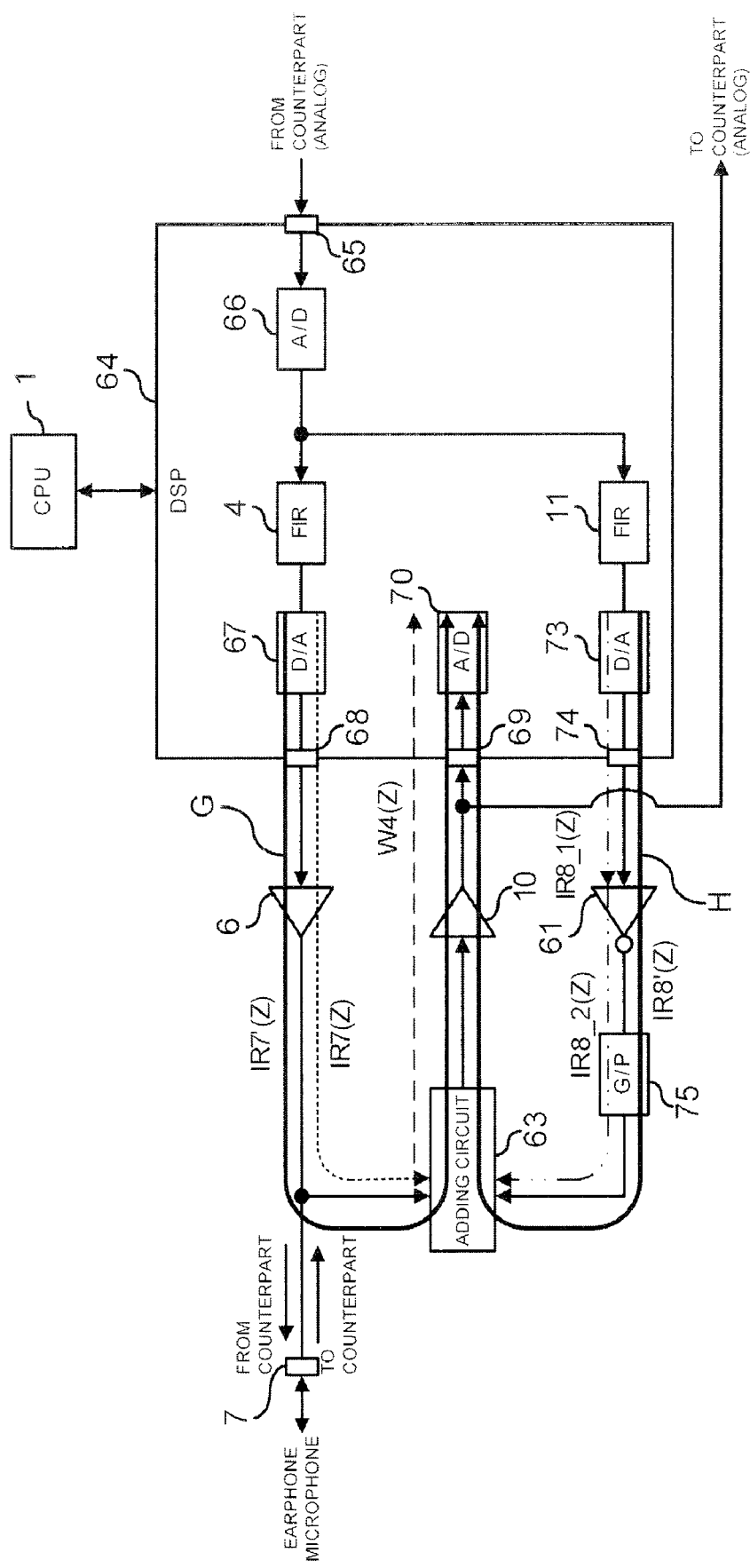
FIG. 20 depicts paths G and H of the echo preventing circuit shown in FIG. 19.

Description will be given in detail for the filter coefficients of the FIR filters 4 and 11 referring to FIG. 20. FIG. 20 depicts paths G and H of the echo preventing circuit shown in FIG. 19. The path G may be a path including the earphone microphone 18 similarly to the first embodiment.

The analog signal from the amplifying circuit 6 may be inputted into not only the output from the input/output terminal 7 but also the adding circuit 63. In this case, echoes due to the analog signal generate. Otherwise, echoes generate due to the sound signal inputted from the input/output terminal 7 and the analog signal from the amplifying circuit 6 being superposed on each other and inputted into the adding circuit 63. The filter coefficients of the FIR filters 4 and 11 are set such that the echoes are prevented.

The impulse response (the transfer function) of a section from the input of the DA converter 67 to the input terminal of the adding circuit 63 indicated by a dotted line of FIG. 20 is set as IR7(Z). The impulse response (the transfer function) of a section from the input of the DA converter 73 to the input of the inverting amplifying circuit 61 indicated by a dot and dash line of FIG. 20 is set as IR8_1(Z). The impulse response (the transfer function) of a section from the input of the inverting amplifying circuit 61 to the input terminal of the adding circuit 63 indicated by a two-dot and dash line of FIG. 20 is set as IR8_2(Z). The impulse response (a transfer function) of a section from the latter stage of each input terminal in the adding circuit 63 to the output of the AD converter 70 indicated by a dotted line of FIG. 20 is set as W4(Z).

In this case, the impulse response (the transfer function) IR7'(Z) of the path G indicated by a solid line of the FIG. 20 is as IR7'(Z)=IR7(Z)·W4(Z). The impulse response (the transfer function) IR8'(Z) of the path H indicated by a solid line of the FIG. 20 is as IR8'(Z)=−IR8_1(Z)·IR8_2(Z)·W4(Z). The reason why the phase of IR8_1(Z) is inversed is because IR8_1(Z) is inverted in the inverting amplifying circuit 61.

Assuming that the filter coefficients of the FIR filter 4 are −IR8'(Z) formed by inverting the phase of IR8'(Z), the characteristic IRa11_7(Z) of the section from the input of the FIR filter 4 to the output of the AD converter 70 is as follows.

$$\text{IRa11\_7}(Z) = -IR8'(Z) \cdot IR7'(Z)$$
$$= (-(-IR8\_1(Z) \cdot IR8\_2(Z) \cdot W4(Z))) \cdot (IR7(Z) \cdot W4(Z))$$
$$= IR8\_1(Z) \cdot IR8\_2(Z) \cdot W4(Z) \cdot IR7(Z) \cdot W4(Z)$$

Assuming that the filter coefficients of the FIR filter 11 are IR7'(Z), the characteristic IRa11_8(Z) of the section from the input of the FIR filter 11 to the output of the AD converter 70 is as follows.

$$\text{IRa11\_8}(Z) = IR7'(Z) \cdot IR8'(Z)$$
$$= IR7(Z) \cdot W4(Z) \cdot (-IR8\_1(Z) \cdot IR8\_2(Z) \cdot W4(Z))$$
$$= IR7(Z) \cdot W4(Z) \cdot (-IR8\_1(Z)) \cdot IR8\_2(Z) \cdot W4(Z)$$
$$= -\text{IRa11\_7}(Z)$$

That is, it can be seen that the characteristic IRa11_7(Z) of the section from the input of the FIR filter 4 to the output of the AD converter 70 and the characteristic IRa11_8(Z) of the section from the input of the FIR filter 11 to the output of the AD converter 70 each have a characteristic of canceling each other. As a result, it can be seen that −IR8'(Z) obtained by inverting the phase of IR8'(Z) may be set as the filter coefficients of the FIR filter 4 and IR7'(Z) may be set as the filter coefficients of the FIR filter 11.

Assuming that the filter coefficients of the FIR filter 4 are IR8'(Z), the characteristic IRa11_7(Z) of the section from the input of the FIR filter 4 to the output of the AD converter 70 is as follows.

$$\text{IRa11\_7}(Z) = IR8'(Z) \cdot IR7'(Z)$$
$$= (-IR8\_1(Z) \cdot IR8\_2(Z) \cdot W4(Z)) \cdot (IR7(Z) \cdot W4(Z))$$
$$= -IR8\_1(Z) \cdot IR8\_2(Z) \cdot W4(Z) \cdot IR7(Z) \cdot W4(Z)$$

Assuming that the filter coefficients of the FIR filter 11 are −IR7'(Z) obtained by inverting the phase of IR7'(Z), the characteristic IRa11_8(Z) of the section from the input of the FIR filter 11 to the output of the AD converter 70 is as follows.

$$\text{IRa11\_8}(Z) = -IR7'(Z) \cdot IR8'(Z)$$
$$= (-(IR7(Z) \cdot W4(Z))) \cdot (-IR8\_1(Z) \cdot IR8\_2(Z) \cdot W4(Z))$$
$$= IR7(Z) \cdot W4(Z) \cdot IR8\_1(Z) \cdot IR8\_2(Z) \cdot W4(Z)$$
$$= -\text{IRa11\_7}(Z)$$

That is, it can be seen that the characteristic IRa11_7(Z) of the section from the input of the FIR filter 4 to the output of the AD converter 70 and the characteristic IRa11_8(Z) of the section from the input of the FIR filter 11 to the output of the AD converter 70 each have a characteristic of canceling each other. As a result, it can be seen that IR8'(Z) may be set as the filter coefficients of the FIR filter 4 and −IR7'(Z) obtained by inverting the phase of IR7'(Z) may be set as the filter coefficients of the FIR filter 11.

By setting the filter coefficients of the FIR filters 4 and 11 as above, the adding circuit 63 can cancel the signal traveling on the path G using the signal traveling on the path H. As a result, the above echoes generated when the sound signal is inputted into the input terminal 65 can be prevented.

The echo preventing circuit shown in the embodiment outputs the analog signal outputted from the amplifying circuit 10, as an analog output signal corresponding to the sound signal from the input/output terminal 7. Therefore, no DA converter is necessary to convert again the digital signal outputted from the AD converter 70 into an analog signal and, therefore, the cost and the power consumption can be reduced.

The process to set the filter coefficients of the FIR filters 4 and 11 is enabled by executing a process same as that in the first embodiment.

Eleventh Embodiment

Figure 21:
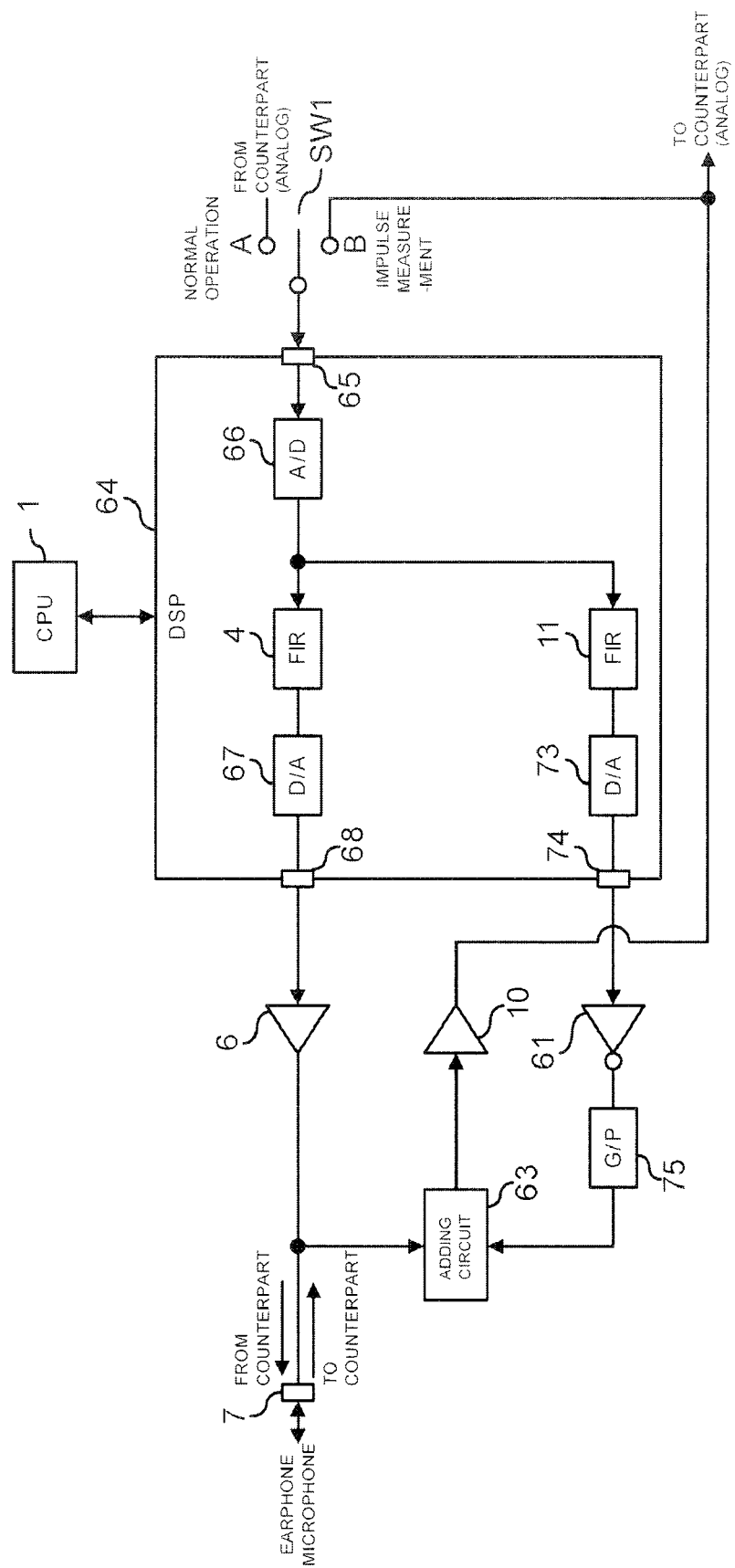
FIG. 21 depicts a block diagram of a eleventh embodiment of the echo preventing circuit and the digital signal processing circuit included in the echo preventing circuit, according to the present invention.

Exemplary Configurations of Echo Preventing Circuit and Digital Signal Processing Circuit FIG. 21 depicts an eleventh embodiment. FIG. 21 depicts a block diagram of an example of the echo preventing circuit and the digital signal processing circuit included in the echo preventing circuit, according to the present invention. In the echo preventing circuit shown in FIG. 21, the structural requirements same as those of the above tenth embodiment are given the same reference numerals and the description therefor is omitted. The echo preventing circuit does not include the AD converter 70 in the configuration of the tenth embodiment and, instead, includes a switching circuit SW1.

The switching circuit SW1 is inputted with an analog signal indicating the sound transmitted from a counterpart (a fifth analog signal) and an analog signal outputted from the amplifying circuit 10 (a fourth analog signal). The switching circuit SW1 selects either one of these input signals and outputs the selected signal to the AD converter 66 through the input terminal 65 according to the control of the CPU 1, etc.

That is, in the embodiment, an impulse response can be acquired by switching the switching circuit SW1 to the side of "B". At this time, the AD converter 66 substitutes for the AD converter 70 in the tenth embodiment. When a process is executed to the sound transmitted from the counterpart, the switching circuit SW1 is switched to the side of "A".

By configuring as above, the AD converter 70 used in the tenth embodiment is not necessary and the cost and the power consumption can be reduced more.

Twelfth Embodiment

Figure 22:
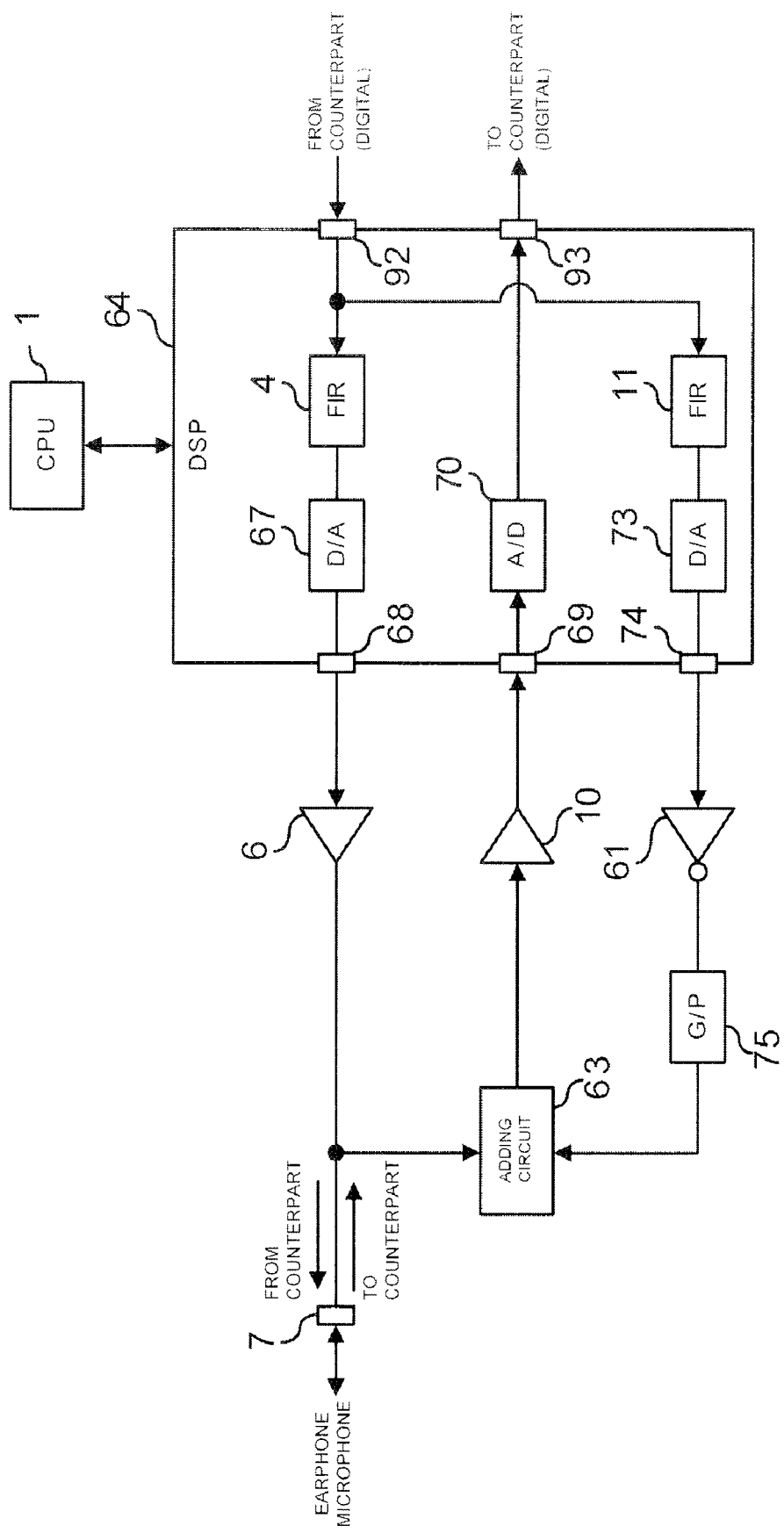
FIG. 22 depicts a block diagram of a twelfth embodiment of the echo preventing circuit and the digital signal processing circuit included in the echo preventing circuit, according to the present invention.

Exemplary Configurations of Echo Preventing Circuit and Digital Signal Processing Circuit FIG. 22 depicts a twelfth embodiment. FIG. 22 depicts a block diagram of an example of the echo preventing circuit and the digital signal processing circuit included in the echo preventing circuit, according to the present invention. In the echo preventing circuit shown in FIG. 22, the structural requirements same as those of the above tenth embodiment are given the same reference numerals and the description therefor is omitted. The echo preventing circuit does not include the AD converter 66 as in the configuration of the tenth embodiment.

In the embodiment, a signal indicating the sound transmitted from the counterpart is inputted into the input terminal 92 as a digital signal. The circuit is adapted to output through the output terminal 93 the digital signal outputted from the AD converter 70. A digital signal outputted from the output terminal 93 is outputted as a digital output signal corresponding to the sound signal from the input/output terminal 7. By configuring the echo preventing circuit as above, the interfacing signal between the echo preventing circuit and apparatuses, etc., applied with the circuit may be a digital signal. That is, when the echo preventing circuit is applied to an apparatus that can output a digital signal, no signal needs to be converted into an analog signal by any DA converter to interface with the echo preventing circuit and no output signal from the echo preventing circuit needs to be converted into a digital signal by any AD converter. Therefore, the AD converter and the DA converter can be excluded and, therefore, cost reduction and power consumption reduction can be realized.

Thirteenth Embodiment

Figure 23:
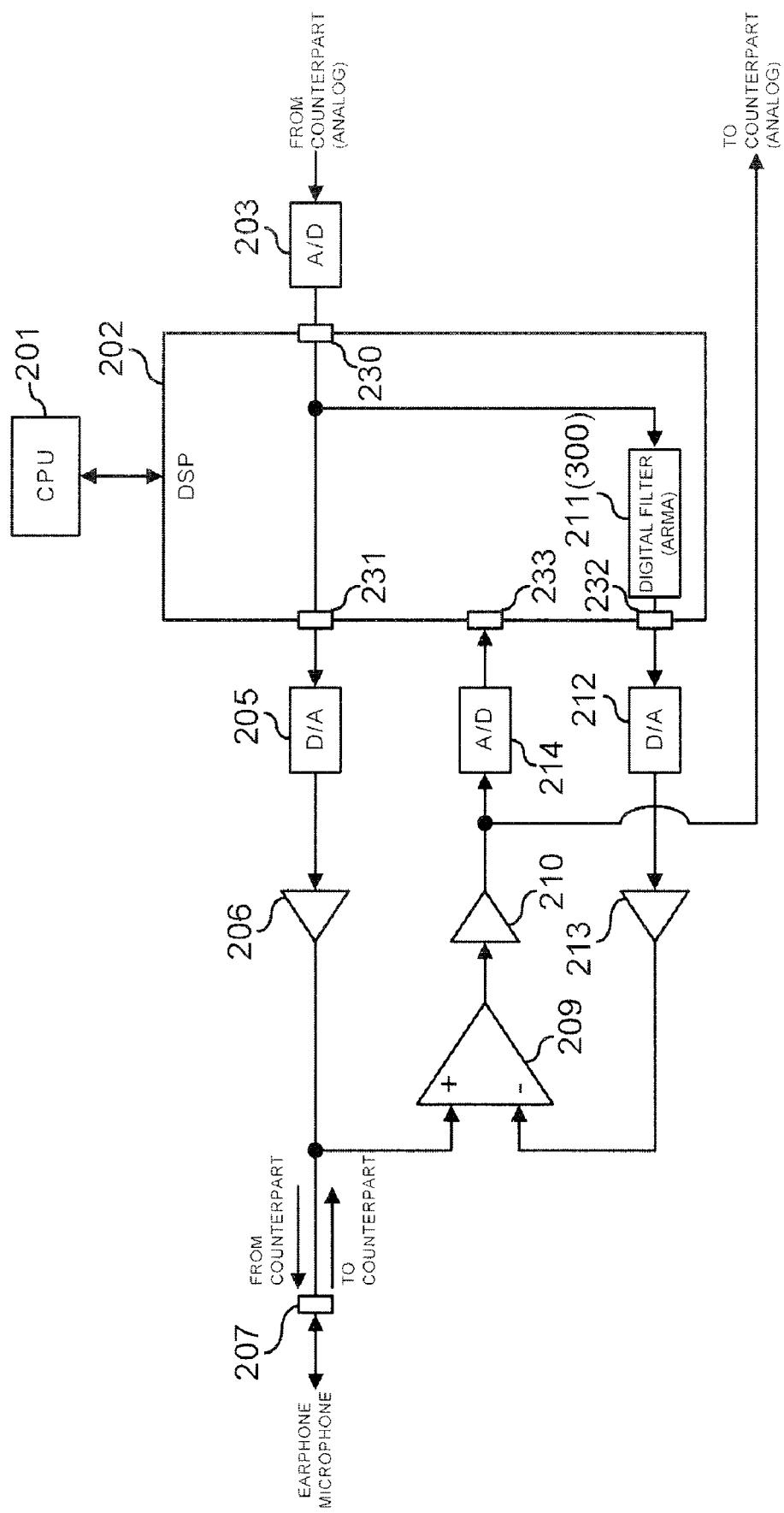
FIG. 23 depicts a block diagram of a thirteenth embodiment of the echo preventing circuit and the digital signal processing circuit included in the echo preventing circuit, according to the present invention.

Exemplary Configurations of Echo Preventing Circuit and Digital Signal Processing Circuit FIG. 23 depicts a thirteenth embodiment. FIG. 23 depicts a block diagram of an example of the echo preventing circuit and the digital signal processing circuit (a DSP 202) included in the echo preventing circuit, according to the present invention.

The echo preventing circuit includes a CPU 201, the DSP 202, an AD converter 203, a DA converter 205, an amplifying circuit 206, an input/output terminal 207, a differential amplifying circuit 209, an amplifying circuit 210, an AD converter 214, a DA converter 212, and the amplifying circuit 213. Though the CPU 201 is a structural requirement in the embodiment, the CPU 201 may not be a structural requirement.

The DSP 202 includes an input terminal 230, an output terminal 231, a digital filter (ARMA: Auto-Regressive Moving Average) 211 (300) (hereinafter, "digital filter 211") 211, an output terminal 232, and an input terminal 233. The digital filter 211 corresponds to the filter circuit of the present invention.

The AD converter 203 is inputted with, for example, a sound signal. The AD converter 203 inputs a digital signal formed by applying an analog/digital conversion process to the sound signal, into the DSP 202 through the input terminal 230.

The digital signal inputted into the DSP 202 is outputted through the output terminal 231 and is inputted into the digital filter 211. The digital filter 211 applies a filtering process to the digital signal based on the filter coefficients of the digital filter 211 and outputs the processed signal to the output terminal 232.

The DA converter 205 is inputted with a digital signal from the DSP 202 through the output terminal 231. The DA converter 205 applies a digital/analog conversion process to the digital signal and outputs the converted analog signal to the amplifying circuit 206. The amplifying circuit 206 amplifies the analog signal by a predetermined amplification factor and outputs the amplified signal.

The input/output terminal 207 is connected to, for example, an apparatus that generates sound based on an analog signal (for example, an earphone microphone or a speaker). The analog signal from the amplifying circuit 206 is outputted to the apparatus connected thereto through the input/output terminal 207. The input/output terminal 207 is connected to, for example, an apparatus that converts sound into a sound signal and outputs the sound signal (for example, an earphone microphone, a microphone). The input/output terminal 207 is inputted with a sound signal from an apparatus connected thereto. As a result, through the input/output terminal 7, the sound signal is inputted into a positive input terminal of the differential amplifying circuit 209. The signal outputted through the input/output terminal 207 is reflected through the apparatus connected thereto, is inputted from the input/output terminal 207, and is inputted into the positive input terminal of the differential amplifying circuit 209. In this case, the "signal reflected" collectively refers to signals such as the one that travels back through an earphone microphone, etc., and the one that is formed by converting reflected sound of sound outputted from the earphone microphone and reflected inside an ear, into a sound signal by the earphone microphone. The input/output terminal 207 is not a terminal into which an output signal (for example, an analog signal) is inputted or which outputs an input signal (for example, a sound signal), exclusively. For example, the input/output terminal 207 may simultaneously be inputted with an output signal and output an input signal. An input/output signal shared line is a line that is connected to the input/output terminal 207.

The DA converter 212 is inputted with an output signal from the digital filter 211 through the output terminal 232.

The DA converter 212 applies a digital/analog converting process to the output signal from the digital filter 211 and outputs the obtained analog signal to the amplifying circuit 213. The amplifying circuit 213 amplifies the analog signal by a predetermined amplification factor and outputs the amplified analog signal to a negative input terminal of the differential amplifying circuit 209.

The differential amplifying circuit 209 outputs a sound signal from the input/output terminal 207 to the amplifying circuit 210. The amplifying circuit 210 amplifies the sound signal by a predetermined amplification factor and outputs the amplified sound signal to the AD converter 214. The positive input terminal of the differential amplifying circuit 209 is inputted with the analog signal from the amplifying circuit 206. The differential amplifying circuit 209 outputs a signal formed by amplifying the difference between the analog signal from the amplifying circuit 206 inputted into the positive input terminal of the circuit 209 and the analog signal from the amplifying circuit 213 inputted into the negative input terminal of the circuit 209. The analog signal outputted from the amplifying circuit 210 is outputted as an output signal corresponding to the sound signal from the input/output terminal 207.

The AD converter 214 applies an analog/digital converting process to the sound signal from the amplifying circuit 210 and inputs the obtained digital signal to the DSP 202 through the input terminal 233. The digital signal inputted through the input terminal 233 is used to set the filter coefficients of the digital filter 211.

The CPU 201 controls the entire echo preventing circuit. When the CPU 201 is inputted with, for example, a resetting signal to reset the echo preventing circuit, the CPU 201 outputs to the DSP 202 an instructing signal to cause an impulse response acquiring process described below to be executed. The CPU 201 outputs to the DSP 202, for example, the other logic value "0" as the initial operation of the impulse response acquiring process. Though, in response to the inputting of the resetting signal, the CPU 201 outputs the instructing signal to cause the impulse response acquiring process to be executed in the embodiment, the operation is not limited to this. For example, the CPU 201 may output the above instructing signal to the DSP 202 when the CPU 201 detects turning on of the power to operate the echo preventing circuit and the DSP 202. The CPU 201 may output the above instructing signal to the DSP 202 when the CPU 201 detects electric variation of the analog circuit (for example, variation of the amplitude of the output of the amplifying circuit 210).

Filter Coefficients of Digital Filter 211

Figure 24:
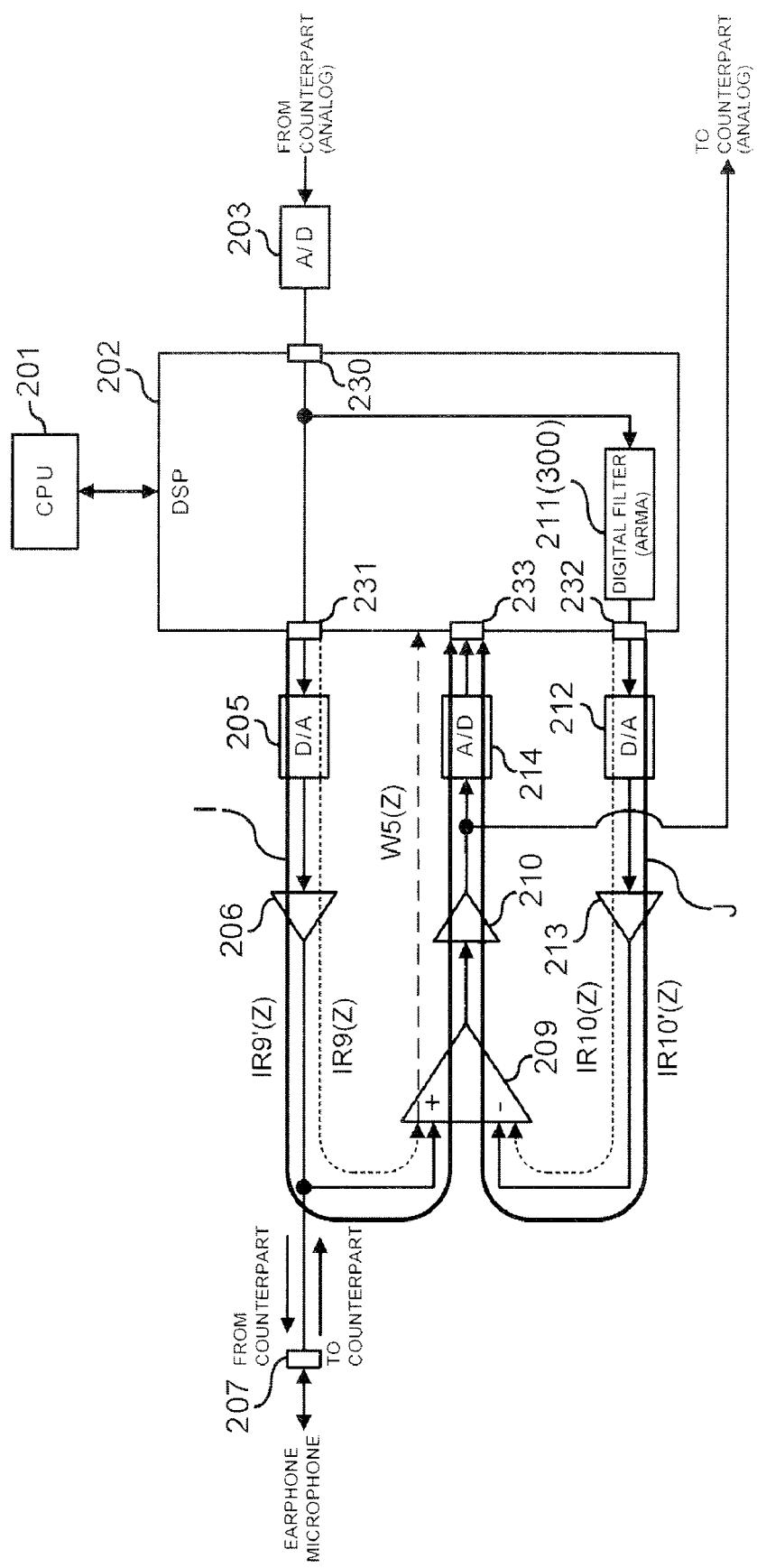
FIG. 24 depicts paths I and J of the echo preventing circuit shown in FIG. 23.

Description will be given in detail for the filter coefficients of the digital filter 211 referring to FIG. 24. FIG. 24 depicts paths I and J of the echo preventing circuit shown in FIG. 23. The earphone microphone 18 can be connected to the input/output terminal 207. When an analog signal outputted from the input/output terminal 207 is inputted into the earphone microphone 18, the earphone microphone 18 outputs sound by vibrating a diaphragm not shown based on the analog signal. The earphone microphone 18 generates and outputs an analog signal by capturing using the diaphragm vibration of the eardrum when a person wearing the earphone microphone 18 in his/her ear emanates sound. The analog signal outputted from the earphone microphone 18 is inputted from the input/output terminal 207. The path I may be a path that includes the earphone microphone 18 as in the first embodiment.

As above, the analog signal from the amplifying circuit 206 may be inputted into not only the output from the input/output terminal 207 but also the positive input terminal of the differential amplifying circuit 209. That is, the positive input terminal of the differential amplifying circuit 209 is inputted with a signal formed by combining the analog signal from the amplifying circuit 206 and the signal inputted into the input/output terminal 207. In this case, echoes due to the analog signal generate. Otherwise, echoes generate due to the sound signal inputted from the input/output terminal 207 and the analog signal from the amplifying circuit 206 being superposed on each other and inputted into the positive input terminal of the differential amplifying circuit 209. The filter coefficients of the digital filter 211 are set such that the echoes are prevented.

The impulse response (the transfer function) of a section from the output terminal 231 to the positive input terminal of the differential amplifying circuit 209 indicated by a dotted line of FIG. 24 is set as IR9(Z). The impulse response (the transfer function) of a section from the output terminal 232 to the negative input terminal of the differential amplifying circuit 209 indicated by a dotted line of FIG. 24 is set as IR10(Z). The impulse response (a transfer function) of a section from the latter stage of the positive/negative input terminal of the differential amplifying circuit 209 to the input terminal 233 indicated by a dotted line of FIG. 24 is set as W5(Z).

Assuming that the filter coefficients of the digital filter 211 are Q(Z), Q(Z) must be provided such that the following equation holds to cancel the signal inputted into the positive input terminal of the differential amplifying circuit 209 using the signal inputted into the negative input terminal thereof.

$$IR9(Z)=IR10(Z)\cdot Q(Z)$$

That is, Q(Z) may be provided such that the following equation holds.

$$Q(Z)=IR9(Z)/IR10(Z)$$

However, the impulse responses that the DSP 202 can acquire are an impulse response (a transfer function) IR9'(Z)(=IR9(Z)·W5(Z)) of the path I indicated by a solid line of FIG. 24 and an impulse response (a transfer function) IR10'(Z)(=−IR10(Z)·W5(Z)) of the path J. Why the phase of IR10(Z) is inversed is because the signal is inputted into the negative input terminal of the differential amplifying circuit 209.

In this case, the following equation shows the condition that enables the signal traveling on the path I and the signal traveling on the path J to cancel each other.

$$-IR9'(Z)=IR10'(Z)\cdot Q(Z)$$

That is, it can be seen that Q(Z) may be provided such that the following equation holds.

$$Q(Z)=-IR9'(Z)/IR10'(Z)$$

That is, the characteristic of the digital filter 211 can be realized by forming the characteristic thereof by adding a phase-converted transfer characteristic IR9'(Z) and the characteristic of an inverted filter of IR10'(Z). By setting the filter coefficients of the digital filter 211 as above, the differential amplifying circuit 209 can cancel the signal traveling on the path I using the signal traveling on the path J. As a result, the above echoes generated when the digital signal is inputted into the input terminal 230 can be prevented.

In the echo preventing circuit shown in the embodiment, the analog signal outputted from the amplifying circuit 210 is outputted as the analog output signal corresponding to the sound signal from the input/output terminal 207. Therefore, no DA converter is necessary to convert again the digital signal outputted from the AD converter 214 into an analog signal and, therefore, the cost and the power consumption can be reduced.

To set the above filter coefficients in the digital filter 211, the DSP 202 and the digital filter 211 respectively have the following configurations.

Details of Configurations of DAP 202 and Digital Filter 211

Figure 25A:
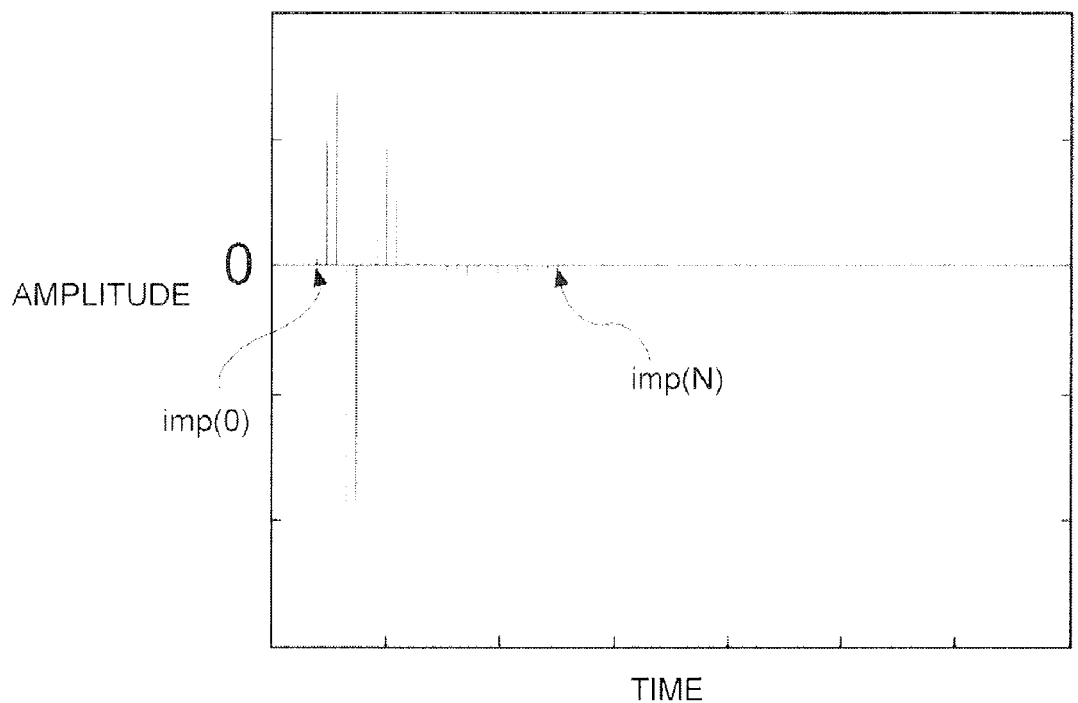
FIG. 25A depicts an impulse response of the path I shown in FIG. 24.
Figure 25B:
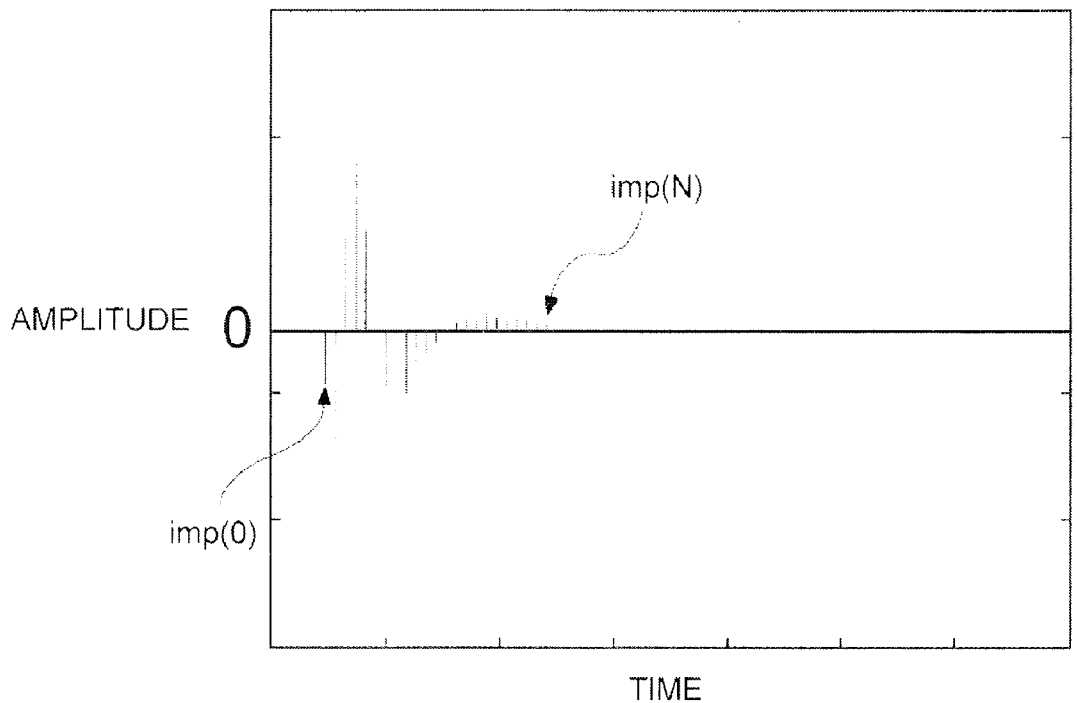
FIG. 25B depicts an impulse response of the path J shown in FIG. 24.
Figure 26:
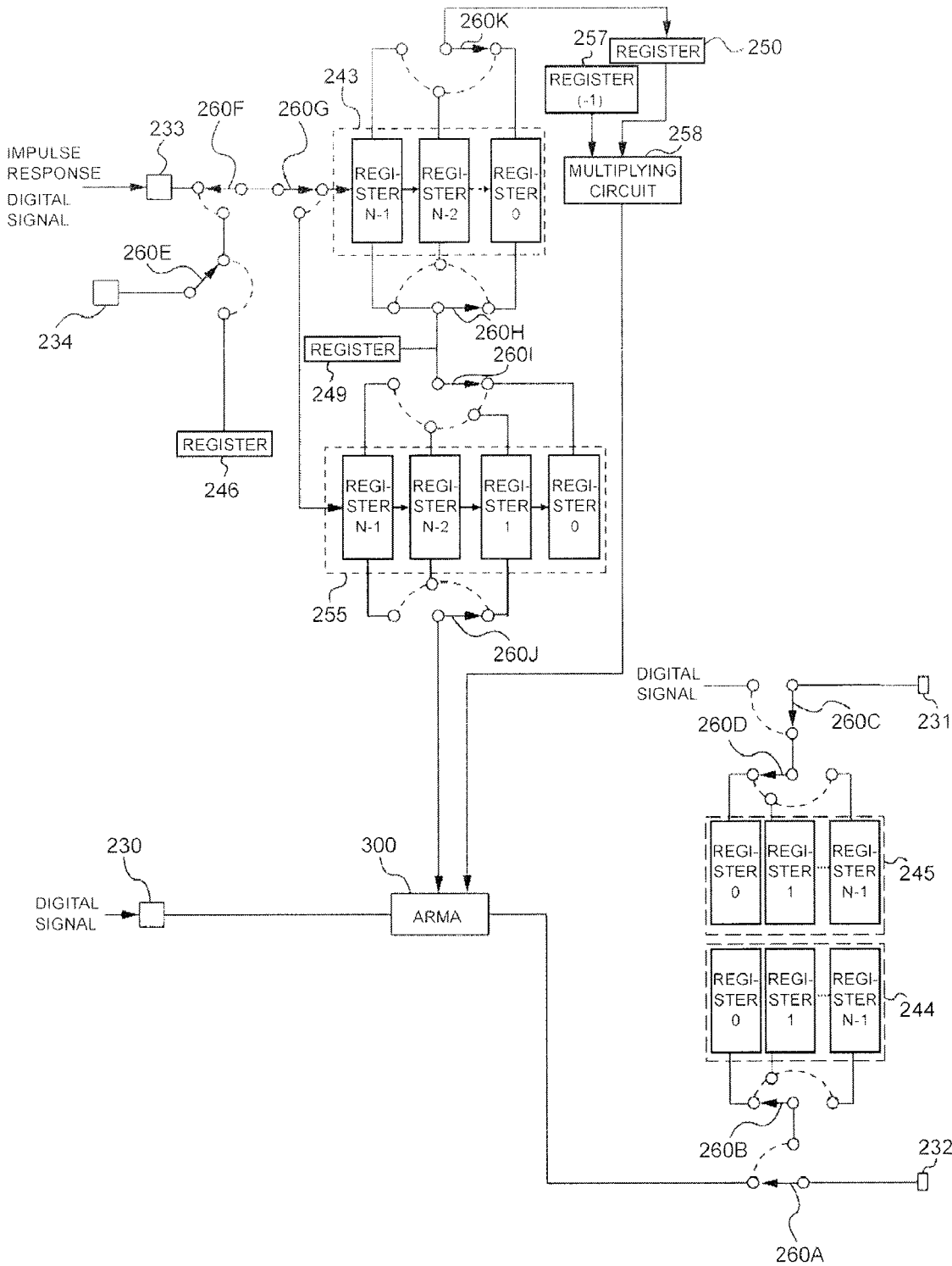
FIG. 26 depicts a part of the configuration of a DSP 202.
Figure 27:
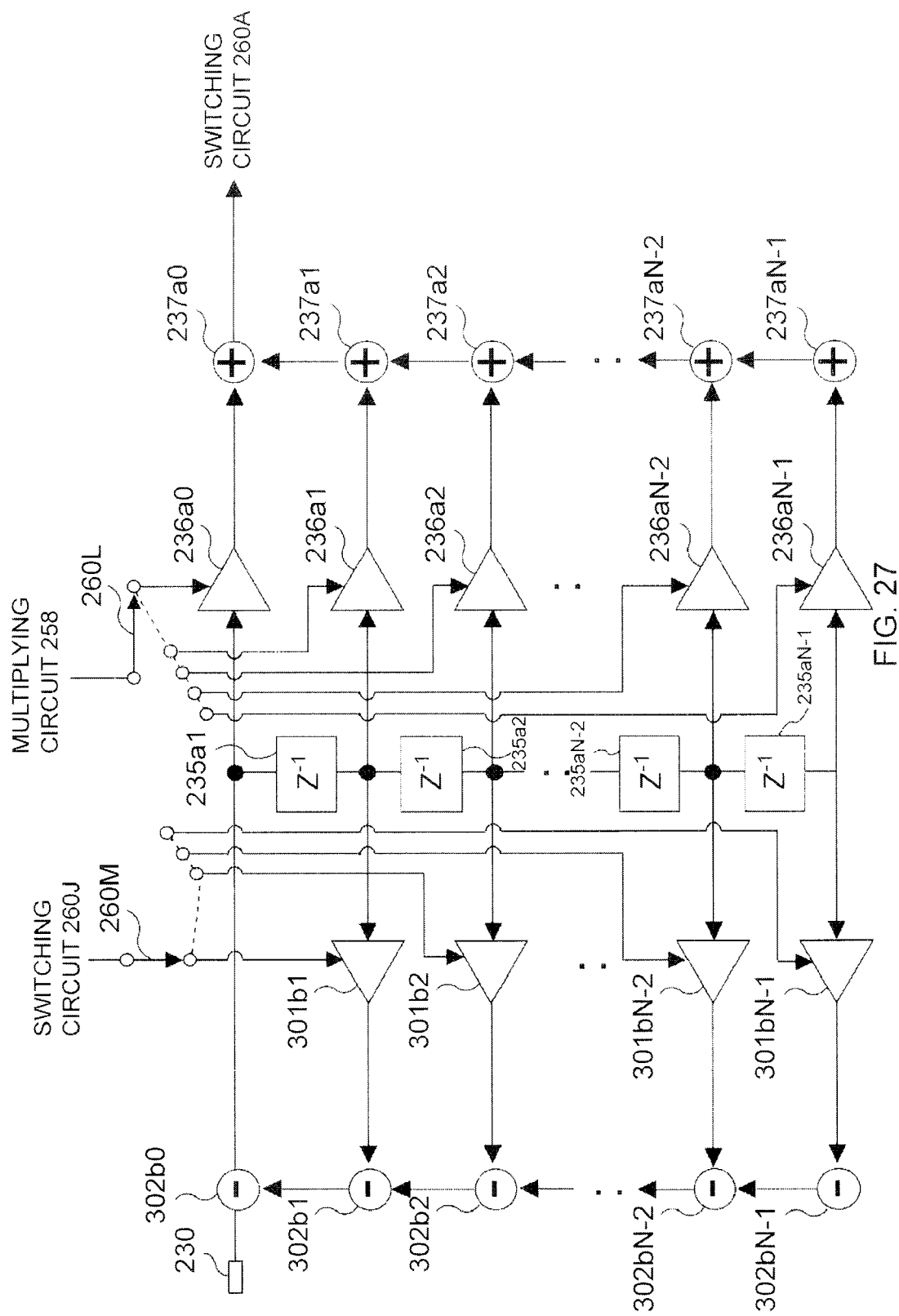
FIG. 27 depicts a block diagram of the configuration of an ARMA filter 300 shown as an example of a digital filter 211.

Description will be given in detail for the configurations of DSP 202 and the digital filters 211 that is a structural requirement of the DSP 202 referring to FIGS. 23 to 27. FIG. 25A depicts the impulse response IR9'(Z) of the path I shown in FIG. 24. FIG. 25B depicts the impulse response IR10'(Z) of the path J shown in FIG. 24. FIG. 26 depicts a block diagram of a part of the configuration of the DSP 202 and, more specifically, depicts a block diagram of the part of the configuration of the DSP 202 to set the filter coefficients of the digital filter 211 based on the impulse responses IR9'(Z) and IR10'(Z). FIG. 27 depicts a block diagram of the configuration of the ARMA filter 300 shown as an example of the digital filter 211. More specifically, the ARMA filter 300 is an example of a filter having a characteristic formed by adding a characteristic of an inverted filter of IR10'(Z) to phase-inverted IR9'(Z). Though an ARMA filter is used in the embodiment, the filter is not limited to this. Any digital filter to which the above filter coefficients can be set may be used.

As shown in FIG. 26, the DSP 202 includes impulse memories 244 and 245, registers 246, 249, 250, and 257, switching circuits 260A to 260K, and a multiplying circuit 258.

As shown in FIG. 27, the ARMA filter 300 includes delaying circuits 235a1 to 235aN−1, multiplying circuits 236a0 to 236aN−1 and 301b1 to 301bN−1, adding circuits 237a0 to 237aN−1 and 302b0 to 302bN−1, and switching circuits 260L to 260M.

The register 249 is inputted with the other logic value "0" as above from the CPU 201.

The impulse memories 244 and 245 each include N registers "0" to "N−1". When the impulse response IR9'(Z) of the path I represented by a solid line of FIG. 24 is acquired in the impulse response acquiring process described below, the register 0 of the impulse memory 245 stores, for example, the one logic value "1". The other registers 1 to N−1 of the impulse memory 245 each store the other logic value "0". The register 245, the registers 0 to N−1 of the impulse memory each store the other logic value "0".

When the impulse response IR10'(Z) of the path J represented by a solid line of FIG. 24 is acquired in the impulse response acquiring process described below, the register 0 of the impulse memory 244 stores, for example, the one logic value "1". The other registers 1 to N−1 of the impulse memory 244 each store the other logic value "0". The register 246 and the registers 0 to N−1 of the impulse memory 245 each store the other logic value "0".

The impulse response storing memory 243 includes N registers "0" to "N−1". The registers 0 to N−1 of the impulse response storing memory 243 respectively store impulse responses imp(0) to (N−1) (=IR9'(Z)) for each sampling cycle of the path I through the input terminal 233 due to switching by the DSP 202 of the switching circuit 260F to the side of the input terminal 233 and the switching circuit 260G to the side of the impulse response storing memory 243. For example, the register N−1 stores the impulse response imp(0) through the input terminal 233. The register N−1 stores the next impulse response imp(1) and the register N−2 stores the impulse response imp(0) stored in the register N−1. By repeating this process, the registers 0 to N−1 of the impulse response storing memory 243 respectively store impulse responses imp(0) to (N−1) (=IR9'(Z)). The "sampling cycle" is a temporal interval between impulse responses imp(0) to (N−1) shown in FIG. 25A. The impulse response storing memory 243 is cleared by the other logic value "0" stored in the register 249 due to switching by the DSP 202 of the switching circuit 260H sequentially from the register 0 to the register N−1.

The impulse response storing memory 255 includes N registers 0 to N−1. The registers 0 to N−1 of the impulse response storing memory 255 store respectively the impulse responses imp(0) to (N−1) (=IR10'(Z)) for each sampling cycle on the path J through the input terminal 233 due to switching by the DSP 202 of the switching circuit 260F to the side of the input terminal 233 and of the switching circuit 260G to the side of the impulse response storing memory 255. The storing of the impulse responses imp(0) to (N−1) into the registers 0 to N−1 of the impulse response storing memory 255 is same as that of the impulse response storing memory 243 as above. The impulse response storing memory 255 is cleared by the other logic value "0" stored in the register 249 due to switching by the DSP 202 of the switching circuit 260I sequentially from the register 0 to the register N−1.

The register 250 stores temporarily the impulse responses imp(0) to (N−1) from the impulse response storing memory 243. The register 254 stores temporarily the impulse responses imp(0) to (N−1) from the impulse response storing memory 255.

The register 257 stores in advance binary data indicating "−1" to invert by the multiplying circuit 258 the phase of the impulse responses imp(0) to (N−1) stored in the impulse response storing memory 243.

The multiplying circuit 258 outputs to the ARMA filter 300 the multiplication result obtained by multiplying the value of the register 250 and the value of the register 257. More specifically, due to switching by the DSP 202 of the switching circuit 260K sequentially from the register 0, the register 250 is sequentially inputted with the impulse responses imp(0) to (N−1) from the registers 0 to N−1 of the impulse response storing memory 243. Due to sequential multiplication by the multiplying circuit 258 of the value of the register 250 and the value of the register 257, impulse responses −imp(0) to (N−1) obtained by inverting the phase of the impulse responses imp(0) to (N−1) are outputted to the ARMA filter 300.

The delaying circuit 235a1 to 235aN−1 each delay the digital signal Xn inputted through the input terminal 230 by one sampling cycle and each output the delayed signal. For example, the delaying circuit 235a1 outputs the digital signal Xn−1 formed by delaying the phase of the digital signal Xn by one sampling cycle, to the multiplying circuits 236a1 and 301b1, the delaying circuit 235a2. The delaying circuit 235aN−1 outputs the digital signal Xn−(N−1) to the multiplying circuits 236aN−1 and 301aN−1.

The multiplying circuits 301b1 to 301bN−1 and the subtracting circuits 302b0 to 302bN−1 constitute the inverted filter of the above IR10'(Z).

For the multiplying circuits 301b1 to 301bN−1, the impulse responses imp(1) to (N−1) stored in the register 1 to N−1 of the impulse response storing memory 255 are respectively set as the multiplication coefficients. More specifically, due to switching by the DSP 202 of the switching circuit 260J sequentially from the register 1 and of the switching circuit 260M sequentially from the multiplying circuit 301b1, the impulse responses imp(1) to (N−1) are sequentially inputted and the multiplication coefficients of the multiplying circuits 301b1 to 301bN−1 are set. The multiplying circuits 301b1 to 301bN−1 multiply the digital signals Xn−1 to Xn−(N−1) from the delaying circuits 235a1 to 235aN−1 by the multiplying coefficients set for the digital signals and output the multiplication results to the subtracting circuits 302b1 to 302bN−1.

The subtracting circuits 302b1 to 302bN−1 output toward the direction indicated by an arrow of FIG. 27 the subtraction results obtained by subtracting the digital signal inputted from the multiplying circuits 301b1 to 301bN−1. The subtracting circuit 302b0 subtracts the subtraction result from the subtracting circuit 302b1 from the digital signal inputted through the input terminal 230. As a result, the subtraction result of the subtracting circuit 302b0 is a subtraction result obtained by subtracting the multiplication result of the multiplying circuits 301b1 to 301bN−1 from the digital signal inputted through the input terminal 230.

For the multiplying circuits 236a0 to 236aN−1, the phase-inverted impulse responses −imp(0) to (N−1) from the multiplying circuit 258 are respectively set as the multiplication coefficients. More specifically, due to switching by the DSP 202 of the switching circuit 260L sequentially from the multiplying circuit 236a0, the phase-inverted impulse responses imp(0) to (N−1) are sequentially inputted and the multiplication coefficients of the multiplying circuits 236a0 to 236aN−1 are set. The multiplying circuits 236a1 to 236aN−1 multiply the digital signals Xn−1 to Xn−(N−1) from the delaying circuits 235a1 to 235aN−1 by the multiplying coefficients set for the digital signals and output the multiplication results to the adding circuits 237a1 to 237aN−1. The multiplying circuit 236a0 is inputted with the above subtraction result from the subtracting circuit 302b0, multiplies the inputted subtraction result by the multiplication coefficient (−imp(0)), and outputs the multiplication result obtained to the adding circuit 237a0.

The adding circuits 237a1 to 237aN−1 output toward the direction indicated by an arrow of FIG. 27 the addition results obtained by adding the digital signals inputted from the multiplying circuits 236a to 236aN−1. The adding circuit 237a0 adds the addition result from the adding circuit 237a1 and multiplication result from the multiplying circuit 236a0. As a result, the addition result of the adding circuit 237a0 is a result obtained by applying a filtering process using the ARMA filter 300 to which the above filter coefficients are set when the digital signal is inputted into the input terminal 230.

Figure 28:
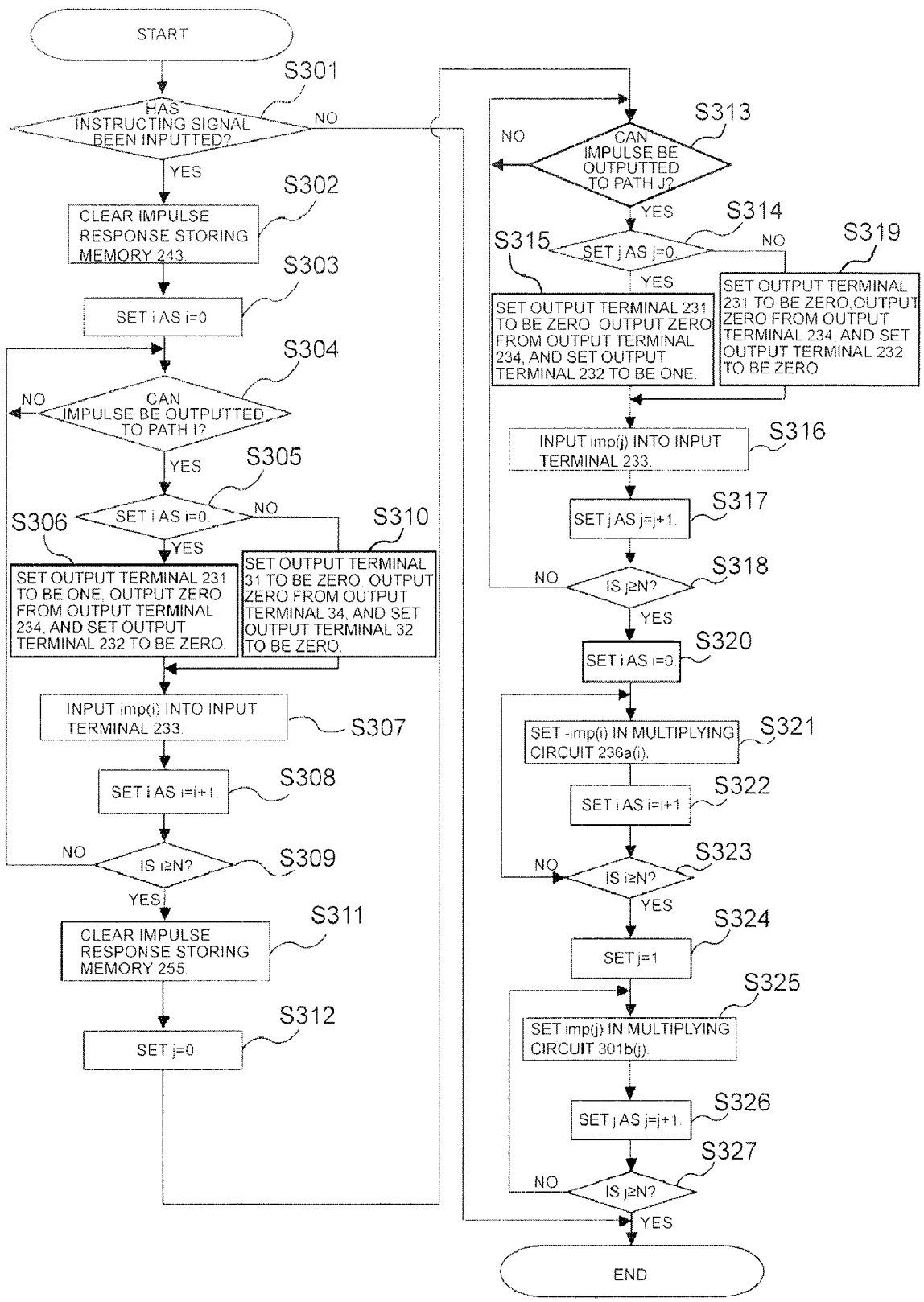
FIG. 28 depicts a flowchart of a process operation in the thirteenth embodiment.

Setting of Filter Coefficients of ARMA Filter 300 by Impulse Response Acquiring Process Description will be given for operations of an impulse response acquiring process and filter coefficients setting for the ARMA 300 by the echo preventing circuit and the digital signal processing circuit included in the echo preventing circuit referring to FIGS. 23 to 28. In the embodiment, description will be given using the above multiplication coefficients setting of the multiplying circuits 236a0 to 236aN−1 and 301b1 to 301bN−1 of the ARMA filter 300 as an example of the filter coefficients setting for the digital filter 211. FIG. 28 depicts a flowchart of an example of operations of the echo preventing circuit and the digital signal processing circuit included in the echo preventing circuit.

When the CPU 201 is inputted with, for example, a resetting signal to reset the echo preventing circuit, the CPU 201 outputs to the DSP 202 an instructing signal to cause the DSP 202 to execute the impulse response acquiring process. The CPU 201 outputs to the DSP 202 the other logic value "0" as the initial operation of the impulse response acquiring process. The other logic value "0" inputted into the DSP 202 is inputted into the register 249.

The DSP 202 judges whether the above instructing signal from the CPU 201 has been inputted (S301). When the DSP 202 judges that the instructing signal from the CPU 201 has been inputted (S301 YES), the DSP 202 switches the switching circuit 260H sequentially from the register 0 to the register N−1. As a result, the contents of the registers 0 to N−1 of the impulse response storing memory 243 are cleared by the other logic value "0" stored in the register 249 (S302). Description will be given hereinafter denoting an "i"th impulse response to be stored in the impulse response storing memory 243 as imp(i) (i=0, . . . , N−1). The DSP 202 sets i as i=0 (S303) to acquire an impulse response imp(0) to be stored in the register N−1 of the impulse response storing memory 243, sets the input terminal 230 at a high impedance, and executes the following processes.

The DSP 202 judges whether an impulse output from the output terminal 231 to a path I is possible (S304) to acquire the impulse response imp(0) of the path I shown in FIG. 24. For example, the judgment by the DSP 202 is executed by judging whether the state is present where a signal is being outputted from the output terminal 231 and a signal is being inputted into the input terminal 233. If an impulse is outputted in the state where a signal is being outputted from the output terminal 231 and a signal is being inputted into the input terminal 233, an accurate impulse response imp(0) may not be acquired.

When the DSP 202 judges that an impulse output to the path I is possible (S304·YES), the DSP 202 judges whether i=0 (S305). Because i=0 at S303, the DSP 202 judges that i=0 (S305·YES). The DSP 202 causes the register 0 of the impulse memory 245 to store the one logic value "1". The DSP 202 also causes other registers 1 to N−1 of the impulse memory 245, the register 246, and the registers 0 to N−1 of the impulse memory 244 to store the other logic value "0" each. The DSP 202 switches the switching circuit 260C to the side of the impulse memory 245, the switching circuit 260A to the side of the impulse memory 244, and the switching circuit 260E to the side of the register 246. The DSP 202 switches the switching circuit 260F to the side of the input terminal 233 and the switching circuit 260G to the side of the impulse response storing memory 243. The DSP 202 switches each of the switching circuits 260D and 260B to the side of the register 0. As a result, an impulse caused by the one logic value "1" stored in the register 0 of the impulse memory 245 is outputted from the output terminal 231 (S306). The impulse outputted from the output terminal 231 travels on the path I and is inputted into the input terminal 233 (S307). As a result, the impulse response imp(0) can be acquired (FIG. 25A·imp(0)). This impulse response imp(0) is first stored in the register N−1 of the impulse response storing memory 243.

To acquire an impulse response imp(1), the DSP 202 increments i to be i=i+1=1 (S308). Because the acquired impulse response has not yet reached imp(N−1), the DSP 202 judges that i is not i≧N (S309·NO) and the process of the above S304 is repeated once again. Because i=1≠0 at S308 (S305·NO), the DSP 202 switches the each of the switching circuits 260D and 260B to the side of the register 1. As a result, the output terminal 231 outputs no impulse (S310). Therefore, the input terminal 233 is inputted with an impulse imp(1) formed by delaying by one sampling cycle the phase of the impulse outputted at S305. This impulse response imp(1) is stored in the register N−1 of the impulse response storing memory 243 and the impulse response imp(0) stored in the register N−1 is stored in the register N−2. In this manner, by repeating the processes at S304 to S309 until $i \geq N$ (S309·YES), impulse responses imp(0) to imp(N−1) (=IR9'(Z)) are acquired. As a result, the registers 0 to N−1 of the impulse response storing memory 243 respectively store the impulse responses imp(0) to imp(N−1).

The DSP 202 switches the switching circuit 2601 sequentially from the register 0 to the register N−1. As a result, the register 0 to the register N−1 of the impulse response storing memory 255 are cleared by the other logic value "0" stored in the register 249 (S311). Description will be given hereinafter denoting a "j"th impulse response to be stored in the impulse response storing memory 255 as imp(j) (j=0, . . . , N−1). The DSP 202 sets j as j=0 (S312) to acquire an impulse response imp(0) to be stored in the register N−1 of the impulse response storing memory 255 and executes the following processes.

The DSP 202 judges whether an impulse output to the path J is possible (S314) to acquire the impulse response imp(0) of the path J shown in FIG. 24. This judgment by the DSP 202 is same as that at S304 as above.

When the DSP 202 judges that an impulse output to the path J is possible (S313·YES), the DSP 202 judges whether j=0 (S314). Because j=0 at S312, the DSP 202 judges that j=0 (S314·YES). The DSP 202 causes the register 0 of the impulse memory 244 to store the one logic value "1". The DSP 202 also causes other registers 1 to N−1 of the impulse memory 244, the register 246, and the registers 0 to N−1 of the impulse memory 245 to store the other logic value "0" each. The DSP 202 switches the switching circuit 260G to the side of the impulse response storing memory 255. The DSP 202 switches each of the switching circuits 260D and 260B to the register 0. As a result, an impulse caused by the one logic value "1" stored in the register 0 of the impulse memory 244 is outputted from the output terminal 232 (S315). The impulse outputted from the output terminal 232 travels on the path J and is inputted into the input terminal 233 (S316). As a result, the impulse response imp(0) can be acquired (FIG. 25B·imp(0)). This impulse response imp(0) is first stored in the register N−1 of the impulse response storing memory 255.

To acquire an impulse response imp(1), the DSP 202 increments j to be j=j+1=1 (S317). Because the acquired impulse response has not yet reached imp(N−1), the DSP 202 judges that i is not $i \geq N$ (S318·NO) and the process at the above S313 is repeated once again. Because j=1≠0 at S317 (S314·NO), the DSP 202 switches the switching circuits 260D and 260B to the side of the register 1 each. As a result, the output terminal 232 outputs no impulse (S319). Therefore, the input terminal 233 is inputted with an impulse imp(1) formed by delaying by one sampling cycle the phase of the impulse outputted at S315. This impulse response imp(1) is stored in the register N−1 of the impulse response storing memory 255 and the impulse response imp(0) stored in the register N−1 is stored in the register N−2. In this manner, by repeating the processes at S313 to S318 until $i \geq N$ (S318·YES), impulse responses imp(0) to imp(N−1) (=IR10'(Z)) are acquired. As a result, the registers 0 to N−1 of the impulse response storing memory 255 store the impulse responses imp(0) to imp(N−1).

To cause the phase of the impulse responses imp(0) to imp(N−1) stored in the registers 0 to N−1 of the impulse response storing memory 243 to be inverted, the DSP 202 switches the switching circuit 260K to sequentially from the register 0. As a result, the impulse responses imp(0) to (N−1) from the registers 0 to N−1 of the impulse response storing memory 243 are sequentially inputted into the multiplying circuit 258 through the register 250. The multiplying circuit 258 outputs to the ARMA filter 300 the multiplication results obtained by multiplying sequentially the value of the register 250 and the value of the register 257. As a result, the impulse responses −imp(0) to (N−1) obtained by inverting the phase of the impulse responses imp(0) to (N−1) are sequentially outputted to from the multiplying circuit 258 to the ARMA filter 300.

The DSP 202 executes the following processes to set the impulse responses −imp(0) to (N−1) from the multiplying circuit 258 as the multiplication coefficients respectively in the multiplying circuits 236a0 to 236aN−1. To set the impulse response −imp(0) from the multiplying circuit 258 as the multiplication coefficients of the multiplying circuit 260a0, the DSP 202 first sets i as i=1 (S320) and switches the switching circuit 260L to the side of the multiplying circuit 236a0. As a result, the impulse response −imp(0) is set as the multiplication coefficients of the multiplying circuit 236a0 (S321). To set the impulse response −imp(1) from the multiplying circuit 258 as the multiplication coefficients of the multiplying circuit 260a1, the DSP 202 increments i to be i=i+1=1 (S322). The DSP 202 judges that i is not $i \geq N$ (S323·NO) because the multiplication coefficients are not yet set to the multiplying circuit 236aN−1, and switches the switching circuit 260L to the side of the multiplying circuit 236a1. As a result, the impulse response −imp(1) is set as the multiplication coefficient of the multiplying circuit 236a1 (S321). In this manner, by repeating the processes at S321 to S323 until $i \geq N$ (S323·YES), the impulse responses −imp(0) to (N−1) from the multiplying circuit 258 are set as the multiplication coefficients of the multiplying circuits 236a0 to 236aN−1.

To cause impulse responses imp(1) to (N−1) stored in the registers 1 to N−1 of the impulse response storing memory 255 to be outputted to the ARMA filter 300, the DSP 202 switches the switching circuit 260J sequentially from the register 1. As a result, the impulse responses imp(1) to imp(N−1) from the registers 1 to N−1 of the impulse response storing memory 255 are sequentially outputted to the ARMA filter 300.

The DSP 202 executes the following processes to set the impulse responses imp(1) to (N−1) from the impulse response storing memory 255 as the multiplication coefficients respectively in the multiplying circuits 301b1 to 301bN−1. To set the impulse response imp(1) from the impulse response storing memory 255 as the multiplication coefficient of the multiplying circuit 301b1, the DSP 202 first sets j as j=1 (S324) and switches the switching circuit 260M to the side of the multiplying circuit 301b1. As a result, the impulse response imp(1) is set as the multiplication coefficient of the multiplying circuit 301b1 (S325). To set the impulse response imp(2) from the impulse response storing memory 255 as the multiplication coefficient of the multiplying circuit 301b2, the DSP 202 increments j to be j=j+1=1 (S326). The DSP 202 judges that j is not $j \geq N$ (S327·NO) because the multiplication coefficients are not yet set to the multiplying circuit 301bN−1, and switches the switching circuit 260M to the side of the multiplying circuit 301b2. As a result, the impulse response imp(2) is set as the multiplication coefficient of the multiplying circuit 301b2 (S325). In this manner, by repeating the processes at S325 to S327 until $j \geq N$ (S327·YES), the impulse responses imp(1) to (N−1) from the impulse response storing memory 255 are set as the multiplication coefficients of the multiplying circuits 301*b*1 to 301*b*N−1.

Though the description has been given using hardware (for example, the switching circuit 260) about the above processes according to the above embodiment, the present invention is not limited to this. For example, the above processes may be stored in advance in a ROM (Read Only Memory), etc., as program data and a processor included in the DSP 202 may read the program data and may process.

Fourteenth Embodiment

Figure 29:
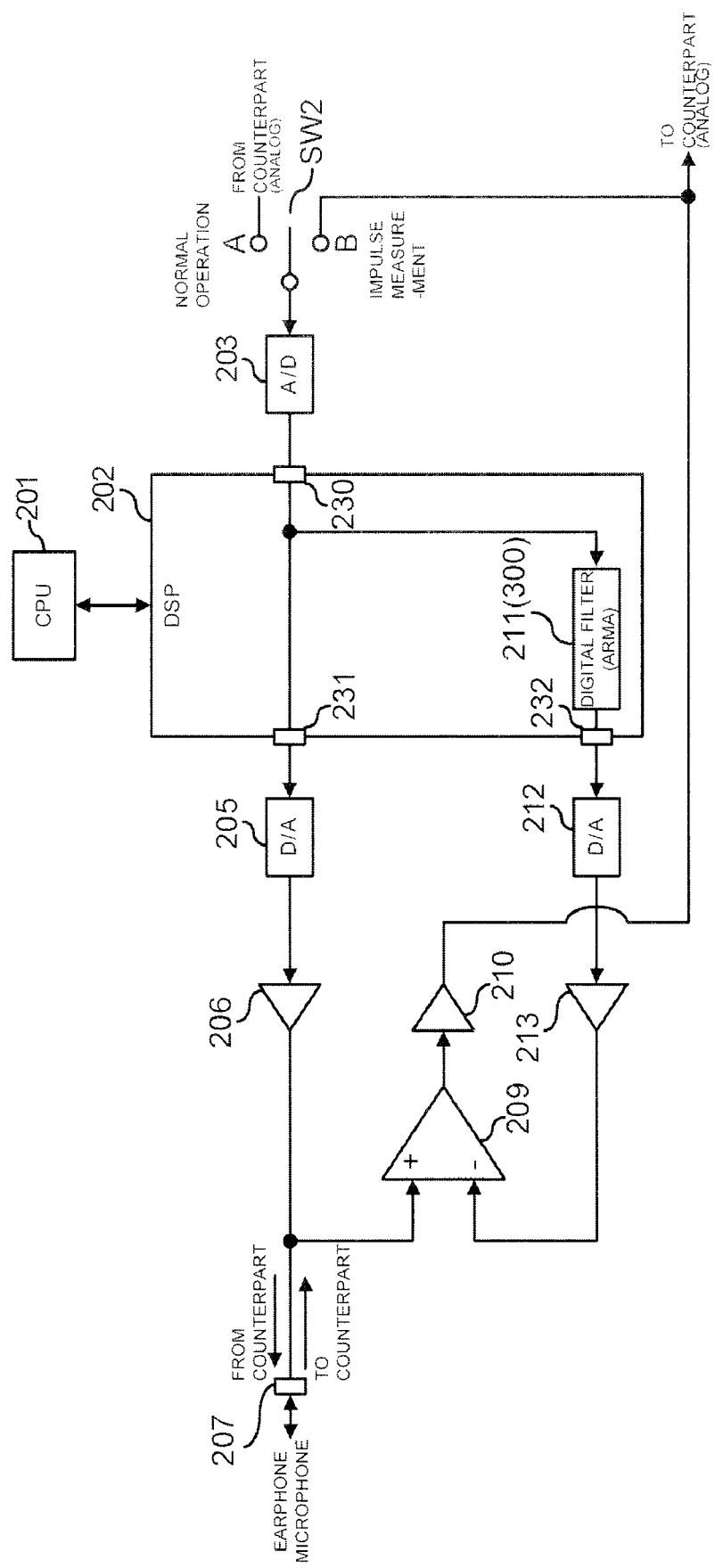
FIG. 29 depicts a block diagram of a fourteenth embodiment of the echo preventing circuit and the digital signal processing circuit included in the echo preventing circuit, according to the present invention.

Exemplary Configurations of Echo Preventing Circuit and Digital Signal Processing Circuit FIG. 29 depicts a fourteenth embodiment. FIG. 29 depicts a block diagram of an example of the echo preventing circuit and the digital signal processing circuit included in the echo preventing circuit, according to the present invention. In the echo preventing circuit shown in FIG. 29, the structural requirements same as those of the above thirteenth embodiment are given the same reference numerals and the description therefor is omitted. The echo preventing circuit does not include the AD converter 214 in the configuration of the thirteenth embodiment and, instead, includes a switching circuit SW2.

The switching circuit SW2 is inputted with an analog signal indicating the sound transmitted from a counterpart (a fifth analog signal) and an analog signal outputted from the amplifying circuit 210 (a fourth analog signal). The switching circuit SW2 selects either one of these input signals and outputs the selected signal to the AD converter 203 according to the control of the CPU 201, etc.

That is, in the embodiment, an impulse response can be acquired by switching the switching circuit SW2 to the side of "B". At this time, the AD converter 203 substitutes for the AD converter 214 in the thirteenth embodiment. When a process is executed to the sound transmitted from the counterpart, the switching circuit SW2 is switched to the side of "A".

By configuring as above, the AD converter 214 used in the thirteenth embodiment is not necessary and the cost and the power consumption can be reduced more.

Fifteenth Embodiment

Figure 30:
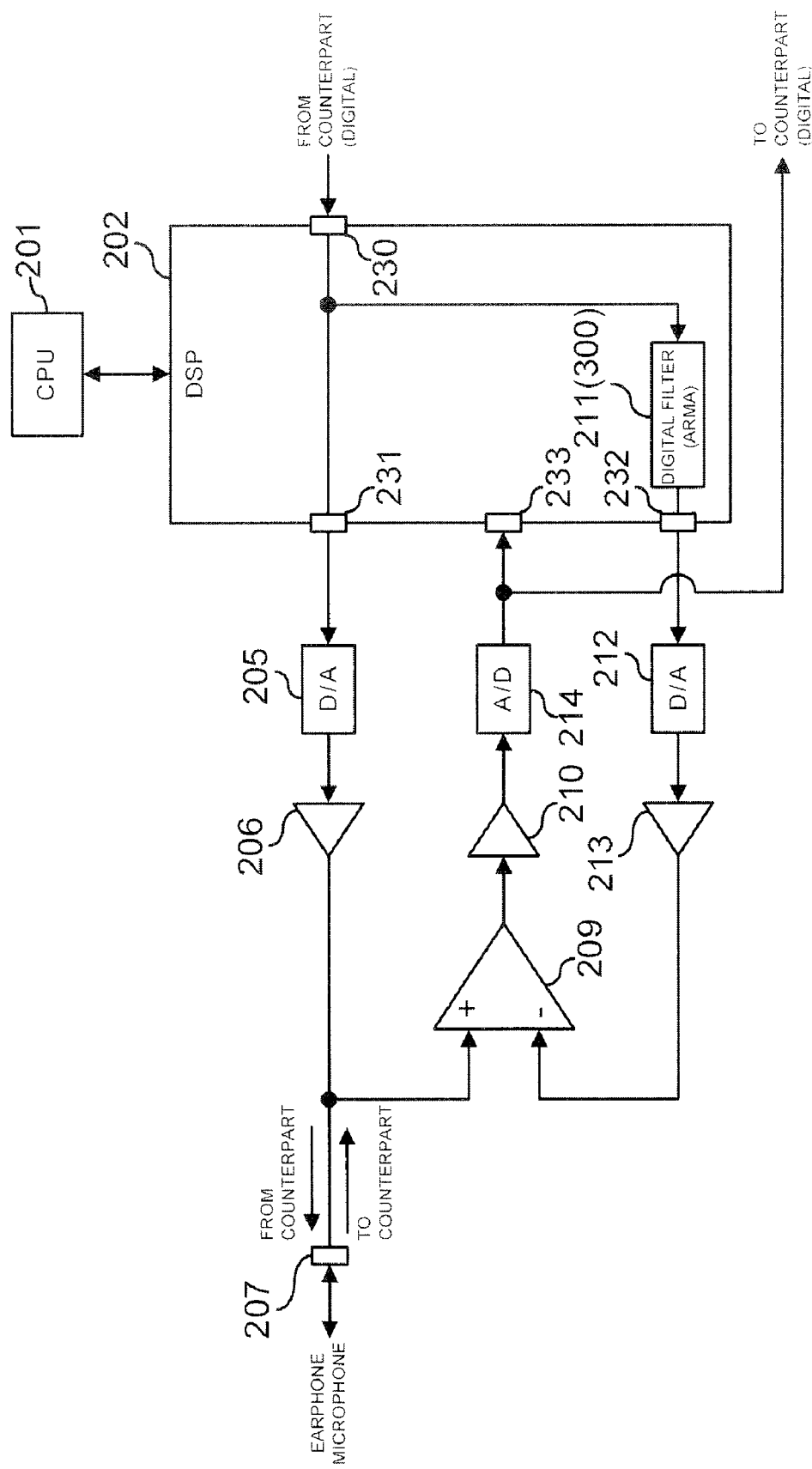
FIG. 30 depicts a block diagram of a fifteenth embodiment of the echo preventing circuit and the digital signal processing circuit included in the echo preventing circuit, according to the present invention.

Exemplary Configurations of Echo Preventing Circuit and Digital Signal Processing Circuit FIG. 30 depicts a fifteenth embodiment. FIG. 30 depicts a block diagram of an example of the echo preventing circuit and the digital signal processing circuit included in the echo preventing circuit, according to the present invention. In the echo preventing circuit shown in FIG. 30, the structural requirements same as those of the above thirteenth embodiment are given the same reference numerals and the description therefor is omitted. The echo preventing circuit does not include the AD converter 203 in the configuration of the thirteenth embodiment.

In the embodiment, a signal indicating the sound transmitted from the counterpart is inputted into the input terminal 230 as a digital signal. A signal outputted to the counterpart is a digital signal outputted from the AD converter 214. By configuring the echo preventing circuit as above, the interfacing signal between the echo preventing circuit and apparatuses, etc., applied with the circuit may be a digital signal. That is, when the echo preventing circuit is applied to an apparatus that can output a digital signal, the outputted digital signal does not need to be converted into an analog signal by any DA converter to interface with the echo preventing circuit and no output signal from the echo preventing circuit needs to be converted into a digital signal by any AD converter. Therefore, the AD converter and the DA converter can be excluded and, therefore, cost reduction and power consumption reduction can be realized.

Sixteenth Embodiment

Figure 31:
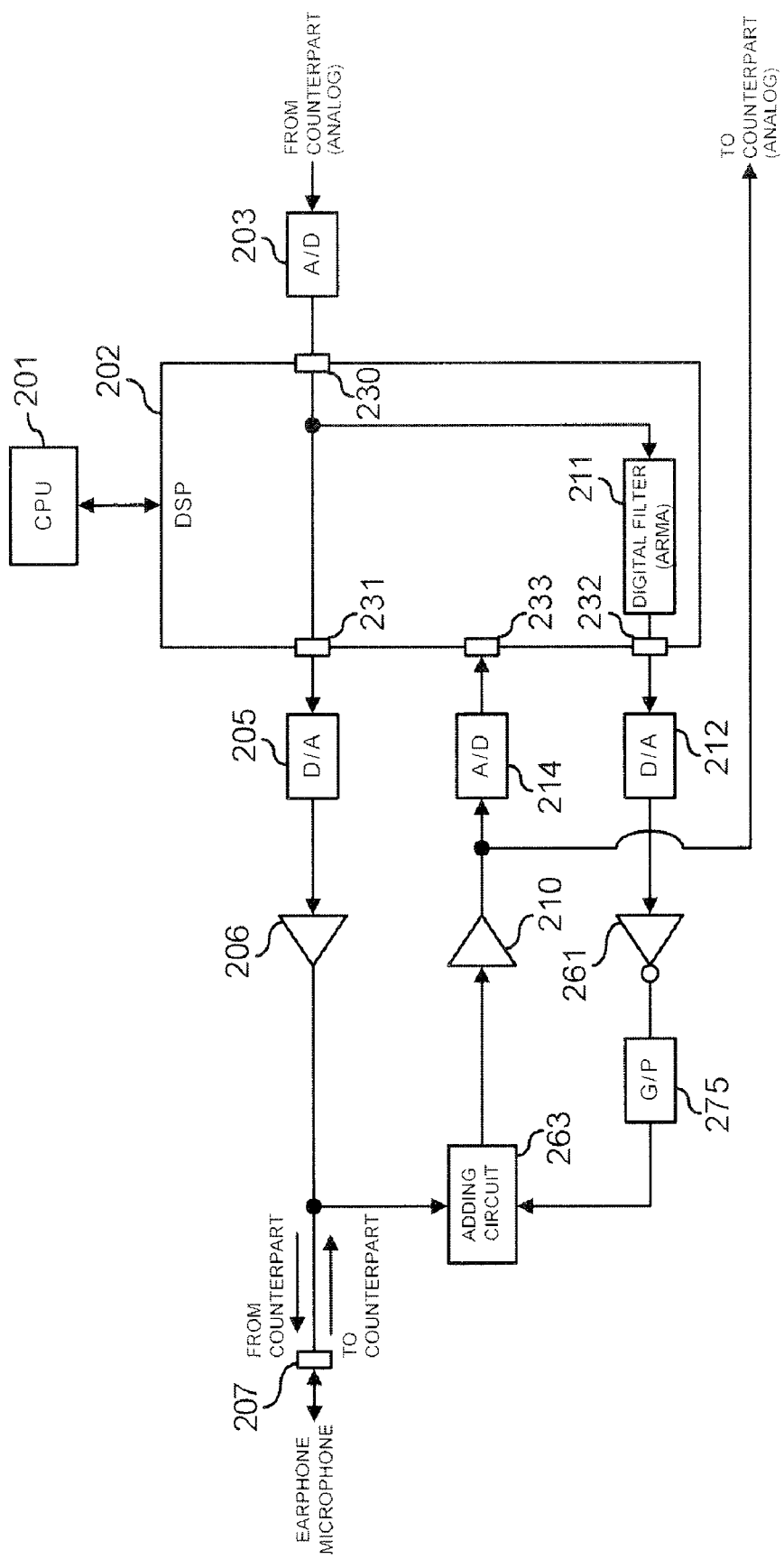
FIG. 31 depicts a block diagram of a sixteenth embodiment of the echo preventing circuit and the digital signal processing circuit included in the echo preventing circuit, according to the present invention.

Exemplary Configurations of Echo Preventing Circuit and Digital Signal Processing Circuit FIG. 31 depicts a sixteenth embodiment. FIG. 31 depicts a block diagram of an example of the echo preventing circuit and the digital signal processing circuit included in the echo preventing circuit. In the echo preventing circuit shown in FIG. 31, the structural requirements same as those of the above thirteenth embodiment are given the same reference numerals and the description therefor is omitted.

The echo preventing circuit includes the CPU 201, the DSP 202, the AD converter 203, the DA converter 205, the amplifying circuit 206, the input/output terminal 207, an adding circuit 263, the amplifying circuit 210, the AD converter 214, the DA converter 212, the inverting amplifying circuit 261, and the gain phase adjusting circuit (G/P) 275.

That is, the embodiment has a configuration that includes the inverting amplifying circuit 261, the gain phase adjusting circuit 275, and the adding circuit 263, instead of the differential amplifying circuit 209 and the amplifying circuit 213 in the thirteenth embodiment. Though the CPU 201 is a structural requirement also in the embodiment, the CPU 201 may not be a structural requirement.

The DSP 202 includes the input terminal 230, the output terminal 231, the digital filter 211, the output terminal 232, and the input terminal 233.

The inverting amplifying circuit 261 inverts the analog signal from the DA converter 212, amplifies the signal by a predetermined factor, and outputs the signal to the gain phase adjusting circuit 275.

The gain phase adjusting circuit 275 applies adjustment of the gain and the phase to the analog signal from the inverting amplifying circuit 261 and outputs the adjusted signal to the adding circuit 263. The adjustment of the gain and the phase of the analog signal by the gain phase adjusting circuit 275 is executed to generate an analog signal for which the phase thereof is inverted compared to that of the analog signal from the amplifying circuit 206 to prevent echoes generated when a digital signal is inputted into the input terminal 230.

The adding circuit 263 is inputted with the analog signal from the amplifying circuit 206. The adding circuit 263 adds the analog signal from the amplifying circuit 206 and the analog signal from the gain phase adjusting circuit 275, and outputs the addition result to the amplifying circuit 210. The adding circuit 263 outputs the sound signal from the input/output terminal 207 to the amplifying circuit 210.

Filter Coefficients of Digital Filter 211

Figure 32:
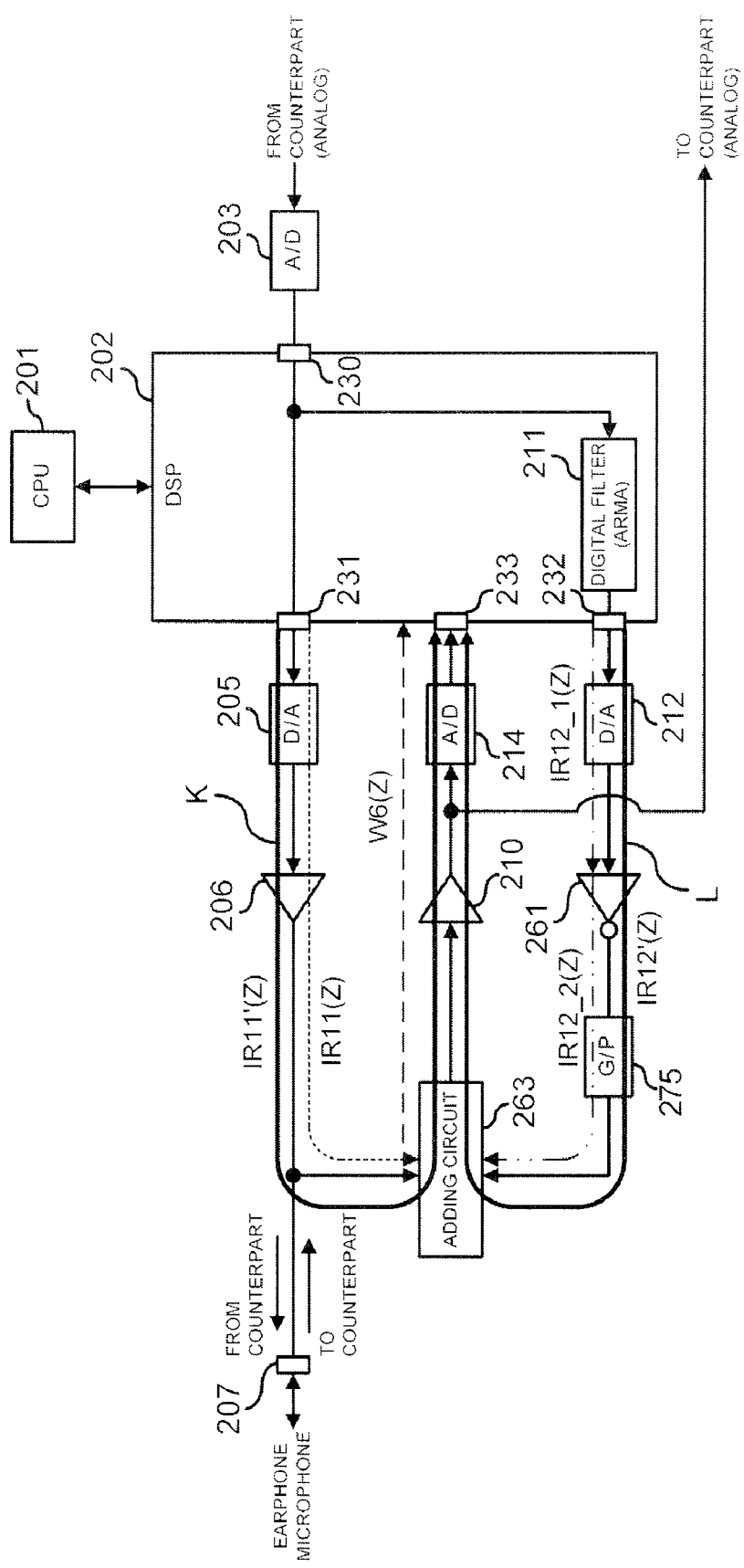
FIG. 32 depicts paths K and L of the echo preventing circuit shown in FIG. 31.

Description will be given in detail for the filter coefficients of the digital filter 211 referring to FIG. 32. FIG. 32 depicts path K and L of the echo preventing circuit shown in FIG. 32. The path K may be a path that includes the earphone microphone 18 as in the first embodiment.

As above, the analog signal from the amplifying circuit 206 may be inputted into not only the output from the input/output terminal 207 but also the adding circuit 263. In this case, echoes due to the analog signal generate. Otherwise, echoes generate due to the sound signal inputted from the input/output terminal 207 and the analog signal from the amplifying circuit 206 being superposed on each other and inputted into the adding circuit 263. The filter coefficients of the digital filter 211 are set such that the echoes are prevented.

The impulse response (the transfer function) of the section from the output terminal 231 to the input terminal of the adding circuit 263 indicated by a dotted line of FIG. 32 is set as IR11(Z). The impulse response (the transfer function) of a section from the output terminal 232 to the input of the inverting amplifying circuit 261 indicated by a dot and dash line of FIG. 32 is set as IR12_1(Z). The impulse response (a transfer function) of a section from the input of the inverting amplifying circuit 261 to the input terminal of the adding circuit 263 indicated by a two-dot and dash line of FIG. 32 is set as IR12_2(Z). IR12(Z)=−IR12_1(Z)·IR12_2(Z). The impulse response (a transfer function) of a section from the latter stage of each of input terminals of the adding circuit 263 to the input terminal 233 indicated by a dotted line of FIG. 32 is set as W6(Z).

Assuming that the filter coefficients of the digital filter 211 are Q(Z), Q(Z) must be provided such that the following equation holds, to cancel the signal from the amplifying circuit 206 using the signal from the gain phase adjusting circuit 275, in the adding circuit 263.

$$IR11(Z)=IR12(Z)·Q(Z)$$

That is, Q(Z) may be provided such that the following equation holds.

$$Q(Z)=IR11(Z)/IR12(Z)$$

However, the impulse responses that the DSP 202 can acquire are an impulse response (a transfer function) IR11'(Z)(=IR11(Z)·W6(Z)) of the path K indicated by a solid line of FIG. 32 and an impulse response (a transfer function) IR12'(Z) (=−IR12_1(Z)·IR12_2(Z)·W6(Z)) of the path L. Why the phase of IR12_1(Z) is inversed is because the phase of the impulse response is inverted by the inverting amplifying circuit 261.

In this case, the following equation shows the condition that enables the signal traveling on the path K and the signal traveling on the path L to cancel each other.

$$-IR11'(Z)=IR12'(Z)·Q(Z)$$

That is, it can be seen that Q(Z) may be provided such that the following equation holds.

$$Q(Z)=-IR11'(Z)/IR12'(Z)$$

That is, the characteristic of the digital filter 211 can be realized by forming the characteristic thereof by adding a phase-converted transfer characteristic IR11'(Z) and the characteristic of an inverted filter of IR12'(Z). By setting the filter coefficients of the digital filter 211 as above, the adding circuit 263 can cancel the signal traveling on the path K using the signal traveling on the path L. As a result, the above echoes generated when the digital signal is inputted into the input terminal 230 can be prevented.

In the echo preventing circuit shown in the embodiment, the analog signal outputted from the amplifying circuit 210 is outputted as the analog output signal corresponding to the sound signal from the input/output terminal 207. Therefore, no DA converter is necessary to convert again the digital signal outputted from the AD converter 214 into an analog signal and, therefore, the cost and the power consumption can be reduced.

The process to form the characteristic of the digital filter 211 by adding the phase-inverted IR11'(Z) and the characteristic of the inverted filter of IR12'(Z) is enabled by executing the process same as that of the thirteenth embodiment.

Seventeenth Embodiment

Figure 33:
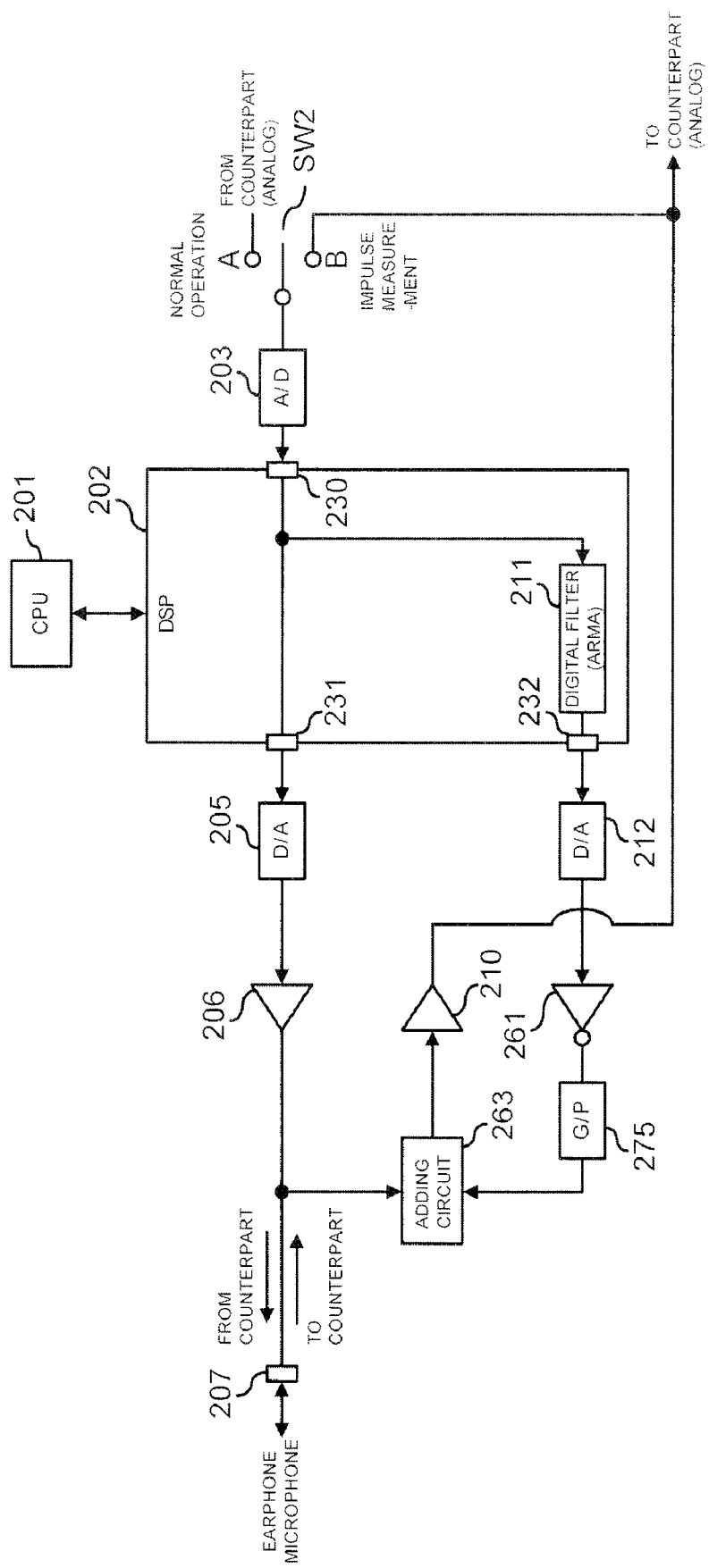
FIG. 33 depicts a block diagram of a seventeenth embodiment of the echo preventing circuit and the digital signal processing circuit included in the echo preventing circuit, according to the present invention.

Exemplary Configurations of Echo Preventing Circuit and Digital Signal Processing Circuit FIG. 33 depicts a seventeenth embodiment. FIG. 33 depicts a block diagram of an example of the echo preventing circuit and the digital signal processing circuit included in the echo preventing circuit, according to the present invention. In the echo preventing circuit shown in FIG. 33, the structural requirements same as those of the above sixteenth embodiment are given the same reference numerals and the description therefor is omitted. The echo preventing circuit does not include the AD converter 214 in the configuration of the sixteenth embodiment and, instead, includes a switching circuit SW2.

The switching circuit SW2 is inputted with an analog signal indicating the sound transmitted from a counterpart (the fifth analog signal) and an analog signal outputted from the amplifying circuit 210 (the fourth analog signal). The switching circuit SW2 selects either one of these input signals and outputs the selected signal to the AD converter 203 according to the control of the CPU 201, etc.

That is, in the embodiment, an impulse response can be acquired by switching the switching circuit SW2 to the side of "B". At this time, the AD converter 203 substitutes for the AD converter 214 in the sixteenth embodiment. When a process is executed to the sound transmitted from the counterpart, the switching circuit SW2 is switched to the side of "A".

By configuring as above, the AD converter 214 used in the sixteenth embodiment is not necessary and the cost and the power consumption can be reduced more.

Eighteenth Embodiment

Figure 34:
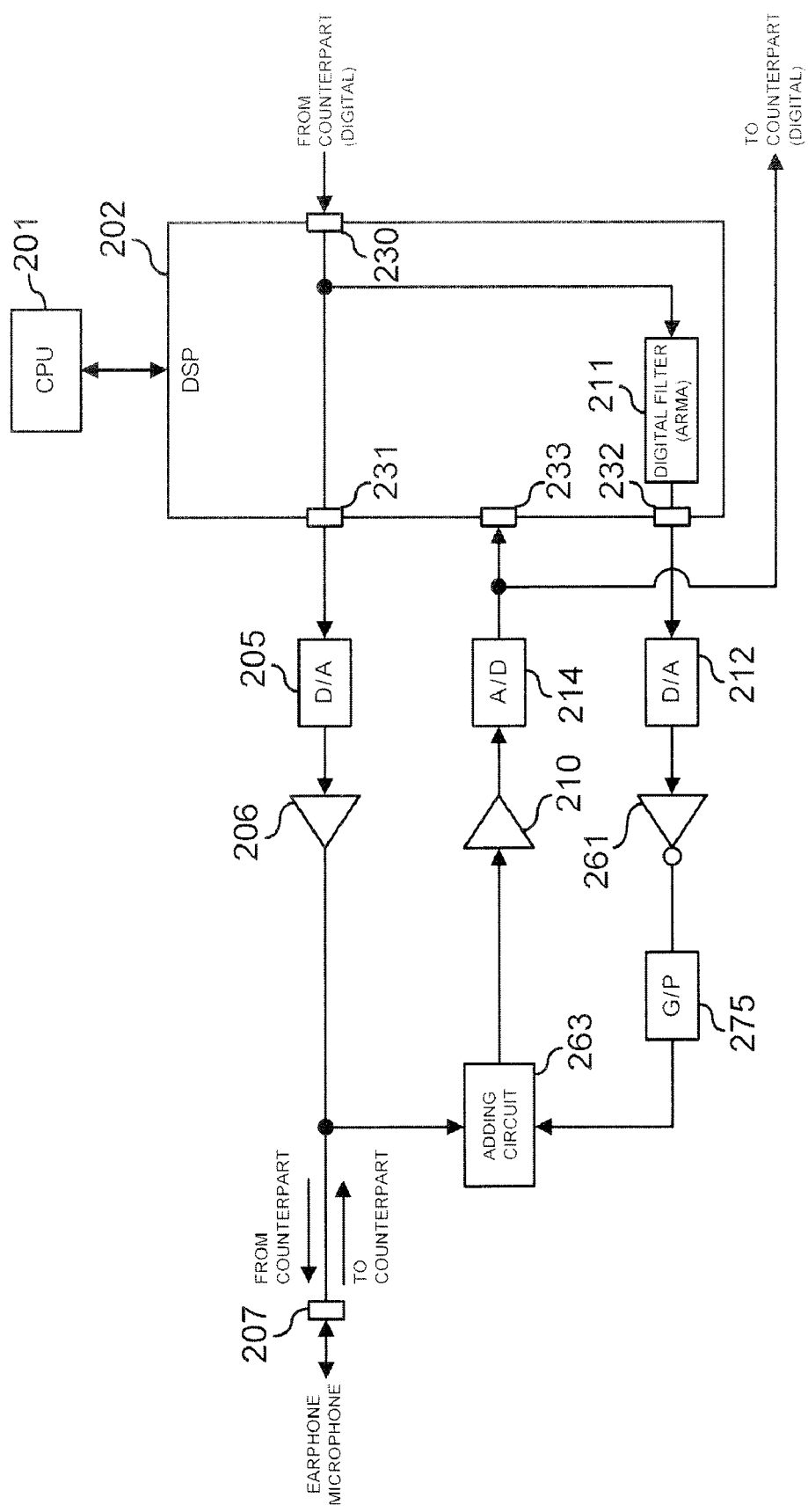
FIG. 34 depicts a block diagram of a eighteenth embodiment of the echo preventing circuit and the digital signal processing circuit included in the echo preventing circuit, according to the present invention.

Exemplary Configurations of Echo Preventing Circuit and Digital Signal Processing Circuit FIG. 34 depicts an eighteenth embodiment. FIG. 34 depicts a block diagram of an example of the echo preventing circuit and the digital signal processing circuit included in the echo preventing circuit, according to the present invention. In the echo preventing circuit shown in FIG. 34, the structural requirements same as those of the above sixteenth embodiment are given the same reference numerals and the description therefor is omitted. The echo preventing circuit does not include the AD converter 203 in the configuration of the sixteenth embodiment.

In the embodiment, a signal indicating the sound transmitted from the counterpart is inputted into the input terminal 230 as a digital signal. A signal outputted to the counterpart is a digital signal outputted from the AD converter 214. By configuring the echo preventing circuit as above, the interfacing signal between the echo preventing circuit and apparatuses, etc., applied with the circuit may be a digital signal. That is, when the echo preventing circuit is applied to an apparatus that can output a digital signal, the outputted digital signal does not need to be converted into an analog signal by any DA converter to interface with the echo preventing circuit and no output signal from the echo preventing circuit needs to be converted into a digital signal by any AD converter. Therefore, the AD converter and the DA converter can be excluded and, therefore, cost reduction and power consumption reduction can be realized.

Nineteenth Embodiment

Figure 35:
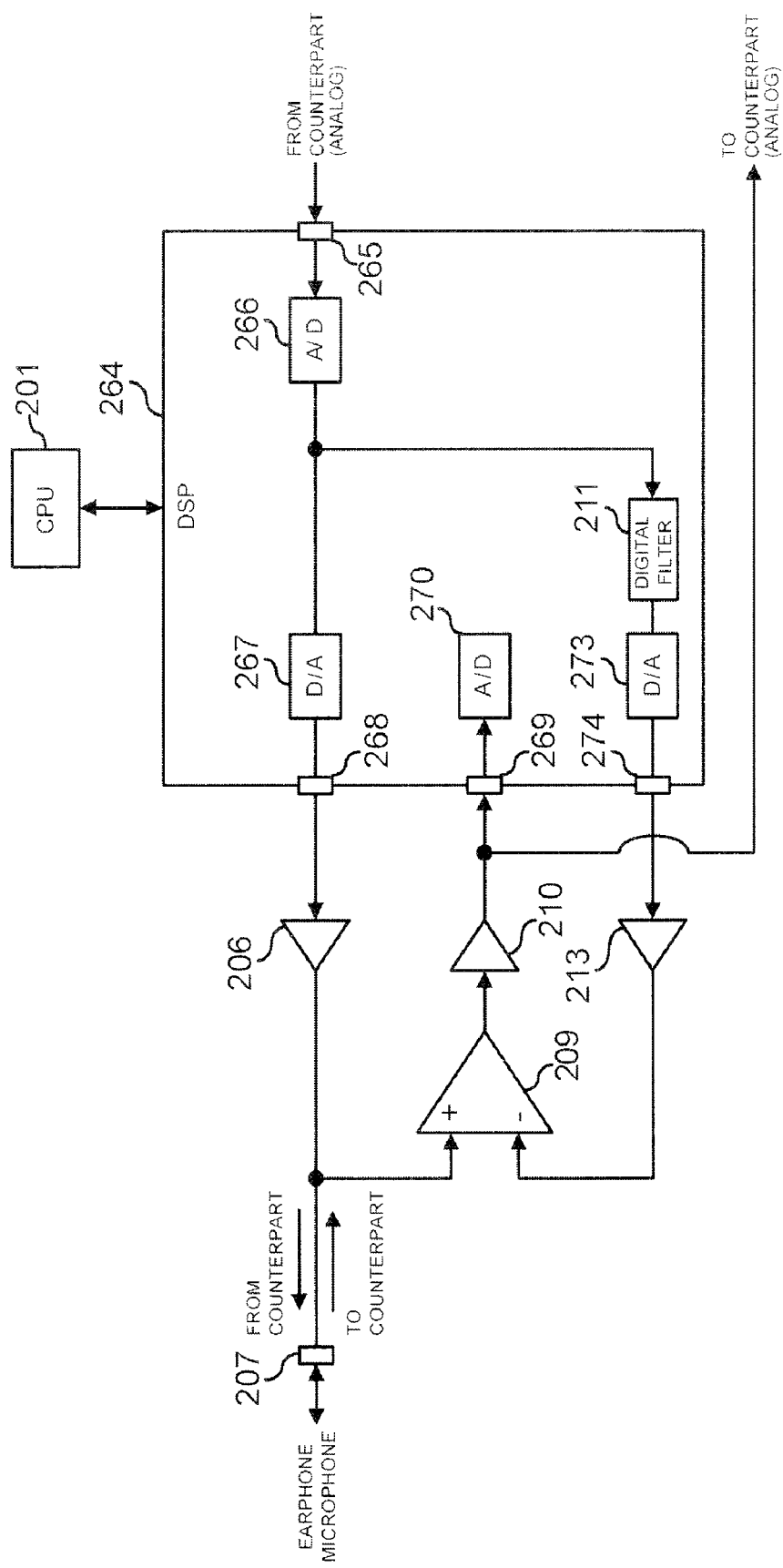
FIG. 35 depicts a block diagram of a nineteenth embodiment of the echo preventing circuit and the digital signal processing circuit included in the echo preventing circuit, according to the present invention.

Exemplary Configurations of Echo Preventing Circuit and Digital Signal Processing Circuit FIG. 35 depicts a nineteenth embodiment. FIG. 35 depicts a block diagram of an example of the echo preventing circuit and the digital signal processing circuit (a DSP 264) included in the echo preventing circuit. In the echo preventing circuit shown in FIG. 35, the structural requirements same as those of the above thirteenth embodiment are given the same reference numerals and the description therefor is omitted.

The echo preventing circuit includes the CPU 201, the DSP 264, the amplifying circuit 206, the input/output terminal 207, the differential amplifying circuit 209, the amplifying circuit 210, and the amplifying circuit 213. Though the CPU 201 is a structural requirement also in the embodiment, the CPU 201 may not be a structural requirement.

The DSP 264 includes an input terminal 265, an AD converter 266, a DA converter 267, an output terminal 268, an input terminal 269, an AD converter 270, the digital filter 211, a DA converter 273, and an output terminal 274.

That is, the embodiment is configured to include the AD converters 203 and 214 and the DA converters 205 and 212 inside the DSP 264. Similarly to the thirteenth embodiment, the analog signal outputted from the amplifying circuit 210 is outputted as the output signal corresponding to the sound signal from the input/output terminal 207.

The AD converter 266 is inputted with, for example, a sound signal through the input terminal 265. The AD converter 266 outputs a digital signal formed by applying an analog/digital conversion process to the sound signal, to the DA converter 267 and the digital filter 211.

The digital filter 211 applies a filtering process to the digital signal based on the filter coefficients of the digital filter 211 and outputs the processed signal to the DA converter 273.

The DA converter 267 outputs through the output terminal 268 an analog signal formed by applying a digital/analog conversion process to the digital signal. As a result, the amplifying circuit 206 is inputted with the analog signal from the DA converter 267.

The DA converter 273 applies a digital/analog converting process to the digital signal from the digital filter 211 and outputs the converted analog signal through the output terminal 274. As a result, the amplifying circuit 213 is inputted with the analog signal from the DA converter 273.

The AD converter 270 is inputted with the sound signal from the amplifying circuit 210 through the input terminal 269. The AD converter 270 applies an analog/digital converting process to the sound signal and inputs the converted digital signal to the DSP 264 through the input terminal 269. The digital signal inputted through the input terminal 269 is used to set the filter coefficients of the digital filter 211.

Filter Coefficients of Digital Filter 211

Figure 36:
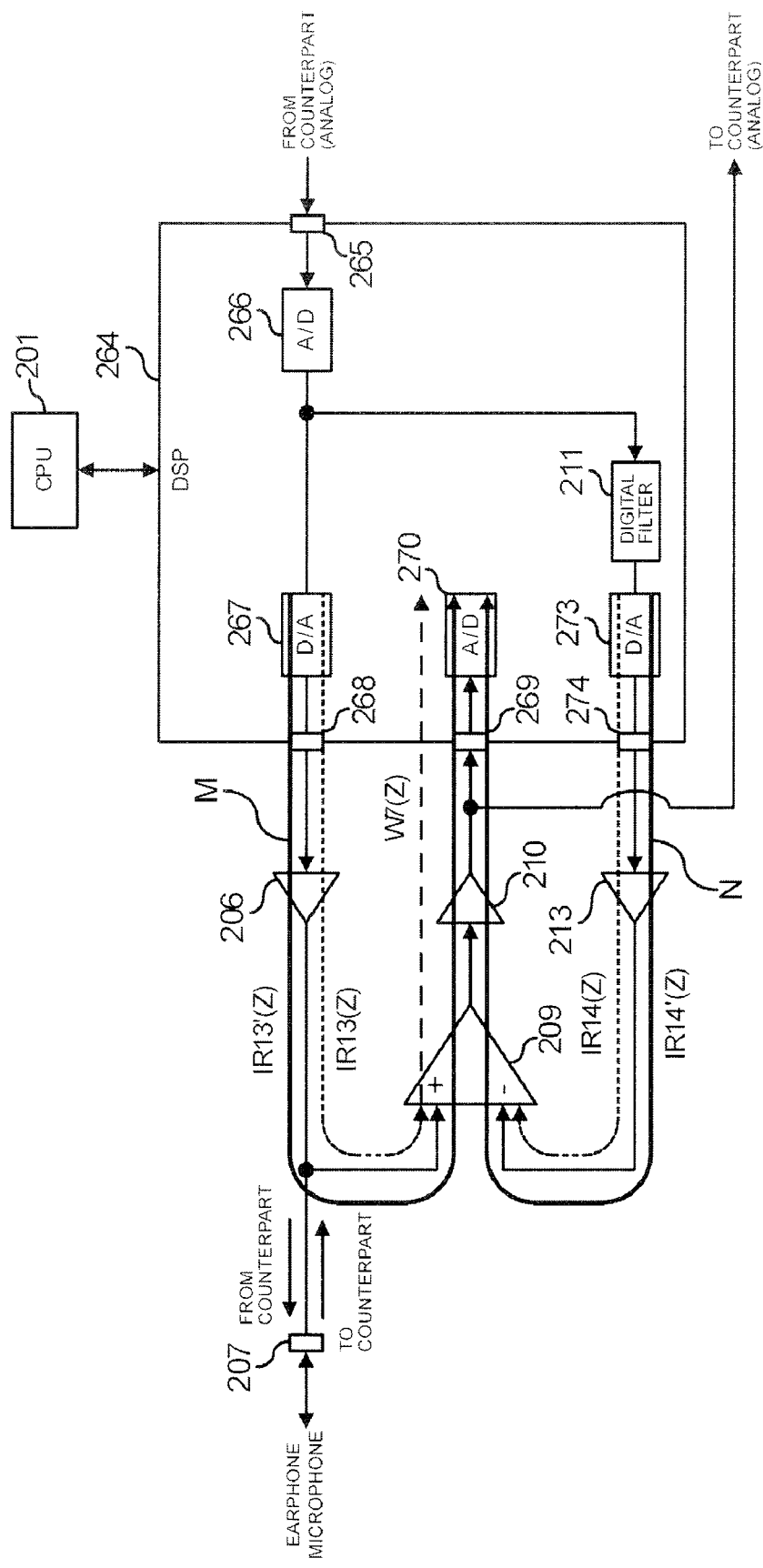
FIG. 36 depicts paths M and N of the echo preventing circuit shown in FIG. 35.

Description will be given in detail for the filter coefficients of the digital filter 211 referring to FIG. 36. FIG. 36 depicts paths M and N of the echo preventing circuit shown in FIG. 36. The path M may be a path that includes the earphone microphone 18 as in the first embodiment.

As above, the analog signal from the amplifying circuit 206 may be inputted into not only the output from the input/output terminal 207 but also the positive input terminal of the differential amplifying circuit 209. In this case, echoes due to the analog signal generate. Otherwise, echoes generate due to the sound signal inputted from the input/output terminal 207 and the analog signal from the amplifying circuit 206 being superposed on each other and inputted into the positive input terminal of the differential amplifying circuit 209. The filter coefficients of the digital filter 211 are set such that the echoes are prevented.

The impulse response (the transfer function) of a section from the input of the DA converter 267 to the positive input terminal of the differential amplifying circuit 209 indicated by a dotted line of FIG. 36 is set as IR13(Z). The impulse response (the transfer function) of a section from the input of the DA converter to the negative input terminal of the differential amplifying circuit 209 indicated by a dotted line of FIG. 36 is set as IR14(Z). The impulse response (a transfer function) of a section from the latter stage of the positive/negative input terminal of the differential amplifying circuit 209 to the output of the AD converter 270 indicated by a dotted line of FIG. 36 is set as W7(Z).

Assuming that the filter coefficients of the digital filter 211 are Q(Z), Q(Z) must be provided such that the following equation holds to cancel the signal from the amplifying circuit 206 using the signal from the amplifying circuit 213 by the differential amplifying circuit 209.

$$IR13(Z)=IR14(Z) \cdot Q(Z)$$

That is, Q(Z) may be provided such that the following equation holds.

$$Q(Z)=IR13(Z)/IR14(Z)$$

However, the impulse responses that the DSP 264 can acquire are an impulse response (a transfer function) $IR13'(Z)(=IR13(Z) \cdot W7(Z))$ of the path M indicated by a solid line of FIG. 36 and an impulse response (a transfer function) $IR14'(Z) (=-IR14(Z) \cdot W7(Z))$ of the path N. Why the phase of IR14(Z) is inversed is because the signal is inputted into the negative input terminal of the differential amplifying circuit 209.

In this case, the following equation shows the condition that enables the signal traveling on the path M and the signal traveling on the path N to cancel each other.

$$-IR13'(Z)=IR14'(Z) \cdot Q(Z)$$

That is, it can be seen that Q(Z) may be provided such that the following equation holds.

$$Q(Z)=-IR13'(Z)/IR14'(Z)$$

That is, the characteristic of the digital filter 211 can be realized by forming the characteristic thereof by adding a phase-converted transfer characteristic IR13'(Z) and the characteristic of an inverted filter of IR14'(Z). By setting the filter coefficients of the digital filter 211 as above, the differential amplifying circuit 209 can cancel the signal traveling on the path M using the signal traveling on the path N. As a result, the above echoes generated when the sound signal is inputted into the input terminal 265 can be prevented.

In the echo preventing circuit shown in the embodiment, the analog signal outputted from the amplifying circuit 210 is outputted as the analog output signal corresponding to the sound signal from the input/output terminal 207. Therefore, no DA converter is necessary to convert again the digital signal outputted from the AD converter 270 into an analog signal and, therefore, the cost and the power consumption can be reduced.

The process to form the characteristic of the digital filter 211 by adding the phase-inverted IR13'(Z) and the characteristic of the inverted filter of IR14'(Z) is enabled by executing the process same as that of the thirteenth embodiment.

Twentieth Embodiment

Figure 37:
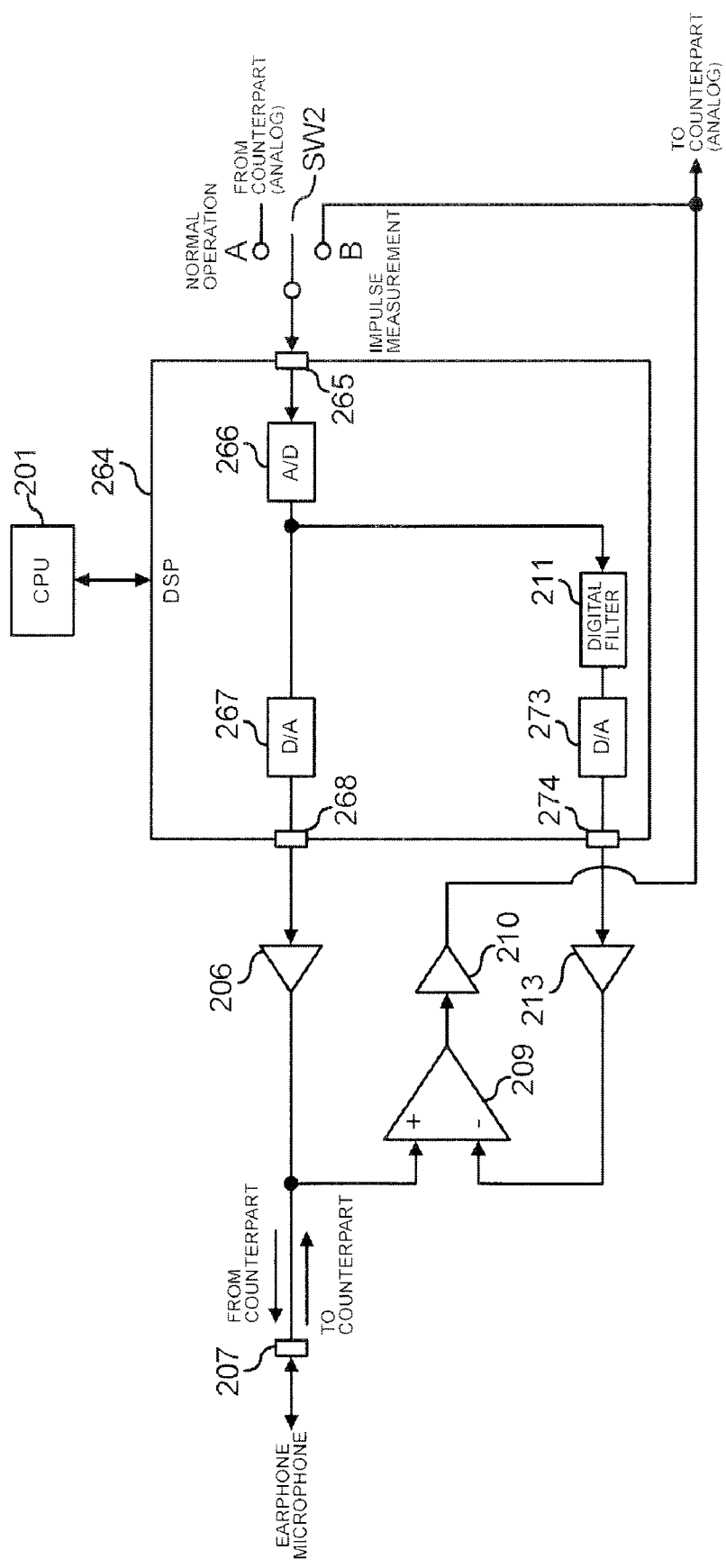
FIG. 37 depicts a block diagram of a twentieth embodiment of the echo preventing circuit and the digital signal processing circuit included in the echo preventing circuit, according to the present invention.

Exemplary Configurations of Echo Preventing Circuit and Digital Signal Processing Circuit FIG. 37 depicts a twentieth embodiment. FIG. 37 depicts a block diagram of an example of the echo preventing circuit and the digital signal processing circuit included in the echo preventing circuit, according to the present invention. In the echo preventing circuit shown in FIG. 37, the structural requirements same as those of the above nineteenth embodiment are given the same reference numerals and the description therefor is omitted. The echo preventing circuit does not include the AD converter 270 in the configuration of the nineteenth embodiment and, instead, includes a switching circuit SW2.

The switching circuit SW2 is inputted with an analog signal indicating the sound transmitted from a counterpart (a fifth analog signal) and an analog signal outputted from the amplifying circuit 210 (a fourth analog signal). The switching circuit SW2 selects either one of these input signals and outputs the selected signal to the AD converter 266 through the input terminal 265 according to the control of the CPU 201, etc.

That is, in the embodiment, an impulse response can be acquired by switching the switching circuit SW2 to the side of "B". At this time, the AD converter 266 substitutes for the AD converter 270 in the nineteenth embodiment. When a process is executed to the sound transmitted from the counterpart, the switching circuit SW2 is switched to the side of "A".

By configuring as above, the AD converter 270 used in the nineteenth embodiment is not necessary and the cost and the power consumption can be reduced more.

Twenty-First Embodiments

Figure 38:
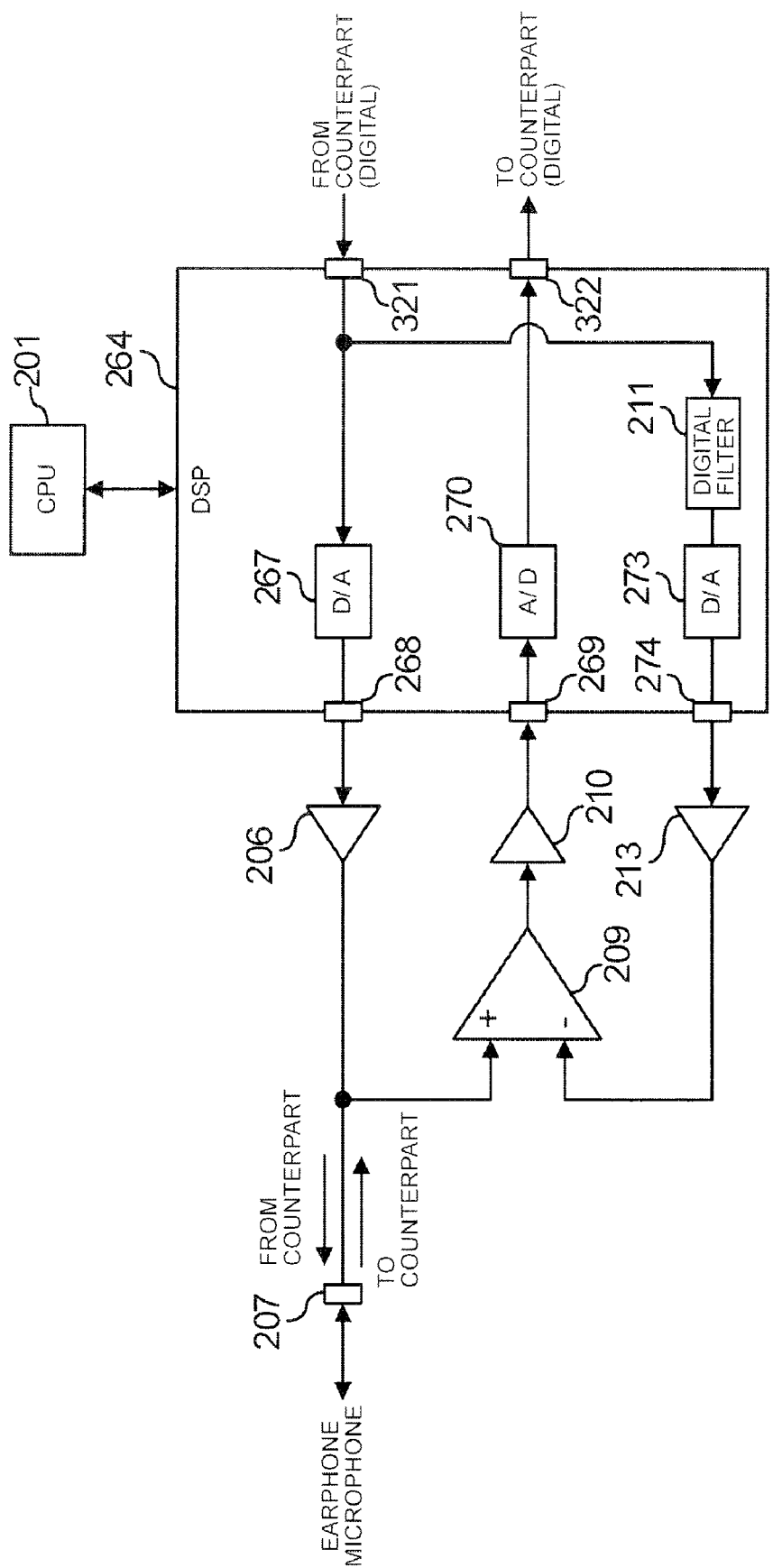
FIG. 38 depicts a block diagram of a twenty-first embodiment of the echo preventing circuit and the digital signal processing circuit included in the echo preventing circuit, according to the present invention.

Exemplary Configurations of Echo Preventing Circuit and Digital Signal Processing Circuit FIG. 38 depicts a twenty-first embodiment. FIG. 38 depicts a block diagram of an example of the echo preventing circuit and the digital signal processing circuit included in the echo preventing circuit, according to the present invention. In the echo preventing circuit shown in FIG. 38, the structural requirements same as those of the above nineteenth embodiment are given the same reference numerals and the description therefor is omitted. The echo preventing circuit does not include the AD converter 266 in the configuration of the nineteenth embodiment.

In the embodiment, a signal indicating the sound transmitted from the counterpart is inputted into the input terminal 321 as a digital signal. The embodiment is configured to output through the output terminal 322 the digital signal outputted from the AD converter 270. The digital signal outputted from the output terminal 322 is outputted as a digital output signal corresponding to the sound signal from the input/output terminal 207. By configuring the echo preventing circuit as above, the interfacing signal between the echo preventing circuit and apparatuses, etc., applied with the circuit may be a digital signal. That is, when the echo preventing circuit is applied to an apparatus that can output a digital signal, the outputted digital signal does not need to be converted into an analog signal by any DA converter to interface with the echo preventing circuit and no output signal from the echo preventing circuit needs to be converted into a digital signal by any AD converter. Therefore, the AD converter and the DA converter can be excluded and, therefore, cost reduction and power consumption reduction can be realized.

Twenty-Second Embodiments

Figure 39:
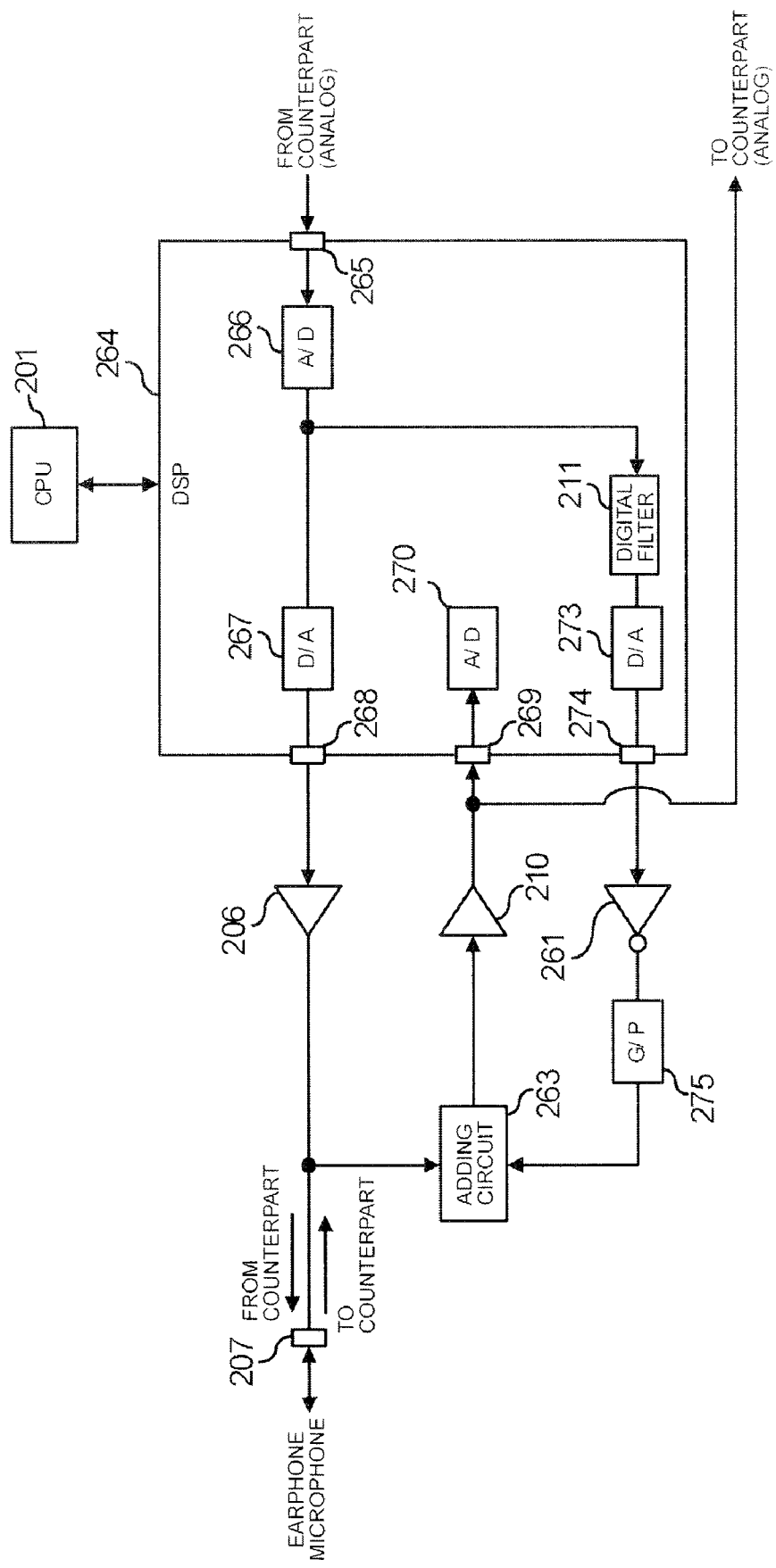
FIG. 39 depicts a block diagram of a twenty-second embodiment of the echo preventing circuit and the digital signal processing circuit included in the echo preventing circuit, according to the present invention.

Exemplary Configurations of Echo Preventing Circuit and Digital Signal Processing Circuit FIG. 39 depicts a twenty-second embodiment. FIG. 39 depicts a block diagram of an example of the echo preventing circuit and the digital signal processing circuit (the DSP 264) included in the echo preventing circuit.

As shown in FIG. 39, the echo preventing circuit in the twenty-second embodiment is configured by combining the sixteenth embodiment (FIG. 31) and the nineteenth embodiment (FIG. 35) and the structural requirements same between the two embodiments are given the same reference numerals and the description therefor is omitted.

Filter Coefficients of Digital Filter 211

Figure 40:
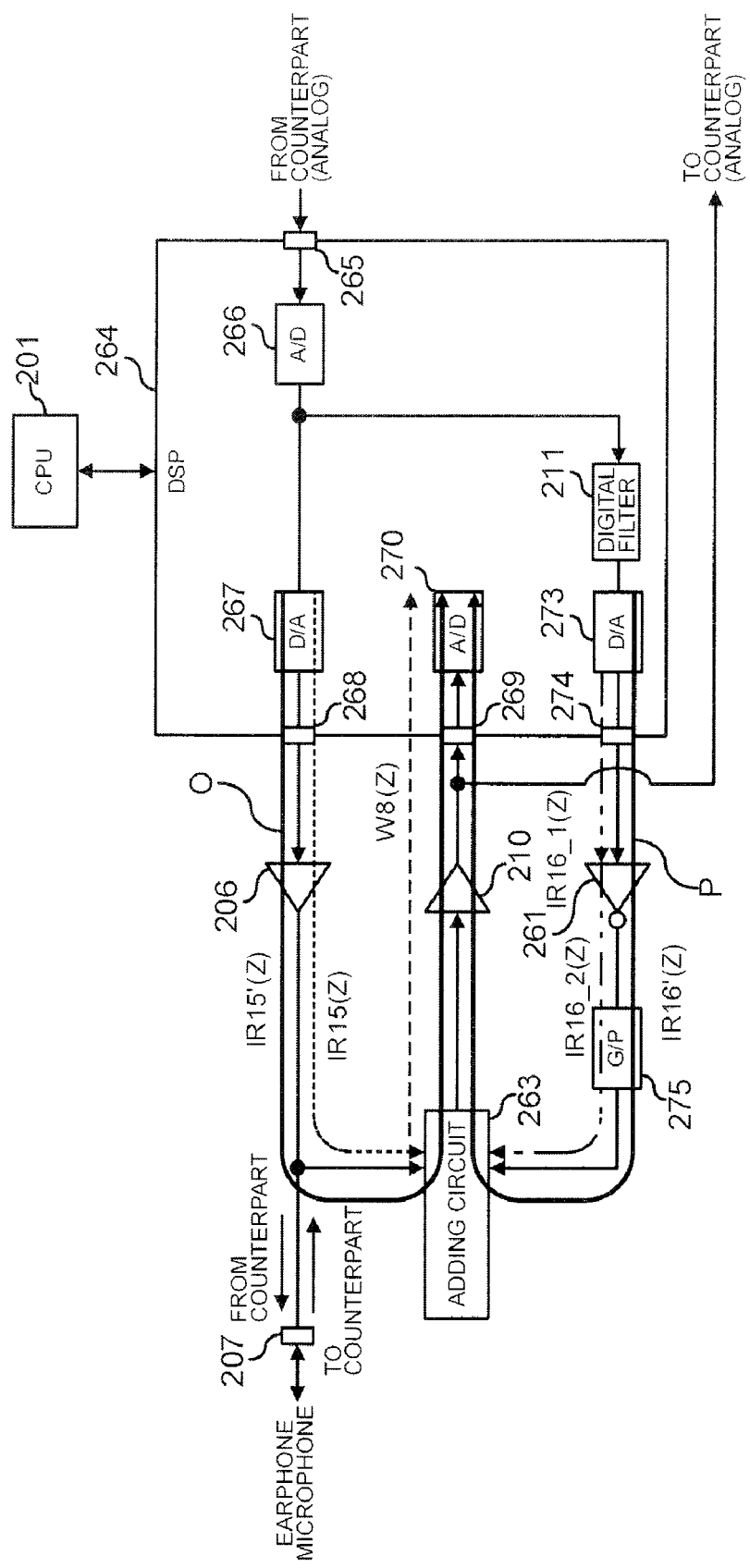
FIG. 40 depicts paths O and P of the echo preventing circuit shown in FIG. 39.

Description will be given in detail for the filter coefficients of the digital filter 211 referring to FIG. 40. FIG. 40 depicts paths O and P of the echo preventing circuit shown in FIG. 39. The path O may be a path that includes the earphone microphone 18 as in the first embodiment.

As above, the analog signal from the amplifying circuit 206 may be inputted into not only the output from the input/output terminal 207 but also the adding circuit 263. In this case, echoes due to the analog signal generate. Otherwise, echoes generate due to the sound signal inputted from the input/output terminal 207 and the analog signal from the amplifying circuit 206 being superposed on each other and inputted into the adding circuit 263. The filter coefficients of the digital filter 211 are set such that the echoes are prevented.

The impulse response (the transfer function) of a section from the input of the DA converter 267 to the input terminal of the adding circuit 263 indicated by a dotted line of FIG. 40 is set as $IR15(Z)$. The impulse response (the transfer function) of a section from the input of the DA converter 273 to the input of the inverting amplifying circuit 261 indicated by a dot and dash line of FIG. 40 is set as $IR16\_1(Z)$. The impulse response (the transfer function) of a section from the input of the inverting amplifying circuit 261 to the input terminal of the adding circuit 263 indicated by a two-dot and dash line of FIG. 40 is set as $IR16\_2(Z)$. $IR16(Z)=-IR16\_1(Z)\cdot IR16\_2(Z)$. The impulse response (a transfer function) of a section from the latter stage of each of the input terminals of the adding circuit 263 to the output of the AD converter 270 indicated by a dotted line of FIG. 40 is set as $W8(Z)$.

Assuming that the filter coefficients of the digital filter 211 are $Q(Z)$, $Q(Z)$ must be provided such that the following equation holds to cancel the signal from the amplifying circuit 206 using the signal from the gain phase adjusting circuit 275 by the adding circuit 253.

$$IR15(Z)=IR16(Z)\cdot Q(Z)$$

That is, $Q(Z)$ may be provided such that the following equation holds.

$$Q(Z)=IR15(Z)/IR16(Z)$$

However, the impulse responses that the DSP 264 can acquire are an impulse response (a transfer function) $IR15'(Z)(=IR15(Z)\cdot W8(Z))$ of the path O indicated by a solid line of FIG. 40 and an impulse response (a transfer function) $IR16'(Z)$ $(=-IR16\_1(Z)\cdot IR16\_2(Z)\cdot W8(Z))$ of the path P.

Why the phase of IR16_1(Z) is inversed is because the phase is inverted by the inverting amplifying circuit 261.

In this case, the following equation shows the condition that enables the signal traveling on the path O and the signal traveling on the path P to cancel each other.

$$-IR15'(Z)=IR16'(Z)\cdot Q(Z)$$

That is, it can be seen that Q(Z) may be provided such that the following equation holds.

$$Q(Z)=-IR16'(Z)/IR16'(Z)$$

That is, the characteristic of the digital filter 211 can be realized by forming the characteristic thereof by adding a phase-converted transfer characteristic IR15'(Z) and the characteristic of an inverted filter of IR16'(Z). By setting the filter coefficients of the digital filter 211 as above, the adding circuit 263 can cancel the signal traveling on the path O using the signal traveling on the path P. As a result, the above echoes generated when the sound signal is inputted into the input terminal 265 can be prevented.

In the echo preventing circuit shown in the embodiment, the analog signal outputted from the amplifying circuit 210 is outputted as an analog output signal corresponding to the sound signal from the input/output terminal 207. Therefore, no DA converter is necessary to convert again the digital signal outputted from the AD converter 270 into an analog signal and, therefore, the cost and the power consumption can be reduced.

The process to form the characteristic of the digital filter 211 by adding the phase-inverted IR15'(Z) and the characteristic of the inverted filter of IR16'(Z) is enabled by executing the process same as that of the thirteenth embodiment.

Twenty-Third Embodiments

Figure 41:
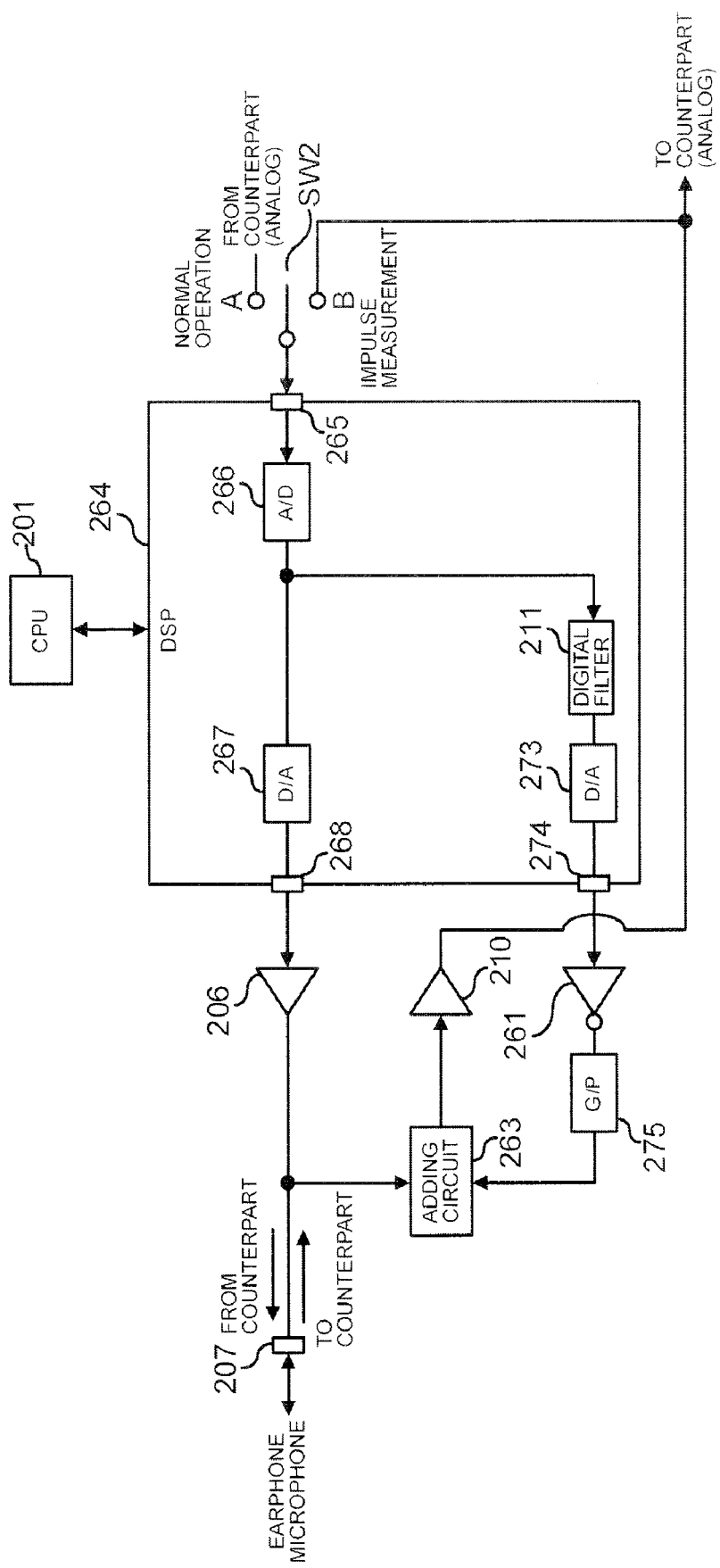
FIG. 41 depicts a block diagram of a twenty-third embodiment of the echo preventing circuit and the digital signal processing circuit included in the echo preventing circuit, according to the present invention.

Exemplary Configurations of Echo Preventing Circuit and Digital Signal Processing Circuit FIG. 41 depicts a twenty-third embodiment. FIG. 41 depicts a block diagram of an example of the echo preventing circuit and the digital signal processing circuit included in the echo preventing circuit, according to the present invention. In the echo preventing circuit shown in FIG. 41, the structural requirements same as those of the above twenty-second embodiment are given the same reference numerals and the description therefor is omitted. The echo preventing circuit does not include the AD converter 270 in the configuration of the twenty-second embodiment and, instead, includes a switching circuit SW2.

The switching circuit SW2 is inputted with an analog signal indicating the sound transmitted from a counterpart (a fifth analog signal) and an analog signal outputted from the amplifying circuit 210 (a fourth analog signal). The switching circuit SW2 selects either one of these input signals and outputs the selected signal to the AD converter 266 through the input terminal 265 according to the control of the CPU 201, etc.

That is, in the embodiment, an impulse response can be acquired by switching the switching circuit SW2 to the side of "B". At this time, the AD converter 266 substitutes for the AD converter 270 in the twenty-second embodiment. When a process is executed to the sound transmitted from the counterpart, the switching circuit SW2 is switched to the side of "A".

By configuring as above, the AD converter 270 used in the twenty-second embodiment is not necessary and the cost and the power consumption can be reduced more.

Twenty-Fourth Embodiments

Figure 42:
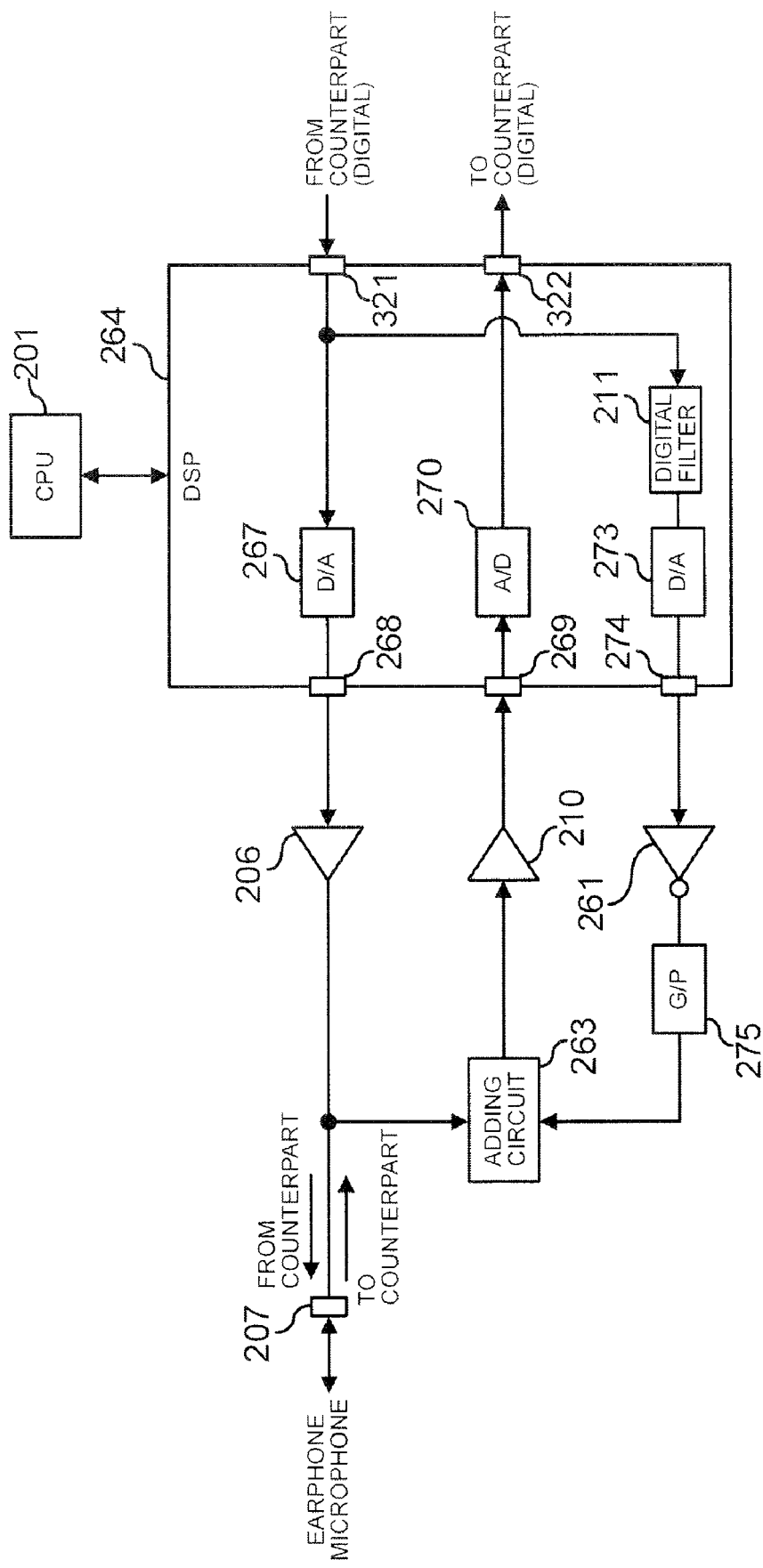
FIG. 42 depicts a block diagram of a twenty-fourth embodiment of the echo preventing circuit and the digital signal processing circuit included in the echo preventing circuit, according to the present invention.

Exemplary Configurations of Echo Preventing Circuit and Digital Signal Processing Circuit FIG. 42 depicts a twenty-fourth embodiment. FIG. 42 depicts a block diagram of an example of the echo preventing circuit and the digital signal processing circuit included in the echo preventing circuit, according to the present invention. In the echo preventing circuit shown in FIG. 42, the structural requirements same as those of the above twenty-second embodiment are given the same reference numerals and the description therefor is omitted. The echo preventing circuit does not include the AD converter 266 in the configuration of the twenty-second embodiment.

In the embodiment, a signal indicating the sound transmitted from the counterpart is inputted into the input terminal 321 as a digital signal. The circuit is configured to output through the output terminal 322 a digital signal outputted from the AD converter 270. The digital signal outputted from the output terminal 322 is outputted as a digital signal corresponding to the sound signal from the input/output terminal 207. By configuring the echo preventing circuit as above, the interfacing signal between the echo preventing circuit and apparatuses, etc., applied with the circuit may be a digital signal. That is, when the echo preventing circuit is applied to an apparatus that can output a digital signal, the outputted digital signal does not need to be converted into an analog signal by any DA converter to interface with the echo preventing circuit and no output signal from the echo preventing circuit needs to be converted into a digital signal by any AD converter. Therefore, the AD converter and the DA converter can be excluded and, therefore, cost reduction and power consumption reduction can be realized.

First Application

Figure 43:
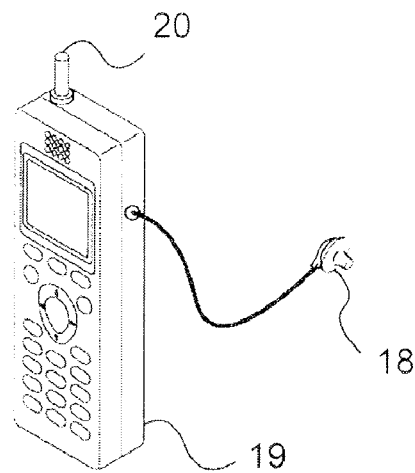
FIG. 43 schematically depicts a mobile phone 19 applied with the echo preventing circuit and the digital signal processing circuit included in the echo preventing circuit, according to the present invention.
Figure 44:
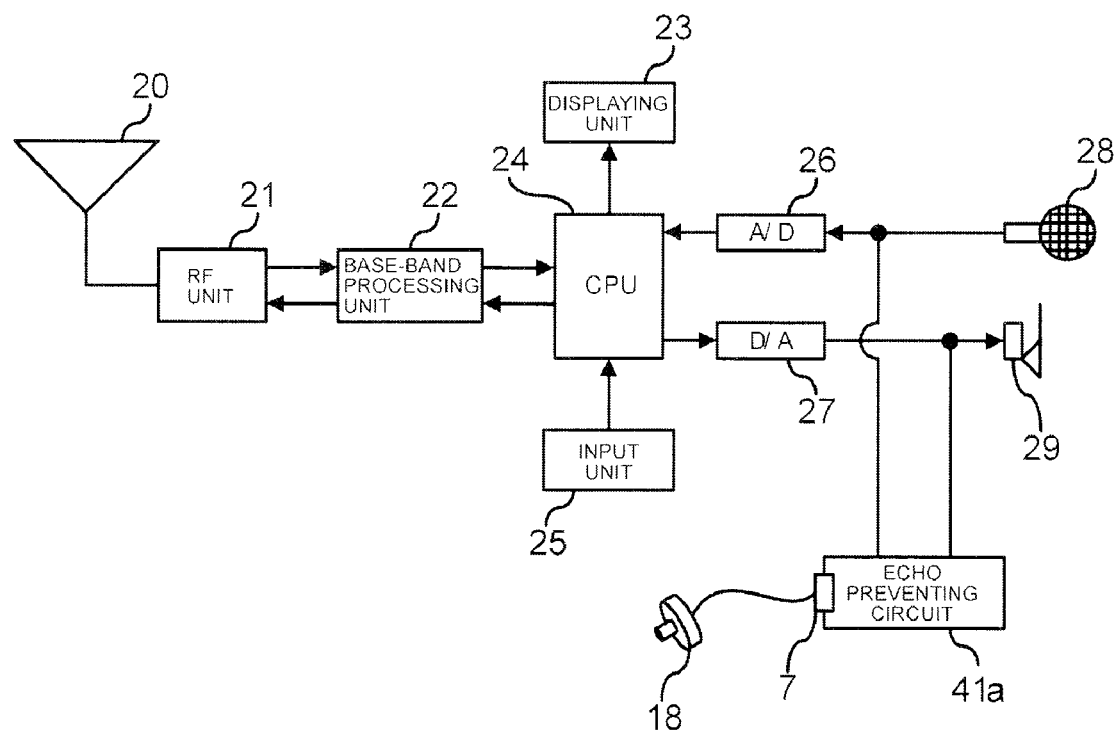
FIG. 44 depicts a block diagram of a first application of the echo preventing circuit according to the present invention.

Description will be given for a first application of the echo preventing circuit according to the present invention. In the application, the configuration and operations will be described for the case where, for example, an echo preventing circuit 41a for which the interface thereof with a counterpart is an analog signal such as the one in the first embodiment or the second embodiment is applied to a mobile phone 19 shown in FIG. 43. FIG. 43 schematically depicts the mobile phone 19 to which the echo preventing circuit 41a is applied. FIG. 44 depicts a block diagram of an example of the configuration of the mobile phone 19 shown in FIG. 43. The mobile phone 19 is connected to the earphone microphone 18 as shown in FIG. 44. The earphone microphone 18 has a speaker function of generating sound by vibrating a diaphragm not shown based on a sound signal the mobile phone 19 receives. The earphone microphone 18 also has a microphone function of generating and outputting a sound signal by converting into vibration of the diaphragm the vibration of the eardrum caused when a person wearing the earphone microphone 18 in his/her ear emanates sound. The earphone microphone 18 is a known technology and is described in Japanese Patent Application Laid-Open Publication No. 2003-9272, etc. Though the earphone microphone 18 and the mobile phone 19 are provided to be connected to and wired-communicate with each other, the earphone 18 and the telephone 19 may be provided to wireless-communicate (HomeRF (Radio Frequency), etc.).

The mobile phone 19 includes an antenna 20, an RF (Radio Frequency) unit 21, a base-band processing unit 22, a CPU 24, a displaying unit 23, an input unit 25, an AD converter 26, a DA converter 27, a microphone 28, a speaker 29, and the echo preventing circuit 41a. The configuration of the mobile phone 19 shown in FIG. 44 is an example and a mobile phone to which the echo preventing circuit 41*a* is applied is not limited to the mobile phone having this configuration.

The antenna 20 receives a sound signal transmitted to the mobile phone 19. The antenna 20 transmits the sound signal from the RF unit 21.

The Rf unit 21 executes a decoding process such as a demodulating process to the sound signal at a predetermined frequency band of the sound signal that the antenna 20 receives. The RF unit 21 executes a modulating process to the sound signal from the base-band processing unit 22, for example, an encoding process under TDMA (Time Division Multiplex Access) scheme.

The base-band processing unit 22 applies predetermined signal processing to the sound signal demodulated to a base-band signal by the RF unit 21 and outputs the processed signal to the CPU 24. The base-band processing unit 22 applies predetermined signal processing to a sound signal from the CPU 24 and outputs the processed signal to the RF unit 21.

The CPU 24 controls the entire mobile phone 19. To reproduce the sound corresponding to the sound signal from the base-band processing unit 22 using the speaker 29 or the earphone microphone 18, the CPU 24 outputs the sound signal to the DA converter 27. The CPU 24 outputs to the base-band processing unit 22 the sound signal from the microphone 28 or the earphone microphone 18 that is from the AD converter 26. When, for example, the mobile phone 19 is executing packet communication, the CPU 24 outputs a signal to the displaying unit 23 to display an image based on the received packet data. The CPU 24 applies a predetermined process to cause the displaying unit 23 to display the inputted data inputted into the input unit 25 or to transmit the inputted data by the packet communication and outputs the data to the base-band processing unit 22.

The AD converter 26 applies an analog/digital converting process to the sound signal from the microphone 28 or the earphone microphone 18 and outputs the converted digital signal to the CPU 24. The DA converter 27 applies a digital/analog converting process to the sound signal from the CPU 24 and outputs the converted analog signal to the speaker 29 or the echo preventing circuit 41. In the application, when the earphone microphone 18 is connected to the mobile phone 19, the analog signal from the DA converter 27 is inputted into the echo preventing circuit 41*a*.

Description will be given for the operations of the echo preventing circuit 41*a*. In the application, the setting of the filter coefficients of the FIR filters 4 and 11 as described in the first embodiment has been executed.

The sound signal that the antenna 20 receives is applied with the above processes by the components of the mobile phone 19 and is outputted from the DA converter 27 to the AD converter 3 of the echo preventing circuit 41*a*.

The sound signal inputted into the AD converter 3 is applied with analog/digital signal processing by the AD converter 3, is converted into a digital signal, and is inputted into the FIR filters 4 and 11 through the input terminal 30. As a result, the digital signal from the AD converter 3 is inputted into the digital signal memories 42 and 54 constituting the FIR filters 4 and 11.

Description will be first given for the digital signal inputted into the FIR filter 4. The digital signal (denoted by "Xn") inputted into the digital signal memory 54 is sequentially inputted into the registers 0 to N−1 and, thereby, is delayed by one sampling cycle each. The DSP 2 switches the switching circuit 60O sequentially from the register 0 and, thereby, the digital signals Xn to Xn−(N−1) from the digital signal memory 54 are sequentially inputted into the multiplying circuit 51. The DSP 2 sequentially switches the switching circuit 60P from the address 0 and, thereby, the phase-inverted impulse responses imp(0) to imp(N−1) (=−IR2'(Z)) stored in the filter coefficient storing memory 56 are sequentially inputted into the multiplying circuit 51. The multiplying circuit 51 sequentially multiplies the digital signals Xn to Xn−(N−1) and the phase-inverted impulse responses imp(0) to imp(N−1) that are inputted sequentially thereto and outputs the multiplication result to the ADD 52.

The multiplication result of the multiplying circuit 51 inputted into the ADD 52 is added with the previous addition result of the ACC 53 and is outputted to the ACC 53. As a result, convolution calculation has been applied by the FIR filter 4 to the phase-inverted impulse responses imp(0) to imp(N−1) and the digital signals Xn to Xn−(N−1) stored in the filter coefficient storing memory 55. That is, an output signal from the FIR filter 11 described below and a signal that cancels the output signal in the differential amplifying circuit 9 are outputted from the FIR filter 4.

The output signal outputted from the FIR filter 4 is inputted into the DA converter 5 through the output terminal 31. The output signal is applied with a digital/analog converting process by the DA converter 5, is converted into an analog signal, and is inputted into the amplifying circuit 6. The analog signal inputted into the amplifying circuit 6 is amplified by a predetermined amplification factor and is outputted. The analog signal from the amplifying circuit 6 is outputted to the earphone microphone 18 through the input/output terminal 7. As a result, the diaphragm is vibrated and sound is generated by the speaker function of the earphone microphone 18. However, the case is present where the analog signal from the amplifying circuit 6 is inputted into the positive input terminal of the differential amplifying circuit 9. The following process is executed to cancel the analog signal inputted into the positive terminal of the differential amplifying circuit 9.

The digital signal inputted into the digital signal memory 42 of the FIR filter 11, similarly to the FIR filter 4 as above, is inputted into the registers 0 to N−1 and, thereby, is delayed by one sampling cycle. Due to switching by the DSP 2 of the switching circuit 60M sequentially from the register 0, the digital signals Xn to Xn−(N−1) from the digital signal memory 42 are sequentially inputted into the multiplying circuit 51. Due to switching by the DSP 2 of the switching circuit 60N sequentially from the address 0, the impulse responses imp(0) to imp(N−1) (=IR1'(Z)) stored in the filter coefficient storing memory 47 are sequentially inputted into the multiplying circuit 51. The multiplying circuit 51 multiplies the digital signals Xn to Xn−(N−1) and the impulse responses imp(0) to imp(N−1) inputted sequentially thereinto and outputs the multiplication result to the ADD 52.

The multiplication result of the multiplying circuit 51 inputted into the ADD 52 is added with the previous addition result of the ADD 52 stored in the ACC 53 and is outputted to the ACC 53. As a result, convolution calculation has been applied by the FIR filter 11 to the impulse responses imp(0) to imp(N−1) and the digital signals Xn to Xn−(N−1) stored in the filter coefficient storing memory 47. That is, an output signal from the FIR filter 4 described above and a signal that cancels the output signal in the differential amplifying circuit 9 are outputted from the FIR filter 11.

The output signal outputted from the FIR filter 11 is inputted into the DA converter 12 through the output terminal 32. The output signal is applied with a digital/analog converting process by the DA converter 12, is converted into an analog signal, and is inputted into the amplifying circuit 13. The analog signal inputted into the amplifying circuit 13 is amplified by a predetermined amplification factor and is inputted into the negative terminal of the differential amplifying circuit 9.

Therefore, the differential amplifying circuit 9 can cancel the analog signal from the amplifying circuit 6 inputted into the positive input terminal thereof using the analog signal from the amplifying circuit 13 for which the phase thereof is inverted by being inputted into the negative input terminal thereof. As a result, echoes generated when the digital signal is inputted into the input terminal 30 can be prevented. Even when the sound signal by the microphone function of the earphone microphone 18 and the analog signal from the amplifying circuit 6 are superposed on each other and are inputted into the positive input terminal of the differential amplifying circuit 9, the signal component that causes echoes (that is, the analog signal from the amplifying circuit 6) can be subtracted from the superposed signal due to the signal from the FIR filter 11 being inputted into the negative input terminal.

By configuring the mobile phone 19 using the echo preventing circuit 41a from which the DA converter has been excluded, the cost and the power consumption of the mobile phone can be reduced.

Though the description has been given for the case to which the echo preventing circuit in the first embodiment is applied in the application, the echo preventing circuit that uses an analog signal as the interface thereof such as the second embodiment can be similarly applied with.

Second Application

Figure 45:
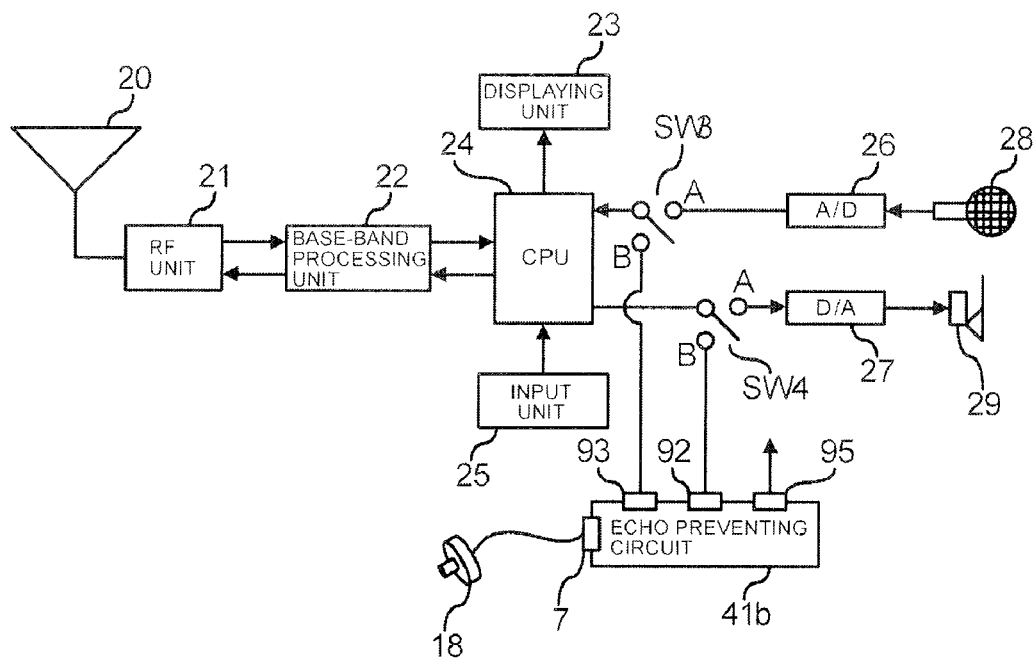
FIG. 45 depicts a block diagram of a second application of the echo preventing circuit according to the present invention.

Description will be given for a second application of the echo preventing circuit according to the present invention. In the application, the configuration and operations will be described for the case where, for example, an echo preventing circuit 41b for which the interface thereof with a counterpart is an digital signal such as the one in the ninth embodiment is applied to the mobile phone 19 shown in FIG. 43. FIG. 45 depicts a block diagram of an example of the configuration of the mobile phone 19 shown in FIG. 43.

Figure 46:
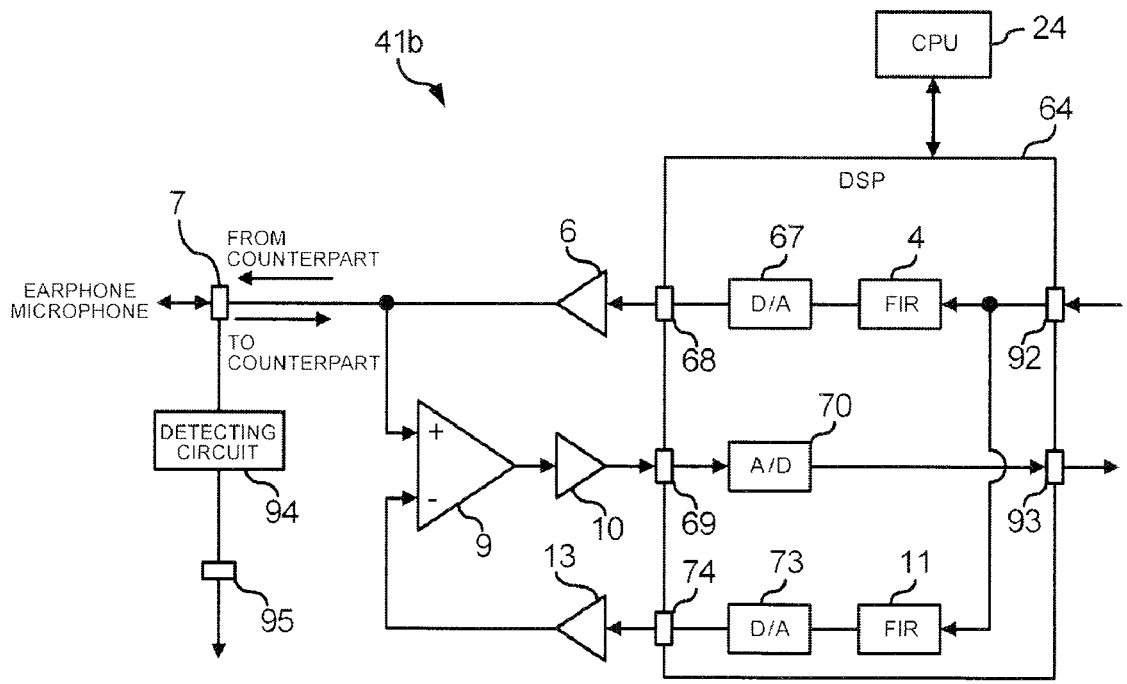
FIG. 46 depicts a block diagram of an exemplary configuration of an echo preventing circuit 41*b* in the second application.

FIG. 46 depicts a block diagram of an example of the configuration of the echo preventing circuit 41b. As shown in FIG. 46, the echo preventing circuit 41b includes a detecting circuit 94 in addition to the configuration shown in FIG. 9. The detecting circuit 94 detects the connection state of the earphone microphone 18 to the input/output terminal 7. The detection result by the detecting circuit 94 is outputted through the output terminal 95 as a detection signal.

The mobile phone 19 includes switching circuits SW3 and SW4 in addition to the configuration shown in FIG. 44. The switching circuit SW3 is inputted with the digital signal outputted from the AD converter 26 and the digital signal outputted from the output terminal 93 of the echo preventing circuit 41b. Based on the detection signal from the output terminal 95, the switching circuit SW3 is switched to the side of "A" and outputs the digital signal outputted from the AD converter 26 to the CPU 24 when the earphone microphone 18 is not connected to the input/output terminal 7, and is switched to the side of "B" and outputs the digital signal outputted from the echo preventing circuit 41b to the CPU 24 when the earphone microphone 18 is connected to the input/output terminal 7. The switching circuit SW4 can output the digital signal outputted from the CPU 24 to the AD converter 27 or the input terminal 92 of the echo preventing circuit 41b. Based on the detection signal from the output terminal 95, the switching circuit SW4 is switched to the side of "A" and outputs the digital signal outputted from the CPU 24 to the DA converter 27 when the earphone microphone 18 is not connected to the input/output terminal 7, and is switched to the side of "B" and outputs the digital signal outputted from the CPU 24 to the echo preventing circuit 41b when the earphone microphone 18 is connected to the input/output terminal 7.

As above, by using the echo preventing circuit 41b that uses a digital signal as the interface therefor as shown in the ninth embodiment, the AD converter 3 used in the echo preventing circuit 41b shown in FIG. 44 is not necessary and the cost and the power consumption can be reduced.

Third Application

Figure 47:
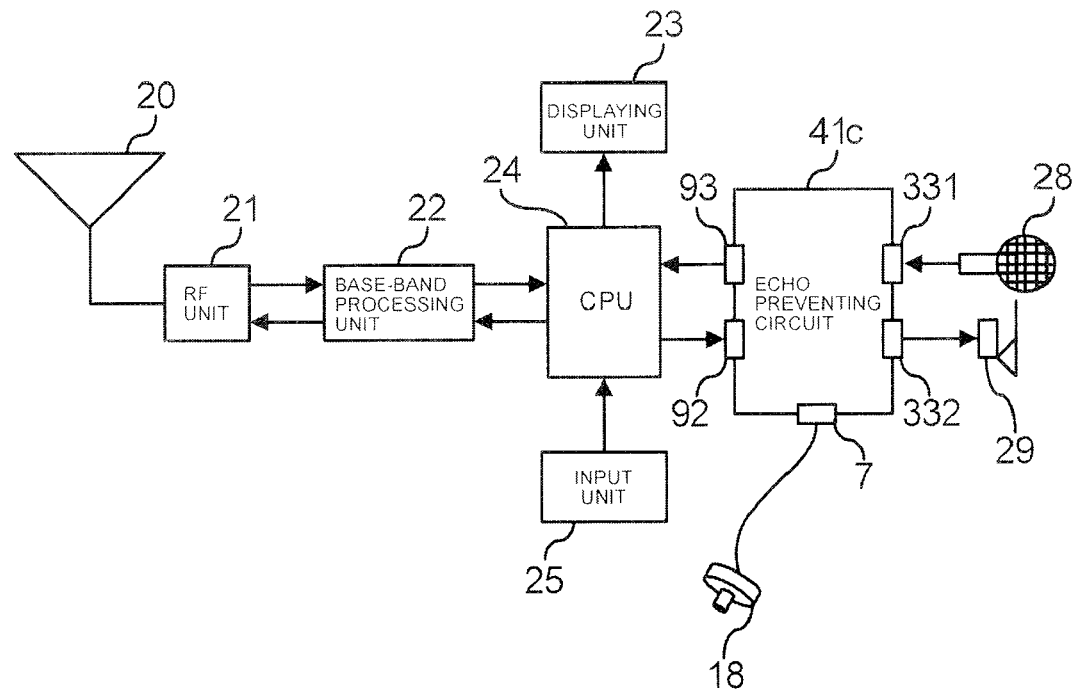
FIG. 47 depicts a block diagram of a third application of the echo preventing circuit according to the present invention.

Description will be given for a third application of the echo preventing circuit according to the present invention. FIG. 47 depicts a block diagram of an example of the configuration of the mobile phone 19 shown in the application. As shown, in the application, an echo preventing circuit 41c is used and the AD converter 26 and the DA converter 27 in the second application are excluded. The analog signal outputted from the microphone 28 is inputted into an input terminal 331 of the echo preventing circuit 41c and the analog signal outputted from the output terminal 332 of the echo preventing circuit 41c is inputted into the speaker 29. The digital signal outputted from the output terminal 93 of the echo preventing circuit 41c is inputted into the CPU 24 and the digital signal outputted from the CPU 24 is inputted into the input terminal 92 of the echo preventing circuit 41c.

Figure 48:
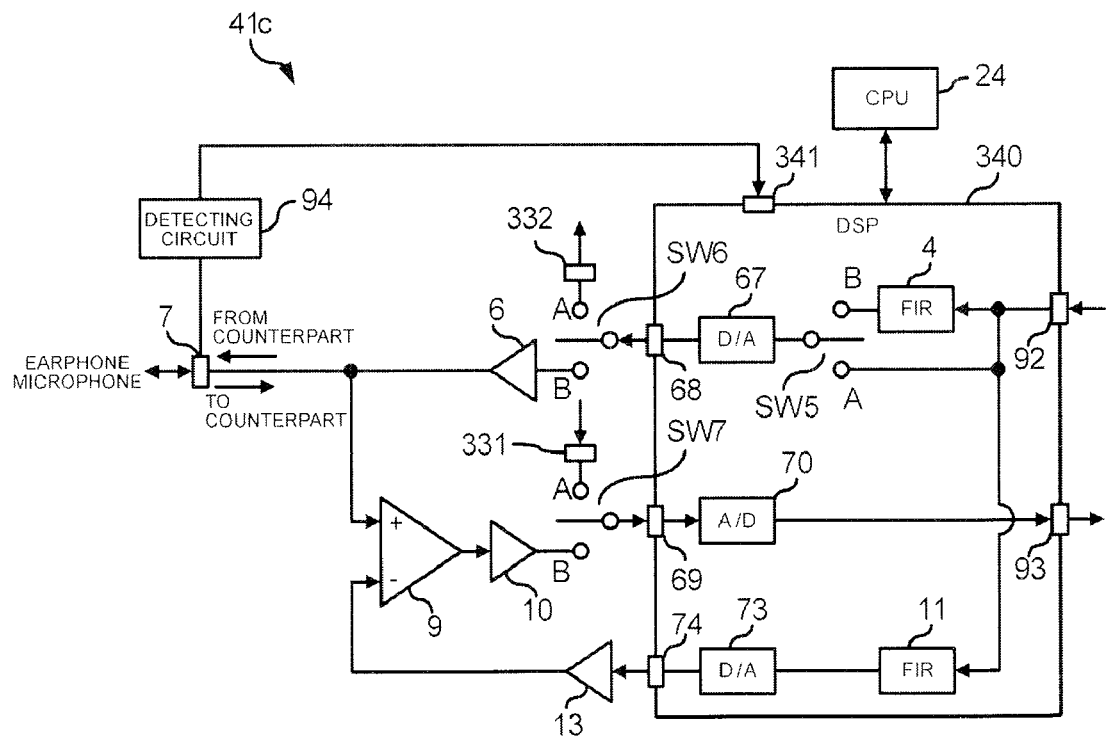
FIG. 48 depicts a block diagram of an exemplary configuration of an echo preventing circuit 4cb in the third application.

FIG. 48 depicts a block diagram of an example of the configuration of the echo preventing circuit 41c. As shown in FIG. 48, the echo preventing circuit 41c includes switching circuits SW5, SW6, and SW7 in addition to the configuration shown in FIG. 46. The switching circuit SW5 is inputted with the digital signal from the FIR filter 4 and the digital signal from the input terminal 92, and can output either one of the digital signals to the DA converter 67. The switching circuit SW6 (a first switching circuit) can output the analog signal outputted from the output terminal 68 to either one of the amplifying circuit 6 and the output terminal 332 based on the detection signal from the detecting circuit 94. The switching circuit SW7 (a second switching circuit) is inputted with the analog signal from the amplifying circuit 10 and the analog signal from the input terminal 331 (a sixth analog signal), and can input either one of these analog signals into the input terminal 69.

When the detection signal from the detecting circuit 94 indicates that the earphone microphone 18 is not connected to the input/output terminal 7, the switching circuits SW5, SW6, and SW7 are all switched to the side of A. In this case, the analog signal outputted from the microphone 28 is inputted from the input terminal 331, is converted into a digital signal by the AD converter 70, and, thereafter, is inputted into the CPU 24 through the output terminal 93. The digital signal outputted from the CPU 24 is inputted into the input terminal 92, is converted into an analog signal by the DA converter 67, and, thereafter, is inputted into the speaker 29 through the output terminals 68 and 332.

In contrast, when the detection signal from the detecting circuit 94 indicates that the earphone microphone 18 is connected to the input/output terminal 7, the switching circuits SW5, SW6, and SW7 are all switched to the side of B. In this case, the analog signal corresponding to the sound signal from the earphone microphone 18 is converted into a digital signal by the AD converter 70 and, thereafter, is inputted into the CPU 24 through the output terminal 93. The digital signal outputted from the CPU 24 is inputted into the input terminal 92 and is inputted into the amplifying circuit 6 through the FIR filter 4 and the DA converter 67.

As above, by using the echo preventing circuit 41*c*, the AD converter 26 and the DA converter 27 used in the mobile phone 19 shown in FIG. 45 are not necessary and the cost and the power consumption can be reduced. Though the signals inputted into the DA converter 67 using the switching circuit SW5 in the application, the signals may be switched by varying the filter coefficients of the FIR filter 4. That is, when the earphone microphone 18 is not connected, the filter coefficients of the FIR filter 4 may be set such that the digital signal inputted from the input terminal 92 is outputted as it is.

Other Applications

Though the description has been given for the cases where the echo preventing circuit is applied to the mobile phone 19 in the above applications, the application is not limited to this. The echo preventing circuit according to the present invention can be applied to any apparatus that may generate the above echoes, and can be applied to, for example, an IT (Information Technology) communicating apparatus (for example, a PC (Personal Computer)) and an intercommunicating apparatus (a telephone, a transceiver, an on-vehicle apparatus, etc.).

Figure 49:
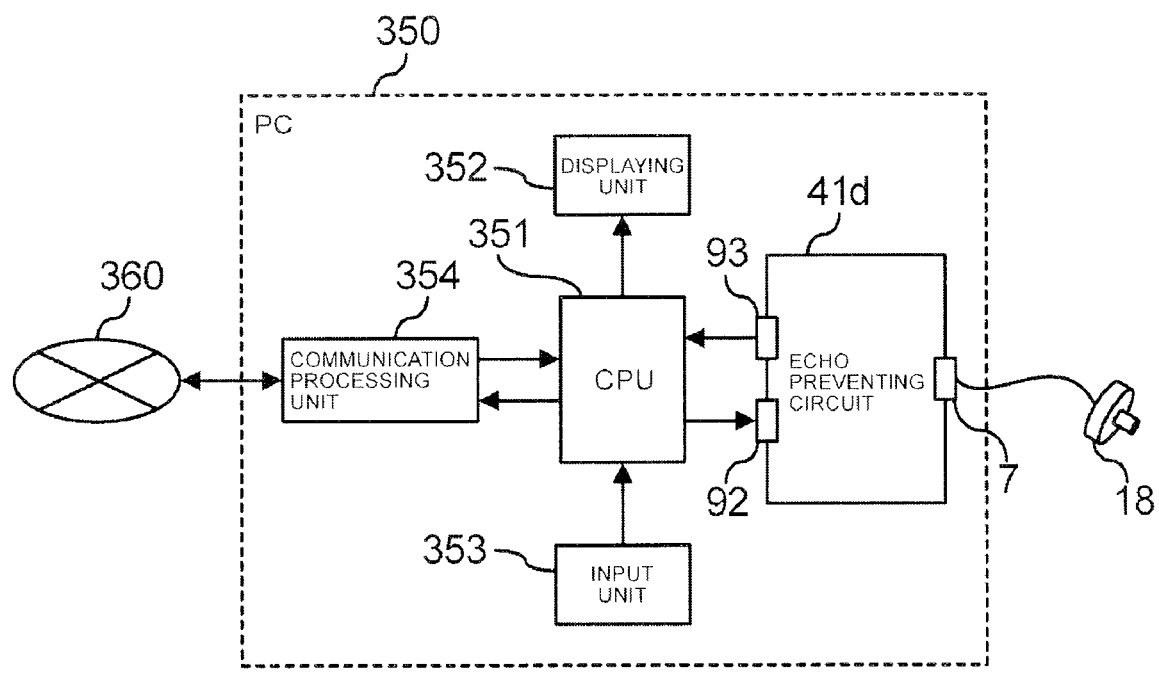
FIG. 49 depicts a block diagram of another application of the echo preventing circuit according to the present invention.

FIG. 49 depicts a block diagram of an example of the configuration of a PC 350 to which, for example, an echo preventing circuit 41*d* shown in the ninth embodiment (FIG. 18) is applied. The PC 350 is configured to include a CPU 351, a displaying unit 352, an input unit 353, a communication processing unit 354, and the echo preventing circuit 41*d*.

The CPU 351 controls the entire PC 350. To reproduce the sound corresponding to the sound signal from the communication processing unit 354 using the earphone microphone 18, the CPU 351 outputs the sound signal to the input terminal 92 of the echo preventing circuit 41*d*. The CPU 351 outputs the sound signal from the earphone microphone 18 to the communication processing unit 354. When, for example, the PC 350 is executing packet communication, the CPU 30 outputs a signal to the displaying unit 352 to display an image based on the received packet data. The CPU 351 applies a predetermined process to cause the displaying unit 352 to display the inputted data inputted into the input unit 353 or to transmit the inputted data by the packet communication and outputs the data to the communication processing unit 354.

The communication processing unit 354 outputs to the CPU 351 the signal received through a network 360 such as the Internet. The communication processing unit 354 outputs the signal from the CPU 351 to the network 360.

As above, the echo preventing circuit according to the present invention can be applied to a communication apparatus other than the mobile phone 19 and reduction of the cost and the power consumption can be realized.

The description has been given for the embodiments and the applications of the echo preventing circuit of the present invention. As above, signals respectively outputted from the amplifying circuits 10 and 210, that is, the analog signals respectively outputted from the subtracting circuits 9 and 209 are the output signals of the echo preventing circuit and, thereby, the DA converter can be excluded. Therefore, the cost and the power consumption can be reduced.

By using the switching circuits SW1 and SW2, the AD converters 14 and 214 can be excluded and the cost and the power consumption can be reduced.

By using a digital signal as the interfacing signal of the echo preventing circuit, the AD converters 3 and 203 can be excluded and the cost and the power consumption can be reduced.

By including the detecting circuit that detects the connection state of the earphone microphone 18 to the input/output terminal 7 and outputs the detection signal, the control of the switching between the microphone 28 and the speaker 29, etc., and the earphone microphone 18 is enabled.

By using the switching circuits SW5, SW6, and SW7, the AD converter and the DA converter in the communicating apparatus such as, for example, the AD converter 26 and the DA converter 27 in the in the mobile phone 19 can be excluded and the cost and the power consumption can be reduced.

The above embodiments and the applications are for facilitating the understanding of the present invention and are not for limiting the interpretation of the present invention. The present invention can be modified and improved without departing from the purview thereof and the present invention includes the equivalents thereof.

Though, for example, an impulse response obtained by generating an impulse is set as the filter coefficients of a FIR filter in the embodiments, the signal used to set the filter coefficients is not limited to the impulse. For example, the filter coefficients of the FIR filter may be set based on a response signal obtained when a step signal is generated.

Figure 50:
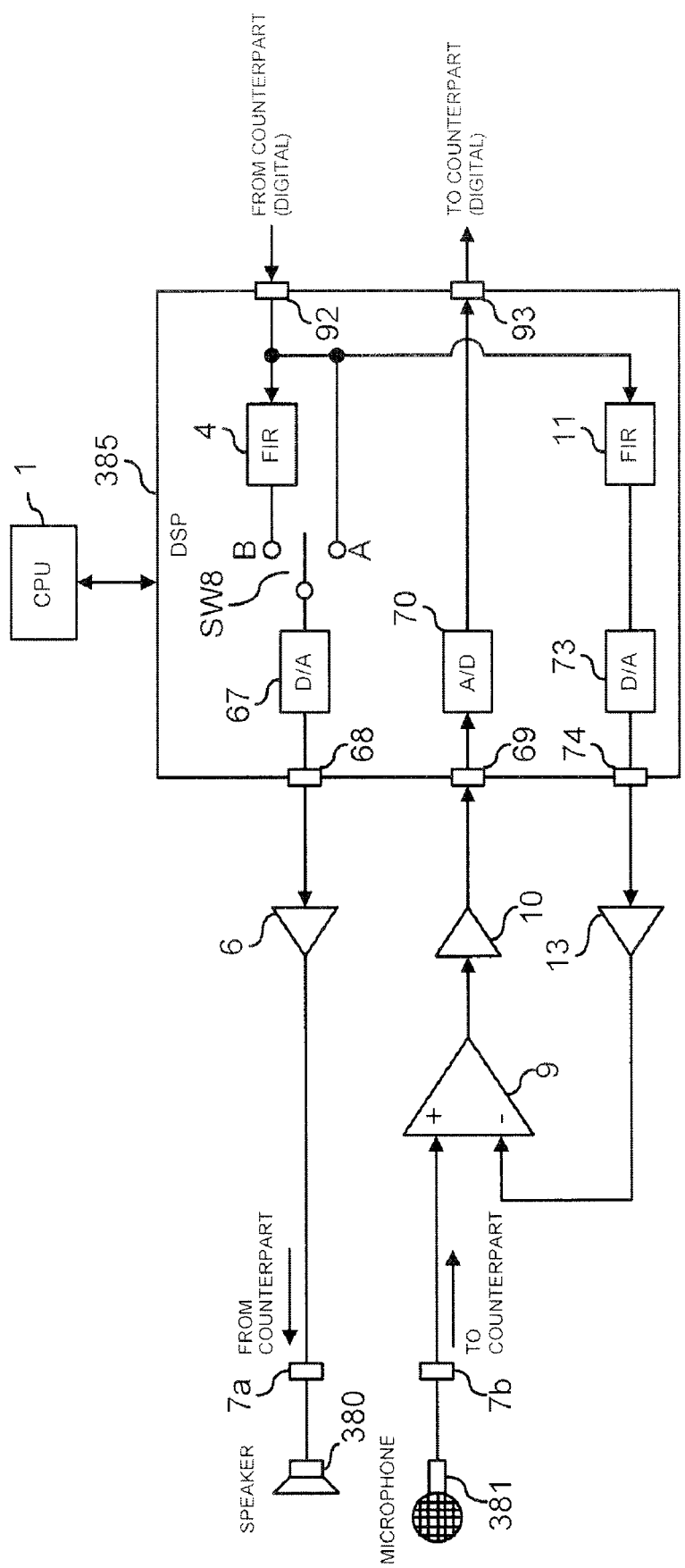
FIG. 50 depicts a block diagram of another application of the echo preventing circuit according to the present invention.
Figure 51:
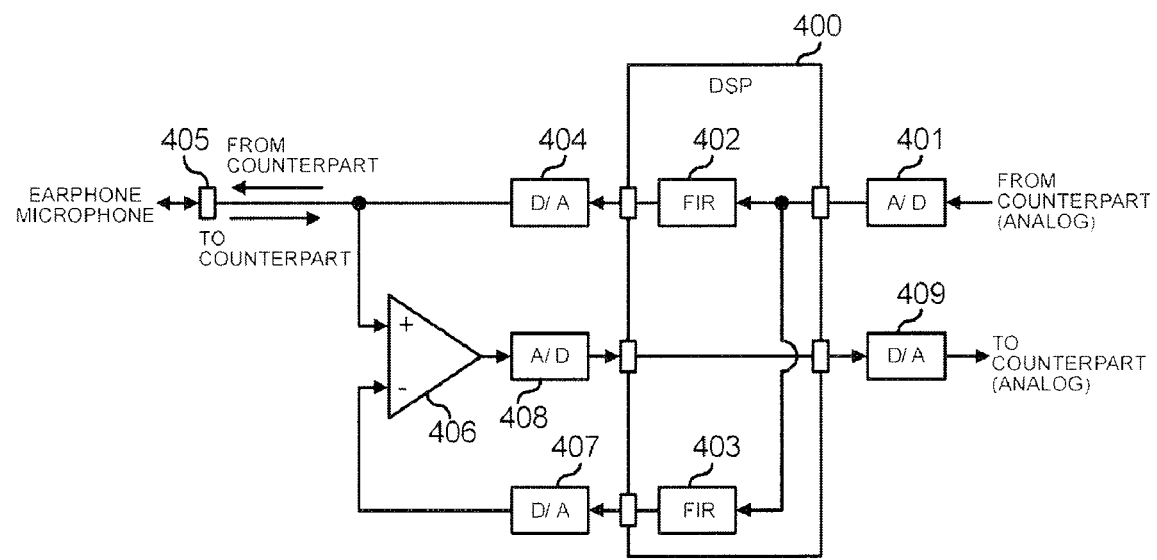
FIG. 51 depicts a conventional echo preventing circuit.

Though, for example, an earphone microphone is connected to an echo preventing circuit in the embodiment, an apparatus connected to the echo preventing circuit is not limited to the earphone microphone. For example, as shown in FIG. 50, a speaker 380 and a microphone 381 of a mobile phone may be connected to an echo preventing circuit. The echo preventing circuit does not include the input/output terminal 7 and, instead, includes an output terminal 7*a* and an input terminal 7*b*. The speaker is connected to the output terminal 7*a* and the microphone is connected to the input terminal 7*b*. A DSP 385 includes a switching circuit SW8 in addition to the configuration of the DSP 64. The mobile phone supports a normal mode and a hands-free mode. In the normal mode, the speaker 380 outputs not-so-loud sounds and the microphone 381 picks up sounds generated near the microphone 381. In the hands-free mode, the speaker 380 outputs loud sounds and the sensitivity of the microphone 381 is made high so that a user can use the mobile phone without bringing the speaker 380 and the microphone 381 close to the ear and the mouse, respectively. When the mobile phone is used in the normal mode, the switching circuit SW8 is switched to the side of "A". At this time, the DA converter 73 and the FIR filters 4 and 11 are not in operation, and a digital signal from the counterpart is inputted to the DA converter 67. When the mobile phone is used in the hands-free mode, the switching circuit SW8 is switched to the side of "B". At this time, the DA converter 73 and the FIR filters 4 and 11 are in operation same as in the DSP 64, and therefore an echo that is caused when the microphone 381 picks up sounds outputted from the speaker 380 can be cancelled.

It is claimed:

1. An echo preventing circuit comprising:
   a filter that is inputted with a first digital signal and outputs a second and a third digital signals;
   a first DA converter that converts the second digital signal into a first analog signal and outputs the first analog signal;
   a second DA converter that converts the third digital signal into a second analog signal and outputs the second analog signal;
   an input/output terminal that outputs the first analog signal or that is inputted with a third analog signal;

a subtracting circuit that outputs a fourth analog signal obtained by subtracting the second analog signal from a signal formed by combining the first analog signal and the third analog signal; and an AD converter that converts the fourth analog signal into a fourth digital signal and outputs the fourth digital signal, wherein the filter sets filter coefficients for which the fourth analog signal is a signal formed by removing or attenuating the first analog signal from a signal formed by combining the first analog signal and the third analog signal, based on the fourth digital signal outputted from the AD converter when signals are inputted into the first and the second DA converters while the third analog signal is not present, and wherein the fourth analog signal outputted from the subtracting circuit is outputted as an output signal corresponding to the third analog signal.

2. The echo preventing circuit of claim 1, further comprising a switching circuit that can selectively output the fourth analog signal or a fifth analog signal, wherein the switching circuit outputs the fourth analog signal to the AD converter when the filter coefficients of the filter are set, and wherein the switching circuit outputs the fifth analog signal to the AD converter to cause the AD converter to generate the first digital signal by analog/digital-converting the fifth analog signal when the output signal corresponding to the third analog signal is outputted.

3. An echo preventing circuit comprising:

a filter that is inputted with a first digital signal and outputs a second and a third digital signals;

a first DA converter that converts the second digital signal into a first analog signal and outputs the first analog signal;

a second DA converter that converts the third digital signal into a second analog signal and outputs the second analog signal;

an input/output terminal that outputs the first analog signal or that is inputted with a third analog signal;

a subtracting circuit that outputs a fourth analog signal obtained by subtracting the second analog signal from a signal formed by combining the first analog signal and the third analog signal; and an AD converter that converts the fourth analog signal into a fourth digital signal and outputs the fourth digital signal, wherein the filter sets filter coefficients for which the fourth analog signal is a signal formed by removing or attenuating the first analog signal from a signal formed by combining the first analog signal and the third analog signal, based on the fourth digital signal outputted from the AD converter when signals are inputted into the first and the second DA converters while the third analog signal is not present, and wherein the fourth digital signal outputted from the AD converter is outputted as an output signal corresponding to the third analog signal.

4. The echo preventing circuit of claim 3, further comprising a first switching circuit that can select whether the first analog signal is outputted to the input/output terminal and the subtracting circuit or the first analog signal is outputted as an output signal; and a second switching circuit that can selectively output the fourth analog signal or a sixth analog signal, wherein the filter converts the first digital signal into the second digital signal and outputs the second digital signal to the first DA converter, when an earphone microphone that converts the first analog signal into sound and outputs the sound and converts sound inputted thereinto into the third analog signal and outputs the third analog signal is connected to the input/output terminal, wherein the filter outputs the first digital signal as the second digital signal, when the earphone microphone is not connected to the input/output terminal, wherein the first switching circuit outputs the first analog signal to the input/output terminal and the subtracting circuit, when the earphone microphone is connected to the input/output terminal, wherein the first switching circuit outputs the first analog signal as an output signal, when the earphone microphone is not connected to the input/output terminal, wherein the second switching circuit outputs the fourth analog signal to the AD converter, when the earphone microphone is connected to the input/output terminal, and wherein the second switching circuit outputs the sixth analog signal to the AD converter to cause the AD converter to generate the fourth digital signal by converting the sixth analog signal thereinto, when the earphone microphone is not connected to the input/output terminal.

5. The echo preventing circuit of claim 4, further comprising a detecting circuit that detects the connection state of the earphone microphone to the input/output terminal and outputs the detection signal, wherein the filter converts the first digital signal into the second digital signal and outputs the second digital signal to the first DA converter, when the earphone microphone is connected to the input/output terminal, based on the detection signal, wherein the filter outputs the first digital signal to the first DA converter as the second digital signal, when the earphone microphone is not connected to the input/output terminal, based on the detection signal, wherein the first switching circuit outputs the first analog signal into the input/output terminal and the subtracting circuit, when the earphone microphone is connected to the input/output terminal, based on the detection signal, wherein the first switching circuit outputs the first analog signal as an output signal, when the earphone microphone is not connected to the input/output terminal, based on the detection signal, wherein the second switching circuit outputs the fourth analog signal to the AD converter, when the earphone microphone is connected to the input/output terminal, based on the detection signal, and wherein the second switching circuit outputs the sixth analog signal to the AD converter to cause the AD converter to generate the fourth digital signal by converting the sixth analog signal thereinto, when the earphone microphone is not connected to the input/output terminal, based on the detection signal.

6. A digital signal processing circuit comprising:

a first input terminal that is inputted with a first digital signal;

a filter that is inputted with the first digital signal from the first input terminal and outputs a second and a third digital signals;

a first DA converter that converts the second digital signal into and outputs a first analog signal;

a second DA converter that converts the third digital signal into and outputs a second analog signal;

a first output terminal that outputs the first analog signal;

a second output terminal that outputs the second analog signal;

a second input terminal that is inputted with a fourth analog formed by subtracting the second analog signal from the second output terminal from a signal formed by combining the first analog signal from the first output terminal and a third analog signal on an input/output signal shared line;

an AD converter that converts the fourth analog signal into and outputs a fourth digital signal; and a third output terminal that outputs the fourth digital signal, wherein the filter sets filter coefficients for which the fourth analog signal is a signal formed by removing or attenuating the first analog signal from a signal formed by combining the first analog signal and the third analog signal, based on the fourth digital signal outputted from the AD converter when signals are inputted into the first and the second DA converters while the third analog signal is not present, and wherein the fourth digital signal outputted from the third output terminal is outputted as an output signal corresponding to the third analog signal.

7. The digital signal processing circuit of claim 6, further comprising a third input terminal that is inputted with a detection signal indicative of the connection state to the input/output terminal of an earphone microphone that converts the first analog signal into and outputs sound and that converts sound inputted thereinto into and outputs the third analog signal, wherein the filter converts the first digital signal into and outputs the second digital signal to the first DA converter, when the earphone microphone is connected to the input/output terminal, based on the detection signal, and wherein the filter outputs the first digital signal to the first DA converter as the second digital signal, when the earphone microphone is not connected to the input/output terminal, based on the detection signal.

* * * * *

UNITED STATES PATENT AND TRADEMARK OFFICE
CERTIFICATE OF CORRECTION

PATENT NO. : 7,358,875 B2
APPLICATION NO. : 11/627839
DATED : April 15, 2008
INVENTOR(S) : Inoue et al.

It is certified that error appears in the above-identified patent and that said Letters Patent is hereby corrected as shown below:

Column 10, line 2 replace "logic value" with --logic value "0".--

Column 10, line 30 replace "601" with --60I--

Column 11, line 12 replace "Xn-imp(0)+..." with --Xn imp(0)+--

Column 11, line 35 replace "600" with --60O--

Column 12, line 56 replace "35aN-1" to --35a1--

Column 16, line 54 replace "601" with --60I--

Column 16, line 58 replace "601" with --60I--

Column 17, line 1 replace "601" with --60I--

Column 34, line 26 replace "2601" with --260I--

Column 37, line 10 replace "2601" with --260I--

Column 38, line 19 replace "i=1 (320)" with --i=0 (320)--

Column 49, line 66 replace "600" with --60O--

Signed and Sealed this

Twelfth Day of August, 2008

JON W. DUDAS
*Director of the United States Patent and Trademark Office*